United States Patent
El-Kady et al.

(10) Patent No.: US 11,915,870 B2
(45) Date of Patent: Feb. 27, 2024

(54) CAPACITOR WITH ELECTRODES MADE OF AN INTERCONNECTED CORRUGATED CARBON-BASED NETWORK

(71) Applicant: The Regents of the University of California, Oakland, CA (US)

(72) Inventors: Maher F. El-Kady, Los Angeles, CA (US); Veronica A. Strong, Portland, OR (US); Richard B. Kaner, Pacific Palisades, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 17/568,214

(22) Filed: Jan. 4, 2022

(65) Prior Publication Data

US 2022/0238284 A1      Jul. 28, 2022

Related U.S. Application Data

(63) Continuation of application No. 16/029,930, filed on Jul. 9, 2018, now Pat. No. 11,257,632, which is a
(Continued)

(51) Int. Cl.
*H01G 11/32*      (2013.01)
*H01G 11/26*      (2013.01)
(Continued)

(52) U.S. Cl.
CPC ............ *H01G 11/32* (2013.01); *H01G 11/24* (2013.01); *H01G 11/26* (2013.01); *H01G 11/36* (2013.01);
(Continued)

(58) Field of Classification Search
CPC ........ H01G 11/24; H01G 11/32; H01G 11/26; H01G 11/36; H01G 11/56; H01G 11/22; H01G 11/02; H01G 11/46
(Continued)

(56) References Cited

U.S. PATENT DOCUMENTS

| 2,800,616 A | 7/1957 | Becker |
| 3,223,639 A | 12/1965 | Powers et al. |

(Continued)

FOREIGN PATENT DOCUMENTS

| CN | 1092208 A | 9/1994 |
| CN | 1253390 A | 5/2000 |

(Continued)

OTHER PUBLICATIONS

Notice of Reasons for Rejection for Japanese Patent Application No. 2014-561017, dated Mar. 21, 2017, 10 pages.
(Continued)

*Primary Examiner* — Arun Ramaswamy
(74) *Attorney, Agent, or Firm* — Withrow & Terranova, P.L.L.C.

(57) ABSTRACT

Capacitors having electrodes made of interconnected corrugated carbon-based networks (ICCNs) are disclosed. The ICCN electrodes have properties that include high surface area and high electrical conductivity. Moreover, the electrodes are fabricated into an interdigital planar geometry with dimensions that range down to a sub-micron scale. As such, micro-supercapacitors employing ICCN electrodes are fabricated on flexible substrates for realizing flexible electronics and on-chip applications that can be integrated with micro-electromechanical systems (MEMS) technology and complementary metal oxide semiconductor technology in a single chip. In addition, capacitors fabricated of ICCN electrodes that sandwich an ion porous separator realize relatively thin and flexible supercapacitors that provide compact and lightweight yet high density energy storage for scalable applications.

20 Claims, 43 Drawing Sheets

Related U.S. Application Data continuation of application No. 15/612,405, filed on Jun. 2, 2017, now Pat. No. 11,004,618, which is a continuation of application No. 14/382,463, filed as application No. PCT/US2013/029022 on Mar. 5, 2013, now Pat. No. 9,779,884.

(60) Provisional application No. 61/757,077, filed on Jan. 25, 2013, provisional application No. 61/606,637, filed on Mar. 5, 2012.

(51) Int. Cl.
  *H01G 11/36* (2013.01)
  *H01G 11/24* (2013.01)
  *H01G 11/56* (2013.01)

(52) U.S. Cl.
  CPC .............. *H01G 11/56* (2013.01); *Y02E 60/13* (2013.01); *Y02T 10/70* (2013.01)

(58) Field of Classification Search
  USPC ................................. 361/502, 503, 508, 516
  See application file for complete search history.

(56) References Cited

U.S. PATENT DOCUMENTS

| | | | |
|---|---|---|---|
| 3,288,641 A | 11/1966 | Rightmire | |
| 3,536,963 A | 10/1970 | Boos | |
| 3,652,902 A | 3/1972 | Hart et al. | |
| 3,749,608 A | 7/1973 | Sarbacher | |
| 4,327,157 A | 4/1982 | Himy et al. | |
| 4,645,713 A | 2/1987 | Shioya et al. | |
| 5,143,709 A | 9/1992 | Labes | |
| 5,225,296 A | 7/1993 | Ohsawa et al. | |
| 5,442,197 A | 8/1995 | Andrieu et al. | |
| 5,744,258 A | 4/1998 | Bai et al. | |
| 6,043,630 A | 3/2000 | Koenck et al. | |
| 6,117,585 A | 9/2000 | Anani et al. | |
| 6,252,762 B1 | 6/2001 | Amatucci | |
| 6,356,433 B1 | 3/2002 | Shi et al. | |
| 6,451,074 B2 | 9/2002 | Bluvstein et al. | |
| 6,510,043 B1 | 1/2003 | Shiue et al. | |
| 6,522,522 B2 | 2/2003 | Yu et al. | |
| 6,982,517 B2 | 1/2006 | Reineke et al. | |
| 7,623,340 B1 | 11/2009 | Song et al. | |
| 7,833,663 B2 | 11/2010 | Phillips et al. | |
| 7,875,219 B2 | 1/2011 | Zhamu et al. | |
| 8,315,039 B2 | 11/2012 | Zhamu et al. | |
| 8,503,161 B1 | 8/2013 | Chang et al. | |
| 8,593,714 B2 | 11/2013 | Agrawal et al. | |
| 8,753,772 B2 | 6/2014 | Liu et al. | |
| 8,771,630 B2 | 7/2014 | Wu et al. | |
| 8,828,608 B2 | 9/2014 | Sun et al. | |
| 8,906,495 B2 | 12/2014 | Chen | |
| 8,951,675 B2 | 2/2015 | Bhardwaj et al. | |
| 9,118,078 B2 | 8/2015 | Huang et al. | |
| 9,295,537 B2 | 3/2016 | Cao | |
| 9,437,372 B1 | 9/2016 | Zhamu et al. | |
| 9,779,884 B2 | 10/2017 | El-Kady et al. | |
| 2002/0136881 A1 | 9/2002 | Yanagisawa et al. | |
| 2002/0160257 A1 | 10/2002 | Lee et al. | |
| 2003/0013012 A1 | 1/2003 | Ahn et al. | |
| 2003/0169560 A1 | 9/2003 | Welsch et al. | |
| 2004/0090736 A1 | 5/2004 | Bendale et al. | |
| 2004/0099641 A1 | 5/2004 | Mathieu et al. | |
| 2004/0131889 A1 | 7/2004 | Leddy et al. | |
| 2004/0241532 A1* | 12/2004 | Kim ...................... B82Y 30/00 977/843 |
| 2005/0153130 A1 | 7/2005 | Long et al. | |
| 2006/0121342 A1 | 6/2006 | Sano et al. | |
| 2006/0201801 A1 | 9/2006 | Bartlett et al. | |
| 2006/0207878 A1 | 9/2006 | Myung et al. | |
| 2006/0269834 A1 | 11/2006 | West et al. | |
| 2007/0172739 A1 | 7/2007 | Visco et al. | |
| 2007/0204447 A1 | 9/2007 | Bernstein et al. | |
| 2008/0090141 A1 | 4/2008 | Meitav et al. | |
| 2008/0158778 A1 | 7/2008 | Lipka et al. | |
| 2008/0180883 A1 | 7/2008 | Palusinski et al. | |
| 2008/0199737 A1 | 8/2008 | Kazaryan et al. | |
| 2008/0220293 A1 | 9/2008 | Marmaropoulos et al. | |
| 2008/0241656 A1* | 10/2008 | Miller .................... H01G 11/22 429/122 |
| 2008/0265219 A1 | 10/2008 | Whitehead et al. | |
| 2008/0316678 A1 | 12/2008 | Ehrenberg et al. | |
| 2009/0021890 A1 | 1/2009 | Bourcier et al. | |
| 2009/0059474 A1 | 3/2009 | Zhamu et al. | |
| 2009/0061312 A1 | 3/2009 | Zhamu et al. | |
| 2009/0117467 A1 | 5/2009 | Zhamu et al. | |
| 2009/0289328 A1 | 11/2009 | Tanioku | |
| 2009/0290287 A1 | 11/2009 | Lipka et al. | |
| 2010/0002362 A1* | 1/2010 | Clelland ................ H01G 11/28 427/515 |
| 2010/0003598 A1 | 1/2010 | Nakamura | |
| 2010/0159346 A1 | 6/2010 | Hinago et al. | |
| 2010/0159366 A1 | 6/2010 | Shao-Horn et al. | |
| 2010/0195269 A1 | 8/2010 | Kim et al. | |
| 2010/0203362 A1 | 8/2010 | Lam et al. | |
| 2010/0221508 A1 | 9/2010 | Huang et al. | |
| 2010/0226066 A1 | 9/2010 | Sweeney et al. | |
| 2010/0237296 A1 | 9/2010 | Gilje | |
| 2010/0266964 A1 | 10/2010 | Gilje | |
| 2010/0273051 A1 | 10/2010 | Choi et al. | |
| 2010/0317790 A1 | 12/2010 | Jang et al. | |
| 2011/0026189 A1 | 2/2011 | Wei et al. | |
| 2011/0075323 A1 | 3/2011 | Kawakami et al. | |
| 2011/0079748 A1 | 4/2011 | Ruoff et al. | |
| 2011/0111283 A1 | 5/2011 | Rust, III et al. | |
| 2011/0111299 A1 | 5/2011 | Liu et al. | |
| 2011/0143101 A1 | 6/2011 | Sandhu | |
| 2011/0159372 A1 | 6/2011 | Zhamu et al. | |
| 2011/0163274 A1 | 7/2011 | Plee et al. | |
| 2011/0163699 A1 | 7/2011 | Elder et al. | |
| 2011/0183180 A1 | 7/2011 | Yu et al. | |
| 2011/0227000 A1 | 9/2011 | Ruoff et al. | |
| 2011/0229777 A1 | 9/2011 | Mak et al. | |
| 2011/0242730 A1 | 10/2011 | Zhou et al. | |
| 2011/0256454 A1 | 10/2011 | Nicolas et al. | |
| 2011/0280787 A1 | 11/2011 | Chen et al. | |
| 2011/0318257 A1 | 12/2011 | Sokolov et al. | |
| 2012/0111730 A1 | 5/2012 | Choi et al. | |
| 2012/0129736 A1 | 5/2012 | Tour et al. | |
| 2012/0134072 A1 | 5/2012 | Bae et al. | |
| 2012/0145234 A1 | 6/2012 | Roy-Mayhew et al. | |
| 2012/0187906 A1 | 7/2012 | Martienssen et al. | |
| 2012/0300364 A1 | 11/2012 | Cai et al. | |
| 2012/0313591 A1 | 12/2012 | Brambilla et al. | |
| 2013/0026409 A1 | 1/2013 | Baker et al. | |
| 2013/0034803 A1* | 2/2013 | Adzic .................... H01G 11/46 977/773 |
| 2013/0048949 A1 | 2/2013 | Xia et al. | |
| 2013/0056346 A1 | 3/2013 | Sundara et al. | |
| 2013/0056703 A1 | 3/2013 | Elian et al. | |
| 2013/0077206 A1* | 3/2013 | Gadkaree ............. H01G 11/22 29/25.03 |
| 2013/0100581 A1 | 4/2013 | Jung et al. | |
| 2013/0148265 A1 | 6/2013 | Okuno et al. | |
| 2013/0155578 A1 | 6/2013 | Tsai et al. | |
| 2013/0161570 A1 | 6/2013 | Hwang et al. | |
| 2013/0168611 A1 | 7/2013 | Zhou et al. | |
| 2013/0171502 A1 | 7/2013 | Chen et al. | |
| 2013/0180912 A1 | 7/2013 | Li | |
| 2013/0182373 A1 | 7/2013 | Yu et al. | |
| 2013/0189602 A1 | 7/2013 | Lahiri et al. | |
| 2013/0217289 A1 | 8/2013 | Nayfeh et al. | |
| 2013/0230747 A1 | 9/2013 | Patolsky et al. | |
| 2013/0260246 A1 | 10/2013 | Chen et al. | |
| 2013/0264041 A1 | 10/2013 | Zhamu et al. | |
| 2013/0266858 A1 | 10/2013 | Inoue et al. | |
| 2013/0280601 A1 | 10/2013 | Geramita et al. | |
| 2013/0314844 A1 | 11/2013 | Chen et al. | |
| 2013/0315816 A1 | 11/2013 | Watson et al. | |
| 2013/0323159 A1 | 12/2013 | Lee et al. | |
| 2013/0330617 A1 | 12/2013 | Yoshimura et al. | |

(56) References Cited

U.S. PATENT DOCUMENTS

| | | | |
|---|---|---|---|
| 2014/0029161 A1 | 1/2014 | Beidaghi et al. |
| 2014/0030590 A1 | 1/2014 | Wang et al. |
| 2014/0045058 A1 | 2/2014 | Zhao et al. |
| 2014/0050947 A1 | 2/2014 | Donnelly |
| 2014/0065447 A1 | 3/2014 | Liu et al. |
| 2014/0099558 A1 | 4/2014 | Takura et al. |
| 2014/0118883 A1 | 5/2014 | Xie |
| 2014/0120453 A1 | 5/2014 | Ajayan et al. |
| 2014/0134503 A1 | 5/2014 | Lockett et al. |
| 2014/0146439 A1 | 5/2014 | Choi et al. |
| 2014/0154164 A1 | 6/2014 | Chen et al. |
| 2014/0170476 A1 | 6/2014 | Tan et al. |
| 2014/0178763 A1 | 6/2014 | Mettan |
| 2014/0205841 A1 | 7/2014 | Qiu et al. |
| 2014/0255776 A1 | 9/2014 | Song et al. |
| 2014/0255785 A1 | 9/2014 | Do et al. |
| 2014/0287308 A1 | 9/2014 | Okada et al. |
| 2014/0306858 A1 | 10/2014 | Tsai et al. |
| 2014/0313636 A1 | 10/2014 | Tour et al. |
| 2014/0323596 A1 | 10/2014 | Jeong et al. |
| 2014/0335428 A1 | 11/2014 | Wakizaka et al. |
| 2014/0370383 A1 | 12/2014 | Lim et al. |
| 2015/0044560 A1 | 2/2015 | Ogino |
| 2015/0050554 A1 | 2/2015 | Fukumine et al. |
| 2015/0098167 A1 | 4/2015 | El-Kady et al. |
| 2015/0103469 A1 | 4/2015 | Lee et al. |
| 2015/0111449 A1 | 4/2015 | Cruz-Silva et al. |
| 2015/0218002 A1 | 8/2015 | Plomb et al. |
| 2015/0218003 A1 | 8/2015 | Zhamu et al. |
| 2015/0235776 A1 | 8/2015 | Miller |
| 2015/0259212 A1 | 9/2015 | Li et al. |
| 2015/0287544 A1 | 10/2015 | Irazoqui et al. |
| 2015/0298977 A1 | 10/2015 | Yoon |
| 2015/0311504 A1 | 10/2015 | Hong et al. |
| 2015/0332868 A1 | 11/2015 | Jung et al. |
| 2015/0340171 A1 | 11/2015 | Li et al. |
| 2015/0364738 A1 | 12/2015 | Pope et al. |
| 2015/0364755 A1 | 12/2015 | Liu et al. |
| 2016/0035498 A1 | 2/2016 | Honma et al. |
| 2016/0043384 A1 | 2/2016 | Zhamu et al. |
| 2016/0055983 A1 | 2/2016 | Kurungot et al. |
| 2016/0077074 A1 | 3/2016 | Strong et al. |
| 2016/0099116 A1 | 4/2016 | Yang |
| 2016/0102187 A1 | 4/2016 | Leventis et al. |
| 2016/0118198 A1 | 4/2016 | Okuno et al. |
| 2016/0133396 A1 | 5/2016 | Hsieh |
| 2016/0148759 A1 | 5/2016 | El-Kady et al. |
| 2017/0033371 A1 | 2/2017 | Cordova |
| 2017/0062821 A1 | 3/2017 | Tour et al. |
| 2017/0149107 A1 | 5/2017 | El-Kady et al. |
| 2017/0178824 A1 | 6/2017 | Kaner et al. |
| 2017/0194105 A1 | 7/2017 | Zhamu et al. |
| 2017/0213657 A1 | 7/2017 | Kaner et al. |
| 2017/0240424 A1 | 8/2017 | Roberts et al. |
| 2017/0271093 A1 | 9/2017 | El-Kady et al. |
| 2017/0278643 A1 | 9/2017 | El-Kady et al. |
| 2017/0287650 A1 | 10/2017 | Kaner et al. |
| 2017/0299563 A1 | 10/2017 | Strong et al. |
| 2017/0338472 A1 | 11/2017 | Zhamu et al. |
| 2017/0369323 A1 | 12/2017 | Kowal et al. |
| 2018/0062159 A1 | 3/2018 | El-Kady et al. |
| 2018/0323016 A1 | 11/2018 | El-Kady et al. |
| 2018/0366280 A1 | 12/2018 | Iwang et al. |
| 2019/0006675 A1 | 1/2019 | Cheng et al. |
| 2019/0019630 A1 | 1/2019 | Strauss et al. |
| 2019/0088420 A1 | 3/2019 | Tour et al. |
| 2019/0123409 A1 | 4/2019 | El-Kady et al. |
| 2019/0237752 A1 | 8/2019 | El-Kady et al. |
| 2019/0284403 A1 | 9/2019 | Kaner et al. |
| 2020/0090880 A1 | 3/2020 | Kaner et al. |

FOREIGN PATENT DOCUMENTS

| | | |
|---|---|---|
| CN | 100372035 C | 2/2008 |
| CN | 101723310 A | 6/2010 |
| CN | 101894679 A | 11/2010 |
| CN | 102187413 A | 9/2011 |
| CN | 102275896 A | 12/2011 |
| CN | 102491318 A | 6/2012 |
| CN | 102509632 A | 6/2012 |
| CN | 102543483 A | 7/2012 |
| CN | 102923698 A | 2/2013 |
| CN | 103208373 A | 7/2013 |
| CN | 103508450 A | 1/2014 |
| CN | 103715393 A | 4/2014 |
| CN | 103723715 A | 4/2014 |
| CN | 103787328 A | 5/2014 |
| CN | 203631326 U | 6/2014 |
| CN | 203839212 U | 9/2014 |
| CN | 104143630 A | 11/2014 |
| CN | 104201438 A | 12/2014 |
| CN | 104229777 A | 12/2014 |
| CN | 104299794 A | 1/2015 |
| CN | 104355306 A | 2/2015 |
| CN | 104617300 A | 5/2015 |
| CN | 104637694 A | 5/2015 |
| CN | 104892935 A | 9/2015 |
| CN | 105062074 A | 11/2015 |
| CN | 105217621 A | 1/2016 |
| CN | 105585003 A | 5/2016 |
| CN | 106158426 A | 11/2016 |
| EP | 137081 A1 | 9/2001 |
| EP | 1262579 A2 | 12/2002 |
| EP | 1843362 A1 | 10/2007 |
| EP | 2088637 A2 | 8/2009 |
| EP | 2933229 A1 | 10/2015 |
| EP | 2958122 A1 | 12/2015 |
| EP | 2980891 A1 | 2/2016 |
| EP | 3367479 A1 | 8/2018 |
| JP | S61010855 A | 1/1986 |
| JP | S62287568 A | 12/1987 |
| JP | 2002063894 A | 2/2002 |
| JP | 2003217575 A | 7/2003 |
| JP | 2004039491 A | 2/2004 |
| JP | 2004055541 A | 2/2004 |
| JP | 2004063297 A | 2/2004 |
| JP | 3503438 B2 | 3/2004 |
| JP | 2004519841 A | 7/2004 |
| JP | 2005138204 A | 6/2005 |
| JP | 2005199267 A | 7/2005 |
| JP | 2005294020 A | 10/2005 |
| JP | 2005317902 A | 11/2005 |
| JP | 2006252902 A | 11/2005 |
| JP | 2007160151 A | 6/2007 |
| JP | 2008-300467 A | 12/2008 |
| JP | 2009525247 A | 7/2009 |
| JP | 2010222245 A | 10/2010 |
| JP | 2011026153 A | 2/2011 |
| JP | 2011165680 A | 8/2011 |
| JP | 2012169576 A | 9/2012 |
| JP | 2012188484 A | 10/2012 |
| JP | 2013534686 A | 9/2013 |
| JP | 2014053209 A | 3/2014 |
| JP | 2014201492 A | 10/2014 |
| JP | 2015218085 A | 12/2015 |
| KR | 1020040079226 A | 9/2004 |
| KR | 20070083691 A | 8/2007 |
| KR | 20080064967 A | 7/2008 |
| KR | 10-2009-0107498 A | 10/2009 |
| KR | 20140012464 A | 2/2014 |
| KR | 1020100114827 A | 4/2017 |
| WO | 9632618 A1 | 10/1996 |
| WO | 2007109907 A1 | 10/2007 |
| WO | 2011019431 A1 | 2/2011 |
| WO | 2011021982 A1 | 2/2011 |
| WO | 2011072213 A2 | 6/2011 |
| WO | 2012006657 A1 | 1/2012 |
| WO | 2012087698 A1 | 6/2012 |
| WO | 2012138302 A1 | 10/2012 |
| WO | 2013024727 A1 | 2/2013 |
| WO | 2013040636 A1 | 3/2013 |
| WO | 2013066474 A2 | 5/2013 |
| WO | 2013070989 A1 | 5/2013 |
| WO | 2013128082 A1 | 9/2013 |

(56) References Cited

FOREIGN PATENT DOCUMENTS

| | | |
|---|---|---|
| WO | 2013155276 A1 | 10/2013 |
| WO | 2013162649 A2 | 10/2013 |
| WO | 2014011722 A2 | 1/2014 |
| WO | 2014028978 A1 | 2/2014 |
| WO | 2014062133 A1 | 4/2014 |
| WO | 2014072877 A2 | 5/2014 |
| WO | 2014134663 A1 | 9/2014 |
| WO | 2014138721 A1 | 9/2014 |
| WO | 2014181763 A1 | 11/2014 |
| WO | 2015023974 A1 | 2/2015 |
| WO | 2015069332 A | 5/2015 |
| WO | 2015153895 A1 | 10/2015 |
| WO | 2015195700 A1 | 12/2015 |
| WO | 2016053956 A1 | 4/2016 |
| WO | 2016094551 A1 | 6/2016 |
| WO | 2016133571 A2 | 8/2016 |
| WO | 2016190225 A1 | 12/2016 |
| WO | 2017035462 A1 | 3/2017 |

OTHER PUBLICATIONS

International Search Report and Written Opinion for PCT/US2013/029022, dated Jun. 26, 2013, 13 pages.
International Preliminary Report on Patentability for PCT/US2013/029022 dated Sep. 18, 2014, 9 pages.
International Search Report and Written Opinion for International Patent Application No. PCT/US2015/036082, dated Aug. 27, 2015, 15 pages.
International Preliminary Report on Patentability for International Patent Application No. PCT/US2015/036082, dated Dec. 29, 2016, 12 pages.
International Search Report and Written Opinion for International Patent Application No. PCT/US2015/061400, dated Mar. 29, 2016, 20 pages.
Invitation to Pay Additional Fees for International Patent Application No. PCT/US2016/067468, dated Feb. 13, 2017, 2 pages.
Conway, B. E., "Chapter 2: Similarities and Differences between Supercapacitors and Batteries for Storing Electrical Energy," Electrochemical Supercapacitors: Scientific Fundamentals and Technological Applications (book), 1999, New York, Springer Science + Business Media, pp. 11-12.
Conway, B. E., "Chapter 3: Energetics and Elements of the Kinetics of Electrode Processes," Electrochemical Supercapacitors: Scientific Fundamentals and Technological Applications (book), 1999, New York, Springer Science + Business Media, pp. 33-34.
Ozawa, Kazunori, "Lithium-Cell System—Nonaqueous Electrolyte System," Lithium Ion Rechargeable Batteries (book), Chapter 1: General Concepts, Section 1.1.2, 2009, WILEY-VCH Verlag GmbH & Co. KGaA, 5 pages.
Root, Michael, "Electric Vehicles," The TAB™ Battery Book: An In-Depth Guide to Construction, Design, and Use (book), Chapter 2: The Many Uses of Batteries, 2011, The McGraw-Hill Companies, 4 pages.
Kaewsongpol, Tanon et al., "High-performance supercapacitor of electrodeposited porous 3Dpolyaniline hanorods on functionalized carbon fiber paper: Effects of hydrophobic and hydrophilic surfaces of conductive carbon paper substrates," Materials Today Communications, vol. 4, Aug. 19, 2015, Elsevier Ltd., pp. 176-185.
Yan, Jun et al., "Preparation of graphene nanosheet/carbon nanotube/polyaniline composite as electrode material for supercapacitors," Journal of Power Sources, vol. 195, Issue 9, Nov. 11, 2009, Elsevier B.V., pp. 3041-3045.
Non-Final Office Action for U.S. Appl. No. 13/725,073, dated Aug. 28, 2017, 41 pages.
Fourth Office Action for Chinese Patent Application No. 201280070343.4, dated Apr. 26, 2017, 22 pages.
Examination Report for European Patent Application No. 12874989.2, dated Jul. 24, 2017, 5 pages.
Notice of Reason for Rejection for Japanese Patent Application No. 2014-548972, dated May 23, 2017, 4 pages.
Second Office Action for Chinese Patent Application No. 201380023699.7, dated Aug. 9, 2017, 8 pages.
Communication pursuant to Article 94(3) EPC for European Patent Application No. 13757195.6, dated Jul. 6, 2017, 3 pages.
International Preliminary Report on Patentability for International Patent Application No. PCT/US2015/061400, dated Jun. 1, 2017, 16 pages.
International Search Report and Written Opinion for International Patent Application No. PCT/US2016/067468, dated Apr. 21, 2017, 10 pages.
International Search Report and Written Opinion for International Patent Application No. PCT/US2017/014126, dated Apr. 20, 2017, 13 pages.
International Search Report and Written Opinion for International Patent Application No. PCT/US2017/024716, dated Jun. 20, 2017, 13 pages.
International Search Report and Written Opinion for International Patent Application No. PCT/US2017/023632, dated May 31, 2017, 11 pages.
International Search Report and Written Opinion for International Patent Application No. PCT/US2017/038992, dated Sep. 21, 2017, 12 pages.
Invitation to Pay Additional Fees for International Patent Application No. PCT/US2017/048883, dated Sep. 29, 2017, 2 pages.
International Search Report and Written Opinion for International Patent Application No. PCT/US2017/048883, dated Dec. 26, 2017, 10 pages.
Non-Final Office Action for U.S. Appl. No. 14/945,232, dated Jan. 29, 2018, 9 pages.
Extended European Search Report for European Patent Application No. 15809519.0, dated Feb. 5, 2018, 10 pages.
Decision on Rejection for Chinese Patent Application No. 201280070343.4, dated Jan. 5, 2018, 18 pages.
Non-Final Office Action for U.S. Appl. No. 15/612,405, dated Feb. 9, 2018, 9 pages.
Decision to Grant a Patent for Japanese Patent Application No. 2014-561017, dated Mar. 13, 2018, 4 pages.
Final Office Action for U.S. Appl. No. 13/725,073, dated Apr. 6, 2018, 37 pages.
Notice of Allowance for U.S. Appl. No. 15/612,405, dated May 16, 2018, 8 pages.
Third Office Action and Search Report for Chinese Patent Application No. 201380023699.7, dated Mar. 9, 2018, 16 pages.
Examination Report for European Patent Application No. 13757195.6, dated Jun. 13, 2018, 7 pages.
Non-Final Office Action for U.S. Appl. No. 15/319,286, dated Jun. 27, 2018, 9 pages.
Final Office Action for U.S. Appl. No. 14/945,232, dated Aug. 10, 2018, 7 pages.
Notification of the First Office Action for Chinese Patent Application No. 201580072540.3, dated Jun. 25, 2018, 14 pages.
Partial Supplementary European Search Report for European Patent Application No. 15861794.4, dated Jun. 28, 2018, 16 pages.
Non-Final Office Action for U.S. Appl. No. 15/382,871, dated Jun. 27, 2018, 11 pages.
International Preliminary Report on Patentability for International Patent Application No. PCT/US2016/067468, dated Jul. 5, 2018, 7 pages.
International Preliminary Report on Patentability for International Patent Application No. PCT/US2017/014126, dated Aug. 2, 2018, 10 pages.
Non-Final Office Action for U.S. Appl. No. 15/472,409, dated Jun. 29, 2018, 11 pages.
Decision on Rejection for Chinese Patent Application No. 201380023699.7, dated Aug. 16, 2018, 11 pages.
Braz, Elton P., et al., "Effects of Gamma Irradiation in Graphene/Poly(ethylene Oxide) Nanocomposites," 2013 International Nuclear Atlantic Conference—INAC 2013, Nov. 24-29, 2013, Recife, PE, Brazil, 7 pages.
Hu, Liangbing, et al., "Lithium-Ion Textile Batteries with Large Areal Mass Loading," Advanced Energy Materials, vol. 1, Issue 6, Oct. 6, 2011, pp. 1012-1017.

(56) References Cited

OTHER PUBLICATIONS

First Office Action for Canadian Patent Application No. 2,862,806, dated Nov. 22, 2018, 5 pages.
Non-Final Office Action for U.S. Appl. No. 16/029,930, dated Jan. 14, 2019, 8 pages.
Office Action for Canadian Patent Application No. 2,866,250, dated Jan. 11, 2019, 3 pages.
Luo, Zhi-Jia et al., "A timesaving, low-cost, high-yield method for the synthesis of ultrasmall uniform graphene oxide nanosheets and their application in surfactants," Nanotechnology, vol. 27, Issue 5, Dec. 16, 2015, IOP Publishing Ltd, pp. 1-8.
Maiti, Sandipan et al., "Interconnected Network of $MnO_2$ Nanowires with a "Cocoonlike" Morphology: Redox Couple-Mediated Performance Enhancement in Symmetric Aqueous Supercapacitor," ACS Applied Materials & Interfaces, vol. 6, Issue 13, Jun. 16, 2014, American Chemical Society, pp. 10754-10762.
Maiti, Uday Narayan et al., "Three-Dimensional Shape Engineered, Interfacial Gelation of Reduced Graphene Oxide for High Rate, Large Capacity Supercapacitors," vol. 26, Issue 4, Jan. 29, 2014, WILEY-VCH Verlag GmbH & Co., pp. 615-619.
Mao, Lu et al., "Surfactant-stabilized graphene/polyaniline nanofiber composites for high performance supercapacitor electrode," Journal of Materials Chemistry, vol. 22, Issue 1, Oct. 12, 2011, The Royal Society of Chemistry, pp. 80-85.
Marcano, Daniela C. et al., "Improved Synthesis of Graphene Oxide," ACS Nano, vol. 4, Issue 8, Jul. 22, 2010, American Chemical Society, pp. 4806-4814.
Miller, John R. et al., "Electrochemical Capacitors for Energy Management," Materials Science, vol. 321, Aug. 1, 2008, AAAS, pp. 651-652.
Moosavifard, Seyyed E. et al., "Designing 3D highly ordered nanoporous CuO electrodes for high-performance asymmetric supercapacitors," ACS Applied Materials & Interfaces, vol. 7, Issue 8, American Chemical Society, 13 pages.
Moussa, Mahmoud et al., "Free-Standing Composite Hydrogel Film for Superior Volumetric Capacitance," Journal of Materials Chemistry A, vol. 3, Issue 30, Jun. 19, 2015, The Royal Society of Chemistry, pp. 1-8.
Naoi, Katsuhiko et al., "Second generation 'nanohybrid supercapacitor': Evolution of capacitive energy storage devices," Energy & Environmental Science, vol. 5, Issue 11, Sep. 14, 2012, The Royal Society of Chemistry, pp. 9363-9373.
Nathan, Arokia et al., "Flexible Electronics: The Next Ubiquitous Platform," Proceedings of the IEEE, vol. 100, Special Centennial Issue, May 13, 2012, IEEE, pp. 1486-1517.
Niu, Zhiqiang et al., "A Leavening Strategy to Prepare Reduced Graphene Oxide Foams," Advanced Materials, vol. 24, Issue 30, Aug. 8, 2012, WILEY-VCH Verlag GmbH & Co., pp. 1-7.
Oudenhoven, Jos F. M. et al., "All-Solid-State Lithium-Ion Microbatteries: A Review of Various Three-Dimensional Concepts," Advanced Energy Matterials, vol. 1, Issue 1, WILEY-VCH Verlag GmbH & Co. KGaA, Weinheim, pp. 10-33.
Paravannoor, Anjali et al., "High voltage supercapacitors based on carbon-grafted NiO nanowires interfaced with an aprotic ionic liquid," Chemical Communications, vol. 51, Issue 28, Feb. 26, 2015, The Royal Society of Chemistry, pp. 1-4.
Patel, Mehul N. et al., "Hybrid $MnO_2$—disordered mesoporous carbon nanocomposites: synthesis and characterization as electrochemical pseudocapacitor electrodes," Journal of Materials Chemistry, vol. 20, Issue 2, Nov. 11, 2009, The Royal Society of Chemistry, pp. 390-398.
Pech, David et al, "Ultrahigh-power micrometre-sized supercapacitors based on onion-like carbon," Nature Nanotechnology, vol. 5, Sep. 2010, Macmillan Publishers Limited, 10 pages.
Pendashteh, Afshin et al., "Fabrication of anchored copper oxide nanoparticles on graphene oxide nanosheets via an electrostatic coprecipitation and its application as supercapacitor," Electrochimica Acta, vol. 88, Oct. 29, 2012, Elsevier Ltd., pp. 347-357.
Pendashteh, Afshin et al., "Facile synthesis of nanostructured $CuCo_2O_4$ as a novel electrode material for high-rate supercapacitors," vol. 50, Issue 16, Dec. 17, 2013, The Royal Society of Chemistry, 4 pages.
Pendashteh, Afshin et al., "Highly Ordered Mesoporous $CuCo_2O_4$ Nanowires, a Promising Solution for High-Performance Supercapacitors," Chemistry of Materials, vol. 27, Issue 11, Apr. 20, 2015, American Chemical Society, pp. 1-11.
Qing, Xutang et al., "P/N/O co-doped carbonaceous materials based supercapacitor with voltage up to 1.9 V in the aqueous electrolyte," RSC Advances, vol. 4, Issue 99, Oct. 21, 2014, Royal Society of Chemistry, pp. 1-22.
Qiu, Ling et al., "Controllable Corrugation of Chemically Converted Graphene Sheets in Water and Potential Application for Nanofiltration," Chemical Communications, vol. 47, 2011, pp. 5810-5812.
Qu, Qunting et al., "Core-Shell Structure of Polypyrrole Grown on $V_2O_5$ Nanoribbon as High Performance Anode Material for Supercapacitors," Advanced Energy Materials, vol. 2, Issue 8, 2012, WILEY-VCH Verlag GmbH & Co., pp. 1-6.
Raccichini, Rinaldo et al., "The role of graphene for electrochemical energy storage," Nature Materials, vol. 14, Issue 3, Dec. 22, 2014, Macmillan Publishers Limited, pp. 1-9.
Samitsu, Sadaki et al., "Flash freezing route to mesoporous polymer nanofibre networks," Nature Communications, vol. 4, Issue 2653, Oct. 22, 2013, Macmillan Publishers Limited, pp. 1-7.
Shao, Yuanlong et al., "Fabrication of large-area and high-crystallinity photoreduced graphene oxide films via reconstructed two-dimensional multilayer structures," NPG Asia Materials, vol. 6, Issue 8, e119, Aug. 15, 2014, Nature Publishing Group, pp. 1-9.
Shao, Yuanlong et al., "Graphene-based materials for flexible supercapacitors," Chemical Society Review, vol. 44, Issue 11, Apr. 22, 2015, The Royal Society of Chemistry, 27 pages.
Shao, Yuanlong et al., "High-performance flexible asymmetric supercapacitors based on 3D porous graphene/ $MnO_2$ nanorod and graphene/Ag hybrid thin-film electrodes," Journal of Materials Chemistry C, vol. 1, Dec. 5, 2012, The Royal Society of Chemistry, pp. 1245-1251.
Sheats, James R., "Manufacturing and commercialization issues in organic electronics," Journal of Materials Research, vol. 19, Issue 7, Jul. 2004, Materials Research Society, pp. 1974-1989.
Shen, Caiwei et al., "A high-energy-density micro supercapacitor of asymmetric $MnO_2$—carbon configuration by using microfabrication technologies," Journal of Power Sources, vol. 234, Feb. 9, 2013, Elsevier B.V., pp. 302-309.
Shen, Jiali et al., "High-Performance Asymmetric Supercapacitor Based on Nano-architectured Polyaniline/Graphene/Carbon Nanotube and Activated Graphene Electrodes," ACS Applied Materials & Interfaces, vol. 5, Issue 17, Aug. 9, 2013, American Chemical Society, 36 pages.
Shown, Indrajit et al., "Conducting polymer-based flexible supercapacitor," Energy Science & Engineering, vol. 3, Issue 1, Nov. 19, 2014, Society of Chemical Industry and John Wiley & Sons Ltd., pp. 1-25.
Simon, P. et al., "Capacitive Energy Storage in Nanostructured Carbon-Electrolyte Systems," Accounts of Chemical Research, vol. 46, Issue 5, Jun. 6, 2012, American Chemical Society, 10 pages.
Simon, Patrice et al., "Materials for electrochemical capacitors," Nature Materials, vol. 7, Issue 11, Nov. 2008, Macmillan Publishers Limited, pp. 845-854.
Simon, Patrice et al., "Where Do Batteries End and Supercapacitors Begin?" Science, vol. 343, Issue 6176, Mar. 14, 2014, American Association for the Advancement of Science, 3 pages.
Snook, Graeme A. et al., "Conducting-polymer-based supercapacitor devices and electrodes," Journal of Power Sources, vol. 196, Jul. 15, 2010, Elsevier B.V., pp. 1-12.
Stoller, Meryl D. et al., "Graphene-Based Ultracapacitors," Nano Letters, vol. 8, Issue 10, Sep. 13, 2008, American Chemical Society, pp. 3498-3502.
Strong, Veronica et al., "Patterning and Electronic Tuning of Laser Scribed Graphene for Flexible All-Carbon Devices," ACS Nano, vol. 6, Issue 2, Jan. 13, 2012, American Chemical Society, p. 1395-1403.
Su, Zijin et al., "Scalable fabrication of $MnO_2$ nanostructure deposited on free-standing Ni nanocone arrays for ultrathin, flexible,

(56) References Cited

OTHER PUBLICATIONS high-performance micro-supercapacitor," Energy and Environmental Science, vol. 7, May 28, 2014, The Royal Society of Chemistry, pp. 2652-2659.
Sumboja, Afriyanti et al., "Large Areal Mass, Flexible and Free-Standing Reduced Graphene Oxide/Manganese Dioxide Paper for Asymmetric Supercapacitor Device," Advanced Materials, vol. 25, Issue 20, May 28, 2013, WILEY-VCH Verlag Gmbh & Co. KGaA, Weinheim, pp. 2809-2815.
Tian, Yuyu et al., "Synergy of $W_{18}O_{49}$ and Polyaniline for Smart Supercapacitor Electrode Integrated with Energy Level Indicating Functionality," Nano Letters, vol. 14, Issue 4, Mar. 4, 2014, American Chemical Society, pp. 2150-2156.
Toupin, Mathieu et al., "Charge Storage Mechanism of $MnO_2$ Electrode Used in Aqueous Electrochemical Capacitor," Chemistry of Materials, vol. 16, Issue 16, Jul. 16, 2004, American Chemical Society, pp. 3184-3190.
Tran, Henry D. et al., "The oxidation of aniline to produce "polyaniline": a process yielding many different hanoscale structures," Journal of Materials Chemistry, vol. 21, Issue 11, Nov. 25, 2010, The Royal Society of Chemistry, pp. 3534-3550.
Viculis, Lisa M. et al., "A Chemical Route to Carbon Nanoscrolls," Science, vol. 299, Issue 5611, Feb. 28, 2003, American Association for the Advancement of Science, 2 pages.
Vonlanthen, David et al., "A Stable Polyaniline-Benzoquinone-Hydroquinone Supercapacitor," Advanced Materials, vol. 26, Issue 30, Jun. 13, 2014, WILEY-VCH Verlag GmbH & Co., pp. 1-6.
Wallace, Gordon G. et al., "Processable aqueous dispersions of graphene nanosheets," Nature Nanotechnology, vol. 3, Issue 2, 2008, Nature Publishing Group, pp. 101-105.
Wang, Gongkai et al., "Flexible Pillared Graphene-Paper Electrodes for High-Performance Electrochemical Supercapacitors," Small, vol. 8, Issue 3, Dec. 8, 2011, pp. 452-459.
Wang, Guoping et al, "A review of electrode materials for electrochemical supercapacitors," Chemical Society Reviews, vol. 41, Jul. 21, 2011, The Royal Society of Chemistry, pp. 797-828.
Wang, Guoxiu et al., "Graphene nanosheets for enhanced lithium storage in lithium ion batteries," Carbon, vol. 47, Issue 8, Apr. 1, 2009, Elsevier Ltd., pp. 2049-2053.
Wang, Hailiang et al., "$Mn_3O_4$-Graphene Hybrid as a High-Capacity Anode Material for Lithium Ion Batteries," Journal of the American Chemical Society, vol. 132, Issue 40, Oct. 13, 2010, American Chemical Society, pp. 13978-13980.
Wang, Huanlei et al., "Graphene-Nickel Cobaltite Nanocomposite Asymmetrical Supercapacitor with Commercial Level Mass Loading," Nano Research, vol. 5, Issue 9, Sep. 2012, Tsinghua University Press and Springer—Verlag Berlin Heidelberg, pp. 605-617.
Wang, Kai et al., "Flexible supercapacitors based on cloth-supported electrodes of conducting polymer nanowire array/SWCNT composites," Journal of Materials Chemistry, vol. 21, Issue 41, Sep. 20, 2011, The Royal Society of Chemistry, pp. 16373-16378.
Examination Report for European Patent Application No. 15809519.0, dated May 17, 2022, 6 pages.
Non-Final Office Action for U.S. Appl. No. 16/791,517, dated Apr. 27, 2022, 12 pages.
Office Action for Brazilian Patent Application No. 112017010257, dated Apr. 12, 2022, 7 pages.
Notice of Allowance for Israeli Patent Application No. 259749, dated Apr. 28, 2022, 3 pages.
Notification to Grant for Chinese Patent Application No. 201780027316.1, dated Apr. 15, 2022, 4 pages.
Notice of Reasons for Refusal for Japanese Patent Application No. 2019511650, dated Mar. 28, 2022, 5 pages.
Examination Report for Taiwanese Patent Application No. 106129539, dated Mar. 9, 2022, 4 pages.
Grant of Patent for Korean Patent Application No. 10-2019-7001932, dated Apr. 18, 2022, 5 pages.
Examination Report for Indian Patent Application No. 201917053095, dated Mar. 28, 2022, 5 pages.
Notification of Reasons for Rejection for Japanese Patent Application No. 2021-041173, dated Mar. 11, 2022, 6 pages.
Notification of Reasons for Rejection for Japanese Patent Application No. 2018-532233, dated Apr. 1, 2022, 6 pages.
Advisory Action for U.S. Appl. No. 16/791,517, dated Mar. 23, 2022, 3 pages.
Decision to Grant for European Patent Application No. 16879927.8, dated Mar. 24, 2022, 2 pages.
Examination Report for Taiwanese Patent Application No. 106102134, dated Jan. 26, 2022, 44 pages.
Notice of Acceptance for Australian Patent Application No. 2017245151, dated Mar. 4, 2022, 3 pages.
Notification of Reasons for Rejection for Japanese Patent Application No. 2018-567030, dated Feb. 24, 2022, 4 pages.
Decision of Rejection for Chinese Patent Application No. 2017800249783, dated Jan. 18, 2022, 7 pages.
Office Action for Israeli Patent Application No. 264868, dated Dec. 22, 2021, 8 pages.
Notice of Allowance for U.S. Appl. No. 16/791,504, dated Mar. 16, 2022, 9 pages.
Notice of Acceptance for Australian Patent Application No. 2015277264, dated Jul. 31, 2019, 3 pages.
Cannarella et al., "Mechanical Properties of a Battery Separator under Compression and Tension," Journal of the Electrochemical Society, vol. 161, No. 11, Sep. 26, 2014, pp. F3117-F3122.
Fernandez-Merino, M.J. et al., "Vitamin C Is an Ideal Substitute for Hydrazine in the Reduction of Graphene Oxide Suspensions," The Journal of Physical Chemistry C, vol. 114, No. 14, Mar. 4, 2010, American Chemical Society, pp. 6426-6432.
Gao, C. et al., "Superior Cycling Performance of SiOx/C Composite with Arrayed Mesoporous Architecture as Anode Material for Lithium-Ion Batteries," Journal of The Electrochemical Society, vol. 161, No. 14, 2014, The Electrochemical Society, pp. A2216-A2221.
Lu, J. et al., "Advanced applications of ionic liquids in polymer science," Progress in Polymer Science, vol. 34, 2009, Elsevier Ltd., pp. 431-448.
Vranes, M. et al., "Physicochemical Characterization of 1-Butyl-3-methylimidazolium and 1-Butyl-1-methylpyrrolidinium Bis{trifluoromethylsulfonyl}imide," Journal of Chemical & Engineering Data, vol. 57, Mar. 7, 2012, American Chemical Society, pp. 1072-1077.
Yan, Jun et al., "High-performance supercapacitor electrodes based on highly corrugated graphene sheets," Carbon, vol. 50, 2012, Elsevier Ltd., pp. 2179-2188.
Non-Final Office Action for U.S. Appl. No. 15/427,210, dated Sep. 3, 2019, 16 pages.
Notice of Allowance for U.S. Appl. No. 15/427,210, dated Dec. 18, 2019, 9 pages.
Office Action for Canadian Patent Application No. 2,862,806, dated Sep. 30, 2019, 3 pages.
Grant of Patent for Korean Patent Application No. 10-2014-7020353, dated Oct. 29, 2019, 3 pages.
Final Office Action for U.S. Appl. No. 15/612,405, dated Dec. 27, 2019, 17 pages.
Final Office Action for U.S. Appl. No. 16/029,930, dated Nov. 15, 2019, 16 pages.
Office Action for Canadian Patent Application No. 2,866,250, dated Dec. 17, 2019, 3 pages.
Examination Report for European Patent Application No. 13757195.6, dated Jan. 29, 2020, 4 pages.
Notice of Preliminary Rejection for Korean Patent Application No. 10-2014-7028084, dated Aug. 22, 2019, 30 pages.
Office Action for Brazilian Patent Application No. 112016029468, dated Jan. 21, 2020, 6 pages.
Third Office Action for Chinese Patent Application No. 201580043429.1, dated Jan. 3, 2020, 20 pages.
Examination Report for European Patent Application No. 15809519.0, dated Dec. 9, 2019, 7 pages.
Office Action for Israeli Patent Application No. 249506, dated Dec. 3, 2019, 8 pages.
Decision of Rejection for Japanese Patent Application No. 2016-573846, dated Oct. 29, 2019, 9 pages.

(56) References Cited

OTHER PUBLICATIONS

Non-Final Office Action for U.S. Appl. No. 14/945,232, dated Sep. 3, 2019, 8 pages.
Notice of Allowance for U.S. Appl. No. 14/945,232, dated Dec. 20, 2019, 9 pages.
Supplemental Notice of Allowability for U.S. Appl. No. 14/945,232, dated Feb. 12, 2020, 5 pages.
Office Action for Brazilian Patent Application No. 112017010257, dated Jan. 28, 2020, 7 pages.
Official Action for Eurasian Patent Application No. 201791078, dated Nov. 6, 2019, 4 pages.
Notification of Reasons for Rejection for Japanese Patent Application No. 2017-526533, dated Aug. 20, 2019, 4 pages.
Non-Final Office Action for U.S. Appl. No. 15/382,871, dated Sep. 16, 2019, 9 pages.
Applicant-Initiated Interview Summary for U.S. Appl. No. 15/382,871, dated Dec. 31, 2019, 5 pages.
Non-Final Office Action for U.S. Appl. No. 16/428,409, dated Sep. 16, 2019, 12 pages.
First Office Action for Chinese Patent Application No. 2016800753323, dated Aug. 27, 2019, 15 pages.
Notice of Allowance and Examiner-Initiated Interview Summary for U.S. Appl. No. 15/410,404, dated Oct. 25, 2019, 11 pages.
Corrected Notice of Allowability for U.S. Appl. No. 15/410,404, dated Dec. 3, 2019, 6 pages.
International Preliminary Report on Patentability for International Patent Application No. PCT/US2018/041728, dated Jan. 23, 2020, 7 pages.
First Office Action for Chinese Patent Application No. 2017800076125, dated Nov. 28, 2019, 20 pages.
Extended European Search Report for European Patent Application No. 17741923.1, dated Nov. 15, 2019, 18 pages.
Notice of Allowance for U.S. Appl. No. 15/472,409, dated Dec. 11, 2019, 11 pages.
Official Action for Eurasian Patent Application No. 201892199, dated Nov. 28, 2019, 6 pages.
Extended European Search Report for European Patent Application No. 17776536.9, dated Oct. 30, 2019, 8 pages.
Final Office Action for U.S. Appl. No. 15/688,342, dated Oct. 17, 2019, 11 pages.
Non-Final Office Action for U.S. Appl. No. 15/630,758, dated Oct. 11, 2019, 11 pages.
Extended European Search Report for European Paetnt Application No. 17816292.1, dated Jan. 7, 2020, 9 pages.
Examination Report for Indian Patent Application No. 201817044642, dated Nov. 26, 2019, 7 pages.
Applicant-Initiated Interview Summary for U.S. Appl. No. 15/466,425, dated Oct. 22, 2019, 3 pages.
Final Office Action for U.S. Appl. No. 15/466,425, dated Jan. 28, 2020, 8 pages.
Official Action for Eurasian Patent Application No. 201892118, dated Nov. 28, 2019, 4 pages.
Xtended European Search Report for European Patent Application No. 17771081.1, dated Oct. 22, 2019, 6 pages.
Notice of Reexamination for Chinese Patent Application No. 201280070343.4, dated Feb. 3, 2020, 7 pages.
Notice of Preliminary Rejection for Korean Patent Application No. 10-2014-7028084, dated Feb. 17, 2020, 5 pages.
Examination Report for Indian Patent Application No. 201617042976, dated Mar. 13, 2020, 7 pages.
Office Action for Mexican Patent Application No. MX/a/2016/016239, dated Feb. 26, 2020, 5 pages.
Supplemental Notice of Allowability for U.S. Appl. No. 14/945,232, dated Feb. 26, 2020, 5 pages.
Notification of Reasons for Rejection for Japanese Patent Application No. 2017-526533, dated Mar. 16, 2020, 7 pages.
Second Office Action for Chinese Patent Application No. 2016800753323, dated Mar. 5, 2020, 15 pages.
Non-Final Office Action for U.S. Appl. No. 16/692,123, dated Dec. 27, 2019, 11 pages.
Non-Final Office Action for U.S. Appl. No. 15/688,342, dated Apr. 9, 2020, 10 pages.
Office Action for Eurasian Patent Application No. 201990587/31, dated Mar. 26, 2020, 4 pages.
Partial Supplemental European Search Report for European Patent Application No. 17847303.9, dated Apr. 3, 2020, 10 pages.
First Office Action for Chinese Patent Application No. 2017800249783, dated Jan. 6, 2020, 15 pages.
Final Office Action for U.S. Appl. No. 15/630,758, dated Apr. 15, 2020, 13 pages.
Author Unknown, "Sulfuric Acid—Density," The Engineering Toolbox, accessed Apr. 10, 2020 at https://www.engineeringtoolbox.com/indsulfuric-acid-density-d_2163.html, 6 pages.
Kang, J.H et al., "Hidden Second Oxidation Step of Hummers Method," Chemistry of Materials, vol. 28, 2016, American Chemical Society, pp. 756-764.
Dubal, D. P., et al., "Hybrid energy storage: the merging of battery and supercapacitor chemistries," Chemical Society Review, vol. 44, No. 7, 2015, pp. 1777-1790.
Garg, R. et al., "Nanowire Mesh Templated Growth of Out-of-Plane Three-Dimensional Fuzzy Graphene," ACS Nano, vol. 11, 2017, American Chemical Society, pp. 6301-6311.
Gong, M., et al., "Ultrafast high-capacity NiZn battery with NiAlCo-layered double hydroxide," Energy & Environmental Science, vol. 7, No. 6, 2014, pp. 2025-2032.
Humble, P. H., et al., "Microscopic nickel-zinc batteries for use in autonomous microsystems," Journal of the Electrochemical Society, vol. 148, No. 12, 2001, pp. A1357-A1361.
Li, Qintao et al., "Carbon nanotubes coated by carbon nanoparticles of turbostratic stacked graphenes," Carbon, vol. 46, 2008, Elsevier Ltd., pp. 434-439.
Mishra, G., et al., "Layered double hydroxides: A brief review from fundamentals to application as evolving biomaterials," Applied Clay Science, vol. 153, 2018, Elsevier B.V., pp. 172-186.
Parker, J. F., et al. "Rechargeable nickel-3D zinc batteries: An energy-dense, safer alternative to lithium-ion," Science, vol. 356, No. 6336, 2017, American Association for the Advancement of Science, pp. 415-418.
Examination Report No. 1 for Australian Patent Application No. 2019250120, dated Apr. 24, 2020, 4 pages.
Non-Final Office Action for U.S. Appl. No. 16/033,266, dated Apr. 29, 2020, 12 pages.
Office Action for Eurasian Patent Application No. 201790003, dated Feb. 26, 2020, 6 pages.
First Office Action and Search Report for Chinese Patent Application No. 201811438766.2, dated Mar. 31, 2020, 32 pages.
Advisory Action for U.S. Appl. No. 15/612,405, dated Jun. 24, 2020, 3 pages.
Notice of Allowance for U.S. Appl. No. 15/612,405, dated Sep. 8, 2020, 7 pages.
Non-Final Office Action for U.S. Appl. No. 16/029,930, dated Jun. 24, 2020, 16 pages.
Notice of Allowance for U.S. Appl. No. 16/223,869, dated Jul. 9, 2020, 9 pages.
Office Action for Vietnamese Patent Application No. 1-2016-05086, dated May 29, 2020, 2 pages.
Decision of Rejection for Chinese Patent Application No. 201580072540.3, dated Apr. 22, 2020, 8 pages.
Official Action for Eurasian Patent Application No. 201791078, dated Jun. 23, 2020, 4 pages.
Examination Report for Indian Patent Application No. 201717016755, dated Jul. 2, 2020, 6 pages.
Final Office Action for U.S. Appl. No. 16/428,409, dated Jun. 23, 2020, 16 pages.
Examination Report for Indian Patent Application No. 201817020826, dated Jul. 13, 2020, 7 pages.
Notice of Allowance for U.S. Appl. No. 16/692,123, dated Jul. 15, 2020, 9 pages.
Examination Report for Indian Patent Application No. 201817023184, dated Aug. 13, 2020, 6 pages.
First Office Action and Search Report for Chinese Patent Application No. 2017800273161, dated Jun. 5, 2020, 15 pages.

(56) References Cited

OTHER PUBLICATIONS

Examination Report for Indian Patent Application No. 201817034180, dated Aug. 13, 2020, 6 pages.
Extended European Search Report for European Patent Application No. 17847303.9, dated Jul. 13, 2020, 9 pages.
Official Notification for Eurasian Patent Application No. 201990068, dated Jun. 23, 2020, 5 pages.
Examination Report for European Patent Application No. 17816292.1, dated Aug. 24, 2020, 4 pages.
Advisory Action for U.S. Appl. No. 15/466,425, dated Jul. 7, 2020, 3 pages.
Non-Final Office Action for U.S. Appl. No. 15/466,425, dated Jul. 28, 2020, 8 pages.
Examination Report for Indian Patent Application No. 201817033309, dated Aug. 28, 2020, 6 pages.
Yang, Wanlu, et al., "Solvothermal One-Step Synthesis of Ni—Al Layered Double Hydroxide/Carbon Nanotube/Reduced Graphene Oxide Sheet Ternary Nanocomposite with Ultrahigh Capacitance for Supercapacitors," Applied Materials and Interfaces, vol. 5, 2013, American Chemical Society, pp. 5443-5454.
Decision of Reexamination for Chinese Patent Application No. 201580072540.3, dated Feb. 2, 2021, 18 pages.
Notification of Reasons for Rejection for Japanese Patent Application No. 2018-532233, dated Dec. 15, 2020, 8 pages.
Examination Report for Australian Patent Application No. 185870, dated Jan. 28, 2021, 5 pages.
Official Notification for Eurasian Patent Application No. 201990068, dated Jan. 14, 2021, 6 pages.
Notice of Preliminary Rejection for Korean Patent Application No. 10-2018-7029515, dated Jan. 21, 2021, 9 pages.
International Search Report and Written Opinion for International Patent Application No. PCT/US2020/052618, dated Feb. 17, 2021, 19 pages.
Gao, Yu et al., "High power supercapcitor electrodes based on flexible TiC-CDC nano-felts," Journal of Power Sources, vol. 201, Issue 1, Mar. 2012, Elsevier B.V., pp. 368-375.
Gao, Lijun et al., "Power Enhancement of an Actively Controlled Battery/Ultracapacitor Hybrid," IEEE Transactions on Power Electronics, vol. 20, Issue 1, Jan. 2005, IEEE, pp. 236-243.
Ghasemi, S. et al., "Enhancement of electron transfer kinetics on a polyaniline-modified electrode in the presence of anionic dopants," Journal of Solid State Electrochemistry, vol. 12, Issue 3, Jul. 28, 2007, Springer-Verlag, pp. 259-268.
Ghidiu, Michael et al., "Conductive two-dimensional titanium carbide 'clay' with high volumetric capacitance," Nature, vol. 516, Dec. 4, 2014, Macmillan Publishers Limited, pp. 78-81.
Gilje, Scott et al., "A Chemical Route to Graphene for Device Applications," Nano Letters, vol. 7, Issue 11, Oct. 18, 2007, American Chemical Society, pp. 3394-3398.
Gilje, Scott et al., "Photothermal Deoxygenation of Graphene Oxide for Patterning and Distributed Ignition Applications," Advanced Materials, vol. 22, Issue 3, Oct. 26, 2009, WILEY-VCH Verlag GmbH & Co. KGaA, Weinheim, Germany, pp. 419-423.
Glavin, M.E. et al., "A Stand-alone Photovoltaic Supercapacitor Battery Hybrid Energy Storage System," Proceedings of the 13th International Power Electronics and Motion Control Conference (EPE-PEMC), Sep. 1-3, 2008, Poznań, Poland, IEEE, pp. 1688-1695.
Gogotsi, Y. et al., "True Performance Metrics in Electrochemical Energy Storage," Science Magazine, vol. 334, Issue 6058, Nov. 18, 2011, 4 pages.
Gracia, J. et al., "Corrugated layered heptazine-based carbon nitride: the lowest energy modifications of $C_3N_4$ ground state," Journal of Materials Chemistry, vol. 19, 2009, pp. 3013-3019.
Griffiths, Katie et al., "Laser-scribed graphene presents an opportunity to print a new generation of disposable electrochemical sensors," Nanoscale, vol. 6, Sep. 22, 2014, The Royal Society of Chemistry, pp. 13613-13622.
Guardia, L. et al., "UV light exposure of aqueous graphene oxide suspensions to promote their direct reduction, formation of graphene-metal nanoparticle hybrids and dye degradation," Carbon, vol. 50, Issue 3, Oct. 12, 2011, Elsevier Ltd., pp. 1014-1024.
Guerrero-Contreras, Jesus et al., "Graphene oxide powders with different oxidation degree, prepared by synthesis variations of the Hummers method," Materials Chemistry and Physics, vol. 153, Mar. 1, 2015, Elsevier B.V., pp. 1-12.
Günes, Fethullah et al., "Layer-by-Layer Doping of Few-Layer Graphene Film," ACS Nano, vol. 4, Issue 8, Jul. 27, 2010, American Chemical Society, pp. 4595-4600.
He, Xinping et al., "A new nanocomposite: Carbon cloth based polyaniline for an electrochemical supercapacitor," Electrochimica Acta, vol. 111, Aug. 17, 2013, Elsevier Ltd., pp. 210-215.
Hu, Liangbing et al., "Symmetrical $MnO_2$—Carbon Nanotube-Textile Nanostructures for Wearable Pseudocapacitors with High Mass Loading," ACS Nano, vol. 5, Issue 11, Sep. 16, 2011, American Chemical Society, pp. 8904-8913.
Huang, Yi et al., "An Overview of the Applications of Graphene-Based Materials in Supercapacitors," Small, vol. 8, Issue 12, Jun. 25, 2012, Wiley-VCH Verlag GmbH & Co. KGaA, Weinheim, pp. 1-30.
Huang, Ming et al., "Self-Assembly of Mesoporous Nanotubes Assembled from Interwoven Ultrathin Birnessite-type $MnO_2$ Nanosheets for Asymmetric Supercapacitors," Scientific Reports, vol. 4, Issue 3878, Jan. 27, 2014, ww.nature.com/scientificreports, pp. 1-8.
Hiwang, Jee Y. et al., "Direct preparation and processing of graphene/RuO2 nanocomposite electrodes for high-performance capacitive energy storage," Nano Energy, vol. 18, Sep. 25, 2015, Elsevier B.V., pp. 57-70.
Jana, Milan et al., "Non-covalent functionalization of reduced graphene oxide using sulfanilic acid azocromotrop and Its application as a supercapacitor electrode material," Journal of Materials Chemistry A, vol. 3, Issue 14, Feb. 24, 2015, The Royal Society of Chemistry, pp. 7323-7331.
Ji, Junyi et al., "Nanoporous $Ni(OH)_2$ Thin Film on 3D Ultrathin-Graphite Foam for Asymmetric Supercapacitor," ACS Nano, vol. 7, Issue 7, Jun. 11, 2013, American Chemical Society, pp. 6237-6243.
Jimbo, "Transistors," Sparkfun, https://learn.sparkfun.com/tutorials/transistors/extending-the-water-analogy, accessed Dec. 14, 2015, SparkFun Electronics, 3 pages.
Jin, H. Y. et al., "Controllable functionalized carbon fabric for high-performance all-carbon-based supercapacitors," RSC Advances, vol. 4, Issue 62, Jul. 15, 2014, The Royal Society of Chemistry, pp. 33022-33028.
Kang, Yu Jin et al., "All-solid-state flexible supercapacitors based on papers coated with carbon nanotubes and ionic-liquid-based gel electrolytes," Nanotechnology, vol. 23, Issue 6, Jan. 17, 2012, IOP Publishing Ltd, pp. 1-6.
Khaligh, Alireza et al., "Battery, Ultracapacitor, Fuel Cell, and Hybrid Energy Storage Systems for Electric, Hybrid Electric, Fuel Cell, and Plug-In Hybrid Electric Vehicles: State of the Art," IEEE Transactions on Vehicular Technology, vol. 59, Issue 6, Jul. 2010, IEEE, pp. 2806-2814.
Khomenko, V. et al., "Optimisation of an asymmetric manganese oxide/activated carbon capacitor working at 2 V in aqueous medium," Journal of Power Sources, vol. 153, Issue 1, Mar. 14, 2005, Elsevier B.V, pp. 183-190.
Kiani, Mohammad Ali et al., "Fabrication of High Power LiNi0.5Mn1.5O4 Battery Cathodes by Nanostructuring of Electrode Materials," RSC Advances, vol. 5, Issue 62, May 26, 2015, The Royal Society of Chemistry, pp. 1-6.
Kiani, M.A. et al., "Size effect investigation on battery performance: Comparison between micro- and nano-particles of 3-$Ni(OH)_2$ as nickel battery cathode material," Journal of Power Sources, vol. 195, Issue 17, Apr. 2, 2010, Elsevier B.V., pp. 5794-5800.
Kiani, M.A. et al., "Synthesis of Nano- and Micro-Particles of $LiMn_2O_4$: Electrochemical Investigation and Assessment as a Cathode in Li Battery," International Journal of Electrochemical Science, vol. 6, Issue 7, Jul. 1, 2011, ESG, pp. 2581-2595.
Kovtyukhova, Nina, I. et al., "Layer-by-Layer Assembly of Ultrathin Composite Films from Micron-Sized Graphite Oxide Sheets and Polycations," Kovtyukhova, et al., Chemistry of Materials, vol. 11, Issue 3, Jan. 28, 1999, American Chemical Society, pp. 771-778.

(56) References Cited

OTHER PUBLICATIONS

Lam, L.T. et al., "Development of ultra-battery for hybrid-electric vehicle applications," Journal of Power Sources, vol. 158, Issue 2, May 2, 2006, Elsevier B.V., pp. 1140-1148.
Lang, Xingyou et al., "Nanoporous metal/oxide hybrid electrodes for electrochemical supercapacitors," Nature Nanotechnology, vol. 6, Apr. 2011, Macmillan Publishers Limited, pp. 232-236.
Lee, Kyu Hyung et al., "Large scale production of highly conductive reduced graphene oxide sheets by a solvent-free low temperature reduction," Carbon, vol. 69, Dec. 16, 2013, Elsevier Ltd., pp. 327-335.
Lee, Kyoung, G. et al., "Sonochemical-assisted synthesis of 3D graphene/nanoparticle foams and their application in supercapacitor," Ultrasonics Sonochemistry, vol. 22, May 2, 2014, Elsevier B.V., pp. 422-428.
Lee, Seung Woo et al., "Carbon Nanotube/Manganese Oxide Ultrathin Film Electrodes for Electrochemical Capacitors," ACS Nano, vol. 4, Issue 7, Jun. 16, 2010, American Chemical Society, pp. 3889-3896.
Lei, Zhibin et al., "Platelet CMK-5 as an Excellent Mesoporous Carbon to Enhance the Pseudocapacitance of Polyaniline," ACS Applied Materials & Interfaces, vol. 5, Issue 15, Jul. 12, 2013, American Chemical Society, pp. 7501-7508.
Li, Dan et al., "Processable aqueous dispersions of graphene nanosheets," Nature Nanotechnology, vol. 3, Feb. 2008, Nature Publishing Group, pp. 101-105.
Li, Lei et al., "Nanocomposite of Polyaniline Nanorods Grown on Graphene Nanoribbons for Highly Capacitive Pseudocapacitors," ACS Applied Materials and Interfaces, vol. 5, Issue 14, Jun. 21, 2013, American Chemical Society, 6 pages.
Li, Peixu et al., "Core-Double-Shell, Carbon Nanotube@Polypyrrole@$MnO_2$ Sponge as Freestanding, Compressible Supercapacitor Electrode," ACS Applied Materials and Interfaces, vol. 6, Issue 7, Mar. 12, 2014, American Chemical Society, pp. 5228-5234.
Li, Qi et al., "Design and Synthesis of $MnO_2$/Mn/$MnO_2$ Sandwich-Structured Nanotube Arrays with High Supercapacitive Performance for Electrochemical Energy Storage," Nano Letters, vol. 12, Issue 7, Jun. 25, 2012, American Chemical Society, pp. 3803-3807.
Li, Yingzhi et al., "Oriented Arrays of Polyaniline Nanorods Grown on Graphite Nanosheets for an Electrochemical Supercapacitor," Langmuir, vol. 29, Issue 1, Dec. 3, 2012, American Chemical Society, 8 pages.
Li, Zhe-Fei et al., "Fabrication of high-surface-area graphene/polyaniline nanocomposites and their application in supercapacitors," ACS Applied Materials & Interfaces, vol. 5, Issue 7, Mar. 12, 2013, American Chemical Society, pp. 1-25
Lin, Jian et al., "3-Dimensional Graphene Carbon Nanotube Carpet-Based Microsupercapacitors with High Electrochemical Performance," Nano Letters, vol. 13, Issue 1, Dec. 13, 2012, American Chemical Society, pp. 72-78.
Linden, David et al., "Handbook of Batteries," McGraw-Hill Handbooks, Third Edition, 2010, New York, The McGraw-Hill Companies, Inc., 1,454 pages.
Liu, Wenwen et al., "Novel and high-performance asymmetric micro-supercapacitors based on graphene quantum dots and polyaniline nanofibers," Nanoscale, vol. 5, Apr. 24, 2013, The Royal Society of Chemistry, pp. 6053-6062.
Liu, Wen-Wen et al., "Superior Micro-Supercapacitors Based on Graphene Quantum Dots," Advanced Functional Materials, vol. 23, Issue 33, Mar. 26, 2013, WILEY-VCH Verlag GmbH & Co. KGaA, Weinheim, pp. 4111-4122.
Liu, Yongfeng et al., "Advanced hydrogen storage alloys for Ni/MH rechargeable batteries," Journal of Materials Chemistry, vol. 21, Issue 11, Dec. 15, 2010, The Royal Society of Chemistry, pp. 4743-4755.
Long, Jeffrey W. et al., "Asymmetric electrochemical capacitors—Stretching the limits of aqueous electrolytes," MRS Bulletin, vol. 36, Jul. 2011, Materials Research Society, pp. 513-522.
Lu, Xihong et al., "Stabilized TiN Nanowire Arrays for High-Performance and Flexible Supercapacitors," Nano Letters, vol. 12, Issue 10, Sep. 4, 2012, American Chemical Society, 6 pages.
Lukatskaya, Maria R. et al., "Cation Intercalation and High Volumetric Capacitance of Two-Dimensional Titanium Carbide," Science, vol. 341, Issue 6153, Sep. 27, 2013, American Association for the Advancement of Science, pp. 1502-1505.
Lukic, Srdjam, M. et al., "Power Management of an Ultracapacitor/Battery Hybrid Energy Storage System in an HEV," IEEE Vehicle Power and Propulsion Conference (VPPC), Sep. 6-8, 2006, IEEE, 6 pages.
Notice of Acceptance for Australian Patent Application No. 2016378400, dated Jul. 30, 2021, 3 pages.
Intention to Grant for European Patent Application No. 16879927.8, dated Jun. 9, 2021, 5 pages.
Notification of Reasons for Rejection for Japanese Patent Application No. 2018-538110, dated Jan. 20, 2021, 9 pages.
Non-Final Office Action for U.S. Appl. No. 16/751,314, dated Jul. 13, 2021, 13 pages.
Examination Report for Australian Patent Application No. 2017245151, dated Mar. 25, 2021, 5 pages.
Second Office Action for Chinese Patent Application No. 2017800273161, dated Apr. 6, 2021, 8 pages.
Official Notification for Eurasion Patent Application No. 20182199, dated Jun. 4, 2021, 12 pages.
Intention to Grant for European Patent Application No. 17776536.9, dated Jul. 2, 2021, 7 pages.
Notification of Reasons for Rejection for Japanese Patent Application No. 2018-550836, dated Feb. 12, 2021, 6 pages.
Notice of Preliminary Rejection for Korean Patent Application No. 10-2018-7030385, dated Mar. 13, 2021, 10 pages.
Written Opinion for Brazilian Patent Application No. 112019004128, dated Jun. 25, 2021, 6 pages.
Request for additional materials for Eurasian Patent Application No. 201990587, dated May 21, 2021, 6 pages.
Notice of Allowance for U.S. Appl. No. 15/630,758, dated May 14, 2021, 11 pages.
Written Opinion for Brazilian Patent Application No. 112018076559, dated Jun. 8, 2021, 6 pages.
Notification of Reasons for Rejection for Japanese Patent Application No. 2018-567030, dated Apr. 5, 2021, 8 pages.
Examination Report for Taiwanese Patent Application No. 106121056, dated Feb. 3, 2021, 10 pages.
Notice of Allowance for U.S. Appl. No. 15/466,425, dated Mar. 10, 2021, 9 pages.
Examination Report for Australian Patent Application No. 2017238201, dated Mar. 17, 2021, 4 pages.
Notification of the Third Office Action for Chinese Patent Application No. 2017800249783, dated May 21, 2021, 8 pages.
Official Notification for Eurasian Patent Application No. 201892118, dated Jun. 18, 2021, 8 pages.
Examination Report for European Patent Application No. 17771081.1, dated Jun. 17, 2021, 4 pages.
Notice of Reasons for Rejection for Japanese Patent Application No. 2018-549538, dated Feb. 15, 2021, 6 pages.
Final Office Action for U.S. Appl. No. 16/004,818, dated Feb. 25, 2021, 24 pages.
Applicant-Initiated Interview Summary for U.S. Appl. No. 16/033,266, dated Apr. 8, 2021, 3 pages.
Notice of Allowance for U.S. Appl. No. 16/033,266, dated Jun. 3, 2021, 9 pages.
Corrected Notice of Allowability for U.S. Appl. No. 16/033,266, dated Jun. 4, 2021, 7 pages.
Partial Supplementary European Search Report for European Patent Application No. 18832324.0, dated Mar. 12, 2021, 15 pages.
Extended European Search Report for European Patent Application No. 18832324.0, dated Jun. 24, 2021, 15 pages.
Notice of Preliminary Rejection for Korean Patent Application No. 10-2017-7000924, dated Aug. 25, 2021, 11 pages.
Applicant-Initiated Interview Summary for U.S. Appl. No. 16/791,517, dated Aug. 27, 2021, 2 pages.
Office Action for Israeli Patent Application No. 260398, dated Jul. 20, 2021, 7 pages.

(56) References Cited

OTHER PUBLICATIONS

Examination Report for Australian Patent Application No. 2017321294, dated Aug. 24, 2021, 2 pages.
Notification of Reasons for Rejection for Japanese Patent Application No. 2019511650, dated Aug. 19, 2021, 13 bages.
Examination Report for Australian Patent Application No. 185870, dated Aug. 20, 2021, 2 pages.
Official Notification for Eurasian Patent Application No. 201990068, dated Aug. 30, 2021, 7 pages.
Non-Final Office Action for U.S. Appl. No. 16/0004,818, dated Sep. 17, 2021, 20 pages.
Examination Report for Indian Patent Application No. 202017002602, dated Sep. 9, 2021, 6 pages.
Notice of Allowance for U.S. Appl. No. 16/029,930, dated Oct. 20, 2021, 7 pages.
Final Office Action for U.S. Appl. No. 16/791,517, dated Oct. 18, 2021, 11 pages.
Office Action for Israeli Patent Application No. 259749, dated Jun. 27, 2021, 6 pages.
Notice of Acceptance for Australian Patent Application No. 2017209117, dated Oct. 6, 2021, 3 pages.
Notification of Decision of Rejection for Japanese Patent Application No. 2018-550836, dated Sep. 10, 2021, 6 pages.
Examination Report for Taiwanese Patent Application No. 106129539, dated Sep. 3, 2021, 10 pages.
Wang, Xu et al., "Manganese Oxide Micro-Supercapacitors with Ultra-high Areal Capacitance," Electronic Supplementary Material (ESI) for Nanoscale, vol. 5, Mar. 21, 2013, The Royal Society of Chemistry, 6 pages.
Wang, Xuebin et al., "Three-dimensional strutted graphene grown by substrate-free sugar blowing for high-power-density supercapacitors," Nature Communications, vol. 4, Issue 2905, Dec. 16, 2013, Macmillan Publishers Limited, pp. 1-8.
Wassei, Jonathan K. et al., "Oh the Places You'll Go with Graphene", Accounts of Chemical Research, Dec. 20, 2012, Vers. 9, 11 pages.
Weng, Zhe et al., "Graphene-Cellulose Paper Flexible Supercapacitors," Advanced Energy Materials, vol. 1, Issue 5, Aug. 10, 2011, WILEY-VCH Verlag GmbH & Co., pp. 917-922.
Wu, Zhong-Shuai et al., "Graphene Anchored with $Co_3O_4$ Nanoparticles as Anode of Lithium Ion Batteries with Enhanced Reversible Capacity and Cyclic Performance," ACS Nano, vol. 4, Issue 6, May 10, 2010, American Chemical Society, pp. 3187-3194.
Xie, Guoxin, "Direct Electrochemical Synthesis of Reduced Graphene Oxide (rGO)/Copper Composite Films and Their Electrical/Electroactive Properties," Applied Materials & Interfaces, vol. 6, Issue 10, May 1, 2014, American Chemical Society, pp. 7444-7455.
Xu, Bin et al., "Sustainable nitrogen-doped porous carbon with high surface areas prepared from gelatin for supercapacitors," Journal of Materials Chemistry, vol. 22, Issue 36, Jul. 25, 2012, The Royal Society of Chemistry, pp. 19088-19093.
Xu, Jing et al., "Flexible Asymmetric Supercapacitors Based upon $Co_9S_8$ Nanorod//$Co_3O_4$@$RuO_2$ Nanosheet Arrays on Carbon Cloth," ACS Nano, vol. 7, Issue 6, May 6, 2013, American Chemical Society, pp. 5453-5462.
Xu, Yuxi et al., "Flexible Solid-State Supercapacitors Based on Three-Dimensional Graphene Hydrogel Films," ACS Nano, vol. 7, Issue 5, Apr. 4, 2013, American Chemical Society, 8 pages.
Xu, Zhanwei et al., "Electrochemical Supercapacitor Electrodes from Sponge-like Graphene Nanoarchitectures with Ultrahigh Power Density," The Journal of Physical Chemistry Letters, vol. 3, Issue 20, Sep. 25, 2012, American Chemical Society, pp. 2928-2933.
Yan, Jun et al., "Fast and reversible surface redox reaction of graphene—MnO2composites as supercapacitor electrodes," Carbon, vol. 48, Issue 13, Jun. 25, 2010, Elsevier Ltd., pp. 3825-3833.
Yan, Jun et al., "Recent Advances in Design and Fabrication of Electrochemical Supercapacitors with High Energy Densities," Advanced Energy Materials, vol. 4, Issue 4, 1300816, Dec. 23, 2013, WILEY-VCH Verlag GmbH & Co., pp. 1-43.
Yang, Xiaowei et al., "Bioinspired Effective Prevention of Restacking in Multilayered Graphene Films: Towards the Next Generation of High-Performance Supercapacitors," Advanced Materials, vol. 23, Issue 25, May 10, 2011, WILEY-VCH Verlag GmbH & Co., pp. 2833-2838.
Yang, Peihua et al., "Low-Cost High-Performance Solid-State Asymmetric Supercapacitors Based on $MnO_2$ Nanowires and $Fe_2O_3$ Nanotubes," Nano Letters, vol. 14, Issue 2, Jan. 1, 2014, American Chemical Society, pp. 731-736.
Yang, Xiaowei et al., "Liquid-Mediated Dense Integration of Graphene Materials for Compact Capacitive Energy Storage," Science, vol. 341, Issue 6145, Aug. 2, 2013, American Association for the Advancement of Science, 5 pages.
Yoo, Eunjoo et al., "Large Reversible Li Storage of Graphene Nanosheet Families for Use in Rechargeable Lithium Ion Batteries," Nano Letters, vol. 8, Issue 8, Jul. 24, 2008, American Chemical Society, pp. 2277-2282.
Yoo, Jung Joon et al., "Ultrathin Planar Graphene Supercapacitors," Nano Letters, vol. 11, Issue 4, Mar. 7, 2011, American Chemical Society, pp. 1423-1427.
Yu, Dingshan et al., "Scalable synthesis of hierarchically structured carbon nanotube-graphene fibres for capacitive energy storage," Nature Nanotechnology, vol. 9, Issue 7, May 11, 2014, Macmillan Publishers Limited, pp. 1-8.
Yu, Guihua et al., "Solution-Processed Graphene/$MnO_2$ Nanostructured Textiles for High-Performance Electrochemical Capacitors," Nano Letters, vol. 11, Issue 7, Jun. 13, 2011, American Chemical Society, pp. 2905-2911.
Yu, Pingping et al., "Graphene-Wrapped Polyaniline Nanowire Arrays on Nitrogen-Doped Carbon Fabric as Novel Flexible Hybrid Electrode Materials for High-Performance Supercapacitor," Langmuir, vol. 30, Issue 18, Apr. 24, 2014, American Chemical Society, pp. 5306-5313.
Yu, Pingping et al., "Polyaniline Nanowire Arrays Aligned on Nitrogen-Doped Carbon Fabric for High-Performance Flexible Supercapacitors," Langmuir, vol. 29, Issue 38, Aug. 28, 2013, American Chemical Society, 8 pages.
Yu, Zenan et al., "Supercapacitor electrode materials: nanostructures from 0 to 3 dimensions," Energy & Environmental Science, vol. 8, Issue 3, Dec. 3, 2014, The Royal Society of Chemistry, pp. 702-730.
Zhang, Jintao et al., "A high-performance asymmetric supercapacitor fabricated with graphene-based electrodes," Energy & Environmental Science, vol. 4, Issue 10, Aug. 2, 2011, The Royal Society of Chemistry, pp. 4009-4015.
Zhang, Li et al., "High Voltage Super-capacitors for Energy Storage Devices Applications," 14th Symposium on Electromagnetic Launch Technology, Jun. 10-13, 2008, IEEE, pp. 1-4.
Zhang, Long et al., "Porous 3D graphene-based bulk materials with exceptional high surface area and excellent conductivity for supercapacitors," Scientific Reports, vol. 3, Issue 1408, Mar. 11, 2013, Nature Publishing Group, pp. 1-9.
Zhang, Yonglai et al., "Direct imprinting of microcircuits on graphene oxides film by femtosecond laser reduction," Nano Today, vol. 5, Issue 1, Jan. 19, 2010, Elsevier Ltd., pp. 15-20.
Zhang, Zheye et al., "Facile Synthesis of 3D $MnO_2$—Graphene and Carbon Nanotube-Graphene Composite Networks for High-Performance, Flexible, All-Solid-State Asymmetric Supercapacitors," Advanced Energy Materials, vol. 4, Issue 10, Jul. 15, 2014, WILEY-VCH Verlag GmbH & Co. KGaA, Weinheim, pp. 1-9.
Zhang, Zhongshen et al., "A New-Type Ordered Mesoporous Carbon/Polyaniline Composites Prepared by a Two-step Nanocasting Method for High Performance Supercapacitor Applications," Journal of Materials Chemistry A, vol. 2, Issue 39, Aug. 13, 2014, Royal Society of Chemistry, pp. 1-25.
Zhao, Xin et al., "Incorporation of Manganese Dioxide within Ultraporous Activated Graphene for High-Performance Electrochemical Capacitors," ACS Nano, vol. 6, Issue 6, May 3, 2012, American Chemical Society, pp. 5404-5412.
Zhi, Mingjia et al., "Nanostructured carbon-metal oxide composite electrodes for supercapacitors: a review," Nanoscale, vol. 5, Issue 1, Oct. 23, 2012,The Royal Society of Chemistry, pp. 72-88.
Zhou, Chuanqiang et al., "Synthesis of Polyaniline Hierarchical Structures in a Dilute SDS/HCl Solution Nanostructure-Covered Rectangular Tubes," Macromolecules, vol. 42, Issue 4, Jan. 27, 2009, American Chemical Society, pp. 1252-1257.

(56) References Cited

OTHER PUBLICATIONS

Zhou, Guangmin et al., "Graphene-Wrapped $Fe_3O_4$ Anode Material with Improved Reversible Capacity and Cyclic Stability for Lithium Ion Batteries," Chemistry of Materials, vol. 22, Issue 18, Aug. 26, 2010, American Chemical Society, pp. 5306-5313.
Zhu, Xianjun et al., "Nanostructured Reduced Graphene Oxide/$Fe_2O_3$ Composite As a High-Performance Anode Material for Lithium Ion Batteries," ACS Nano, vol. 5, Issue 4, Mar. 28, 2011, American Chemical Society, pp. 3333-3338.
Zhu, Yanwu et al., "Carbon-Based Supercapacitors Produced by Activation of Graphene," Science, vol. 332, May 12, 2011, www.sciencemag.org, pp. 1537-1541.
Zoski, Cynthia G., "Handbook of Electrochemistry," First Edition, 2007, Las Cruces, New Mexico, USA, Elsevier B.V., 935 pages.
Non-Final Office Action for U.S. Appl. No. 13/725,073, dated Apr. 15, 2016, 32 pages.
Final Office Action for U.S. Appl. No. 13/725,073, dated Oct. 4, 2016, 38 pages.
First Examination Report for Australian Patent Application No. 2012378149, dated Jul. 28, 2016, 3 pages.
First Office Action for Chinese Patent Application No. 201280070343.4, dated Jul. 23, 2015, 29 pages.
Second Office Action for Chinese Patent Application No. 201280070343.4, dated Apr. 6, 2016, 8 pages.
Third Office Action for Chinese Patent Application No. 201280070343.4, dated Sep. 7, 2016, 25 pages.
Extended European Search Report for European Patent Application No. 12874989.2, dated Jun. 17, 2015, 6 pages.
Notice of Reason for Rejection for Japanese Patent Application No. 2014-548972, dated Feb. 7, 2017, 5 pages.
International Search Report and Written Opinion for PCT/US2012/071407, dated Nov. 12, 2013, 9 pages.
International Preliminary Report on Patentability for PCT/US2012/071407 dated Jul. 3, 2014, 6 pages.
Non-Final Office Action for U.S. Appl. No. 14/382,463, dated Jan. 6, 2017, 23 pages.
Notice of Allowance for U.S. Appl. No. 14/382,463, dated Apr. 6, 2017, 7 pages.
First Examination Report for Australian Patent Application No. 2013230195, dated May 27, 2016, 4 pages.
First Office Action and Search Report for Chinese Patent Application No. 201380023699.7, dated Nov. 21, 2016, 21 pages.
Extended European Search Report for European Patent Application No. 13757195.6, dated Jul. 1, 2015, 9 pages.
Acerce, Muharrem et al., "Metallic 1T phase $MoS_2$ nanosheets as supercapacitor electrode materials," Nature Nanotechnology, vol. 10, Mar. 23, 2015, Macmillan Publishers Limited, pp. 1-6.
Allen, Matthew J. et al., "Honeycomb Carbon: A Review of Graphene," Chemical Reviews, vol. 110, Issue 1, Jul. 17, 2009, American Chemical Society, pp. 132-145.
Augustyn, Veronica et al., "High-rate electrochemical energy storage through $Li^+$ intercalation pseudocapacitance," Nature Materials, vol. 12, Jun. 2013, www.nature.com/naturematerials, Macmillan Publishers Limited, pp. 518-522.
Author Unknown, "125 Volt Transportation Module," Maxwell Technologies, retrieved Apr. 13, 2016, website last modified Mar. 14, 2013, www.maxwell.com/products/ultracapacitors/125v-tranmodules, Maxwell Technologies, Inc., 2 pages. cited by applicant
Author Unknown, "ELTON: Super Capactiors," www.elton-cap.com/, Retrieved Apr. 15, 2016, ELTON, 1 page.
Author Unknown, "ELTON: Products and Technology," https://web.archive.org/web/20160306044847/http:/www.elton-cap.com/products/, dated Mar. 6, 2016, retrieved Mar. 15, 2017, ELTON, 2 pages.
Author Unknown, "Monthly battery sales statistics," Battery Association of Japan (BAJ), retrieved Apr. 13, 2016, website last modified Dec. 2010, web.archive.org/web/20110311224259/http://www.baj.or.jp/e/statistics/02.php, Battery Association of Japan, 1 page.
Author Unknown, "Turnigy Graphene Batteries," Batteries & Accessories, https://hobbyking.com/en_us/batteries-accessories/turnigy-graphene-2.html, retrieved Apr. 3, 2017, HobbyKing, 39 pages.
Arthur, Timothy, S. et al., "Three-dimensional electrodes and battery architectures," MRS Bulletin, vol. 36, Jul. 2011, Materials Research Society, pp. 523-531.
Bai, Ming-Hua et al., "Electrodeposition of vanadium oxide-polyaniline composite nanowire electrodes for high energy density supercapacitors," Journal of Materials Chemistry A, vol. 2, Issue 28, Jan. 29, 2014, The Royal Society of Chemistry, pp. 10882-10888.
Beidaghi, Majid, et al., "Capacitive energy storage in micro-scale devices: recent advances in design and fabrication of micro-supercapacitors," Energy and Environmental Science, vol. 7, Issue 3, Jan. 2, 2014, Royal Society of Chemistry, pp. 867-884.
Beidaghi, Majid et al., "Micro-Supercapacitors Based on Interdigital Electrodes of Reduced Graphene Oxide and Carbon Nanotube Composites with Ultra high Power Handling Performance," Advanced Functional Materials, vol. 22, Issue 21, Nov. 2, 2012, WILEY-VCH Verlag GmbH & Co. KGaA, Weinheim, pp. 4501-4510.
Beidaghi, Majid et al.,"Micro-supercapacitors based on three dimensional interdigital polypyrrole/C-MEMS electrodes," Electrochimica Acta, vol. 56, Issue 25, Oct. 30, 2011, Elsevier Ltd., pp. 9508-9514.
Bélanger, Daniel et al., "Manganese Oxides: Battery Materials Make the Leap to Electrochemical Capacitors," Electrochemical Society Interface, vol. 17, Issue 1, Spring 2008, The Electrochemical Society, pp. 49-52.
Bian, Li-Jun et al., "Self-doped polyaniline on functionalized carbon cloth as electroactive materials for supercapacitor," Electrochimica Acta, vol. 64, Dec. 29, 2011, Elsevier Ltd., pp. 17-22.
Bouville, Florian et al., "Strong, tough and stiff bioinspired ceramics from brittle constituents," Nature Materials, vol. 13, Issue 5, Mar. 23, 2014, Macmillan Publishers Limited, pp. 1-7.
Brain, Marshall et al., "How Batteries Work," Battery Arrangement and Power - HowStuffWorks, http://electronics.howstuffworks.com/everyday-tech/battery6.htm/printable, accessed Dec. 14, 2015, HowStuffWorks, 4 pages.
Brodie, B.C., "Ueber das Atomgewicht des Graphits," Justus Liebigs Annalen der Chemie, vol. 114, Issue 1, 1860, WILEY-VCH Verlag GmbH & Co. KGaA, Weinheim, pp. 6-24.
Burke, Andrew, "R&D considerations for the performance and application of electrochemical capacitors," Electrochimica Acta, vol. 53, Jan. 26, 2007, Elsevier Ltd., pp. 1083-1091.
Cao, Liujun et al., "Direct Laser-Patterned Micro-Supercapacitors from Paintable $MoS_2$ Films," Small, vol. 9, Issue 17, Apr. 16, 2013, WILEY-VCH Verlag GmbH & Co. KGaA, Weinheim, pp. 2905-2910.
Chan, Candace K. et al., "High-performance lithium battery anodes using silicon nanowires," Nature Nanotechnology, vol. 3, Issue 1, Jan. 2008, Nature Publishing Group, pp. 31-35.
Chen, Cheng-Meng et al., "Macroporous 'bubble' graphene film via template directed ordered-assembly for high rate supercapacitors," Chemical Communications, vol. 48, Issue 57, May 15, 2012, The Royal Society of Chemistry, pp. 1-3.
Chen, Ji et al., "High-yield preparation of graphene oxide from small graphite flakes via an improved Hummers method with a simple purification process," Carbon, vol. 81, Jan. 2015, Elsevier Ltd., pp. 1-9.
Chen, L. Y. et al., "Toward the Theoretical Capacitance of RuO, Reinforced by Highly Conductive Nanoporous Gold," Advanced Energy Materials, vol. 3, Issue 7, Jul. 2014, WILEY-VCH Verlag GmbH & Co. KGaA, Weinheim, pp. 851-856.
Chen, Wei et al., "High-Performance Nanostructured Supercapacitors on a Sponge," Nano Letters, vol. 11, Issue 12, Sep. 16, 2011, American Chemical Society, 22 pages.
Chen, Zongping et al., "Three-dimensional flexible and conductive interconnected graphene networks grown by chemical vapour deposition," Nature Materials, vol. 10, Issue 6, Jun. 2011, Macmillan Publishers Limited, pp. 424-428.
Cheng, Yingwen et al., "Synergistic Effects from Graphene and Carbon Nanotubes EnableFlexible and Robust Electrodes for High-PerformanceSupercapacitors," Nano Letters, vol. 12, Issue 8, Jul. 23, 2012, American Chemical Society, pp. 4206-4211.

(56) References Cited

OTHER PUBLICATIONS

Chi, Kai et al., "Freestanding Graphene Paper Supported Three-Dimensional Porous Graphene-Polyaniline Nanocomposite Synthesized by Inkjet Printing and in Flexible All-Solid-State Supercapacitor," ACS Applied Materials & Interfaces. vol. 6, Issue 18, Sep. 10, 2014, American Chemical Society, 8 pages.

Chmiola, John et al., "Monolithic Carbide-Derived Carbon Films for Micro-Supercapacitors," Science, vol. 328, Issue 5977, Apr. 2010, American Association for the Advancement of Science, 4 pages.

Choi, Bong Gill et al., "3D Macroporous Graphene Frameworks for Supercapacitors with High Energy and Power Densities," ACS Nano, vol. 6, Issue 5, Apr. 23, 2012, American Chemical Society, pp. 4020-4028.

Cooper, A. et al., "The UltraBattery—A new battery design for a new beginning in hybrid electric vehicle energy storage," Journal of Power Sources, vol. 188, Issue 2, Dec. 6, 2008, Elsevier B.V. pp. 642-649.

Deville, Sylvain, "Freeze-Casting of Porous Ceramics: A Review of Current Achievements and Issues," Advanced Engineering Materials, vol. 10, Issue 3, Mar. 20, 2008, WILEY-VCH Verlag GmbH & Co., pp. 155-169.

Deville, Sylvain, "Metastable and unstable cellular solidification of colloidal suspensions," Nature Materials, vol. 8, Dec. 2009, Macmillan Publishers Limited, pp. 966-972.

De Volder, Michaël et al., "Corrugated Carbon Nanotube Microstructures with Geometrically Tunable Compliance," ACS Nano, vol. 5, Issue 9, Aug. 1, 2011, pp. 7310-7317.

Dunn, Bruce et al., "Electrical Energy Storage for the Grid: A Battery of Choices," Science, vol. 334, Issue 928, Nov. 18, 2011, American Association for the Advancement of Science, pp. 928-935.

Eda, Goki et al., "Chemically Derived Graphene Oxide: Towards Large-Area Thin-Film Electronics and Optoelectronics," Advanced Materials, vol. 22, Issue 22, Apr. 28, 2010, WILEY-VCH Verlag GmbH & Co., pp. 2392-2415.

El-Kady, Maher F. et al., "Engineering Three-Dimensional Hybrid Supercapacitors and Micro-Supercapacitors for High-Performance Integrated Energy Storage," Proceedings of the National Academy of Sciences of the United States of America, vol. 112, Issue 14, Apr. 7, 2015, National Academy of Sciences, pp. 4233-4238.

El-Kady, Maher F. et al., "Laser Scribing of High-Performance and Flexible Graphene-Based Electrochemical Capacitors," Science Magazine, Mar. 16, 2012, vol. 335, No. 6074, 6 pages.

El-Kady, Maher F. et al., "Laser Scribing of High-Performance and Flexibile Graphene-Based Electrochemical Capacitors," Science, vol. 335, Issue 6074, Mar. 16, 2012, www.sciencemag.org/cgi/content/full/335/6074/1326/DC1, American Association for the Advancement of Science, 25 pages.

El-Kady, Maher F. et al., "Scalable Fabrication of High-Power Graphene Micro-Supercapacitors for Flexible and On-Chip Energy Storage," Nature Communications, vol. 4, Issue 1475, Feb. 12, 2013, Macmillan Publishers Limited, pp. 1-9.

El-Kady, Maher F. et al., "Supplementary Information: Scalable Fabrication of High-Power Graphene Micro-Supercapacitors for Flexible and On-Chip Energy Storage", Nature Communications, Submitted for Publication Oct. 1, 2012, 23 pages.

Fan, Zhuangjun et al., "Asymmetric Supercapacitors Based on Graphene/$MnO_2$ and Activated Carbon Nanofiber Electrodes with High Power and Energy Density," Advanced Functional Materials, vol. 21, Issue 12, Jun. 21, 2011, WILEY-VCH Verlag GmbH & Co. KGaA, Weinheim, pp. 2366-2375.

Feng, Jun et al., "Metallic Few-Layered $VS_2$ Ultrathin Nanosheets: High Two-Dimensional Conductivity for In-Plane Supercapacitors," Journal of the American Chemical Society, vol. 133, Issue 44, Sep. 27, 2011, American Chemical Society, pp. 17832-17838.

Fischer, Anne E. et al., "Incorporation of Homogeneous, Nanoscale $MnO_2$ within Ultraporous Carbon Structures via Self-Limiting Electroless Deposition: Implications for Electrochemical Capacitors," Nano Letters, vol. 7, Issue 2, Jan. 13, 2007, American Chemical Society, pp. 281-286.

Foo, Ce Yao et al., "Flexible and Highly Scalable $V_2O_5$-rGO Electrodes in an Organic Electrolyte for Supercapacitor Devices," Advanced Energy Materials, vol. 4, Issue 12, Aug. 26, 2014, WILEY-VCH Verlag GmbH & Co. KGaA, Weinheim, pp. 1-7.

Gan, Shiyu et al., "Spontaneous and Fast Growth of Large-Area Graphene Nanofilms Facilitated by Oil/Water Interfaces," Advanced Materials, vol. 24, Issue 29, Jun. 12, 2012, WILEY-VCH Verlag GmbH & Co, pp. 3958-3964.

Gao, Wei et al., "Direct laser writing of micro-supercapacitors on hydrated graphite oxide films," Nature Nanotechnology, vol. 6, Issue 8, Jul. 2011, Macmillan Publishers Limited, p. 496-500.

Gao, Wei et al., "Direct laser writing of micro-supercapacitors on hydrated graphite oxide films," Supplementary Information, Nature Nanotechnology, vol. 6, Issue 8, Jul. 2011, Macmillan Publishers Limited, 15 pages.

Gao, Hongcai et al., "Flexible All-Solid-State Asymmetric Supercapacitors Based on Free-Standing Carbon Nanotube/Graphene and $Mn_3O_4$ Nanoparticle/Graphene Paper Electrodes," Applied Materials & Interfaces, vol. 4, Issue 12, Nov. 20, 2012, American Chemical Society, pp. 7020-7026.

Gao, Hongcai et al., "High-Performance Asymmetric Supercapacitor Based on Graphene Hydrogel and Nanostructured $MnO_2$," ACS Applied Materials and Interfaces, vol. 4, Issue 5, Apr. 30, 2012, American Chemical Society, pp. 2801-2810.

Notice of Allowance for U.S. Appl. No. 17/080,352, dated Aug. 17, 2022, 8 pages.

Written Decision on Registration for Korean Patent Application No. 10-2017-7000924, dated Jun. 21, 2022, 9 pages.

Office Action for Israeli Patent Application No. 252320, dated Jun. 13, 2022, 15 pages.

Office Action for Mexican Patent Application No. MX/a/2017/006315, dated Jun. 3, 2022, 5 pages.

Office Action for Brazilian Patent Application No. 112018068945, dated Jun. 23, 2022, 6 pages.

Decision to Grant for Japanese Patent Application No. 2019-511650, dated Jun. 24, 2022, 6 pages.

Office Action for Brazilian Patent Application No. 112018069339, dated Jun. 23, 2022, 6 pages.

Notification of Reasons for Rejection for Japanese Patent Application No. 2019-568633, dated May 31, 2022, 6 pages.

Notice of Preliminary Rejection for Korean Patent Application No. 10-2020-7000725, dated Jun. 3, 2022, 14 pages.

Second Office Action for Chinese Patent Application No. 2018800459108, dated Jun. 27, 2022, 7 pages.

Notification of Reasons for Rejection for Japanese Patent Application No. 2020-500741, dated Jun. 23, 2022, 12 pages.

Notice of Preliminary Rejection for Korean Patent Application No. 10-2020-7001506, dated Jul. 27, 2022, 11 pages.

Author Unknown, "Sulfuric Acid—Density," The Engineering ToolBox, www.engineeringtoolbox.com/indsulfuric-acid-density-d_2163.html, accessed Oct. 2, 2020, 3 pages.

Wikipedia, "Ferromagnetism," Feb. 13, 2017, Retrieved Aug. 7, 2018 from https://en.wikipedia.org/w/index.php?title=Ferromagnetism &oldid=765289868, 1 page.

Grosu, Yaroslav et al., "Natural Magnetite for thermal energy storage: Excellent thermophysical properties, reversible latent heat transition and controlled thermal conductivity," Solar Energy Materials & Solar Cells, vol. 161, Available online Dec. 6, 2016, Elsevier B.V., pp. 170-176.

Hwang, J. Y., et al., "Boosting the Capacitance and Voltage of Aqueous Supercapacitors via Redox Charge Contribution from both Electrode and Electrolyte," Nano Today, vol. 15, Available online Jul. 22, 2017, pp. 15-25.

Karami, Hassan et al., "Sodium Sulfate Effects on the Electrochemical Behaviors of Nanostructured Lead Dioxide and Commercial Positive Plates of Lead-Acid Batteries," International Journal of Electrochemical Science, vol. 5, 2010, ESG, pp. 1046-1059.

Lee, Juhan, et al., "High Performance Hybrid Energy Storage with Potassium Ferricyanide Redox Electrolyte," Applications of Materials and Interfaces, vol. 8, Aug. 2016, ACS, pp. 23676-23687.

(56) References Cited

OTHER PUBLICATIONS

Zhang, Luojiang, et al., "3D porous layered double hydroxides grown on graphene as advanced electrochemical pseudocapacitor materials," Journal of Materials Chemistry A, vol. 1, 2013, pp. 9046-9053.
Non-Final Office Action for U.S. Appl. No. 16/791,504, dated Nov. 18, 2020, 16 pages.
Reexamination Decision for Chinese Patent Application No. 201280070343.4, dated Aug. 31, 2020, 19 pages.
Notice of Allowance for U.S. Appl. No. 15/612,405, dated Dec. 17, 2020, 8 pages.
Non-Final Office Action for U.S. Appl. No. 16/029,930, dated Jan. 6, 2021, 15 pages.
Second Office Action for Chinese Patent Application No. 201811438766. 2, dated Oct. 28, 2020, 10 pages.
Notice of Allowability for U.S. Appl. No. 16/223,869, dated Sep. 15, 2020, 5 pages.
Notice of Acceptance for Australian Patent Application No. 2019250120, dated Nov. 11, 2020, 3 pages.
Notification of Reexamination for Chinese Patent Application No. 2015800725403, dated Oct. 12, 2020, 9 pages.
Office Action for Israeli Patent Application No. 252320, dated Sep. 17, 2020, 11 pages.
Notification of Decision of Rejection for Japanese Patent Application No. 2017-526533, dated Nov. 17, 2020, 6 pages.
Non-Final Office Action for U.S. Appl. No. 16/428,409, dated Oct. 1, 2020, 14 pages.
Examination Report for Australian Patent Application No. 2016378400, dated Sep. 22, 2020, 5 pages.
Examination Report for Taiwanese Patent Application No. 105142233, dated Sep. 25, 2020, 19 pages.
Applicant-Initiated Interview Summary for U.S. Appl. No. 15/410,404, dated Aug. 2, 2019, 3 pages.
Notice of Allowance for U.S. Appl. No. 16/692,123, dated Oct. 21, 2020, 8 pages.
Examination Report for Australian Patent Application No. 2017209117, dated Oct. 5, 2020, 5 pages.
Official Notification for Eurasion U.S. Appl. No. 20/182,199, dated Dec. 11, 2020, 6 pages.
Non-Final Office Action for U.S. Appl. No. 15/630,758, mailed Oct. 1, 2020, 14 pages.
Examination Report for Taiwanese Patent Application No. 106111115, dated Aug. 25, 2020, 17 pages.
Notification of the Second Office Action for Chinese Patent Application No. 2017800249783, dated Dec. 2, 2020, 9 pages.
Official Action for Eurasion Patent Application No. 201892118, dated Dec. 11, 2020, 6 pages.
Examination Report for Taiwanese Patent Application No. 106109733, dated Oct. 20, 2020, 11 pages.
Invitation To Pay Additional Fees for International Patent Application No. PCT/US2018/036846, dated Aug. 24, 2018, 2 pages.
International Search Report and Written Opinion for International Patent Application No. PCT/US2018/036846, dated Nov. 9, 2018, 14 pages.
International Preliminary Report on Patentability for International Patent Application No. PCT/US2018/036846, dated Dec. 26, 2019, 10 pages.
Non-Final Office Action for U.S. Appl. No. 16/0004,818, dated Jun. 24, 2020, 18 pages.
Final Office Action for U.S. Appl. No. 16/033,266, dated Jan. 6, 2021, 10 pages.
Notice of Allowance and Examiner-Initiated Interview Summary for U.S. Appl. No. 16/784,578, dated Oct. 15, 2020, 9 pages.
Invitation to Pay Additional Fees and Partial Search for International Patent Application No. PCT/US2020/052618, dated Nov. 30, 2020, 2 pages.
An, et al., "Fabrication of graphene/polypyrrole nanotube/MnO2 nanotube composite and its supercapacitor application," European Physical Journal, Applied Physics, vol. 58, 2012, 9 pages.

Gu, et al., "Synthesis of polyaniline nanotubes with controlled rectangular or square pore shape," Materials Letters, vol. 121, 2014, pp. 12-14.
Lin, Jian, et al., "Laser-induced porous graphene films from commercial polymers," Nature Communications, Dec. 2014, 8 pages.
Liu, Jianhua, et al., "Synthesis of a Graphene-Polypyrrole Nanotube Composite and Its Application in Supercapacitor Electrode," Journal of The Electrochemical Society, vol. 159, Issue 6, Apr. 2012, 6 pages.
Shao, et al., "3D Freeze-Casting of Cellular Graphene Films for Ultrahigh-Power-Density Supercapacitors," Advanced Materials, vol. 28, 2016, 8 pages.
Wang, et al., "Polyaniline nanotube arrays as high-performance flexible electrodes for electrochemical energy storage devices," Journal of Materials Chemistry, vol. 22, 2012, pp. 2401-2404.
Final Office Action for U.S. Appl. No. 16/791,504, dated May 27, 2021, 16 pages.
Office Action for Canadian Patent Application No. 2,952,233, dated Jun. 29, 2021, 4 pages.
Office Action for Eurasian Patent Application No. 201790003, dated May 20, 2021, 7 pages.
Notice of Reasons for Refusal for Japanese Patent Application No. 2020-034093, dated Jun. 1, 2021, 10 pages.
Non-Final Office Action for U.S. Appl. No. 16/791,517, dated Apr. 1, 2021, 16 pages.
Examination Report for European Patent Application No. 15861794. 4, dated Apr. 14, 2021, 4 pages.
Applicant-Initiated Interview Summary for U.S. Appl. No. 16/428,409, dated Mar. 19, 2021, 2 pages.
Notice of Allowance for U.S. Appl. No. 16/428,409, dated May 14, 2021, 10 pages.
Notice of Allowance for U.S. Appl. No. 15/319,286, dated Oct. 1, 2018, 8 pages.
Corrected Notice of Allowability for U.S. Appl. No. 15/319,286, dated Oct. 29, 2018, 5 pages.
Corrected Notice of Allowability for U.S. Appl. No. 15/319,286, dated Nov. 30, 2018, 5 pages.
Corrected Notice of Allowability for U.S. Appl. No. 15/319,286, dated Jan. 18, 2019, 5 pages.
Notification of the First Office Action for Chinese Patent Application No. 201580043429.1, dated Oct. 29, 2018, 19 pages.
Advisory Action for U.S. Appl. No. 14/945,232, dated Oct. 15, 2018, 3 pages.
Non-Final Office Action for U.S. Appl. No. 14/945,232, dated Jan. 9, 2019, 7 pages.
Extended European Search Report for European Patent Application No. 15861794.4, dated Oct. 2, 2018, 13 pages.
Final Office Action for U.S. Appl. No. 15/382,871, dated Jan. 25, 2019, 16 pages.
Non-Final Office Action for U.S. Appl. No. 15/410,404, dated Sep. 27, 2018, 9 pages.
Final Office Action for U.S. Appl. No. 15/472,409, dated Jan. 18, 2019, 12 pages.
International Preliminary Report on Patentability for International Patent Application No. PCT/US2017/024716, dated Oct. 11, 2018, 10 pages.
International Preliminary Report on Patentability for International Patent Application No. PCT/US2017/038992, dated Jan. 3, 2019, 10 pages.
International Preliminary Report on Patentability for International Patent Application No. PCT/US2017/023632, dated Oct. 4, 2018, 8 pages.
Invitation to Pay Additional Fees for International Patent Application No. PCT/US2018/041728, dated Sep. 12, 2018, 2 pages.
International Search Report and Written Opinion for International Patent Application No. PCT/US2018/041728, dated Nov. 9, 2018, 10 pages.
Huang, L. et al., "Pulsed laser assisted reduction of graphene oxide," Carbon, vol. 49, 2011, Elsevier, pp. 2431-2436.
Kumar, P. et al., "Graphene produced by radiation-induced reduction of graphene oxide," Sep. 26, 2010, DOI: DOI:10.1142/ S0219581X11008824, 23 pages.

(56) References Cited

OTHER PUBLICATIONS

Park, S. et al., "Colloidal Suspensions of Highly Reduced Graphene Oxide in a Wide Variety of Organic Solvents," Nano Letters, vol. 9, No. 4, 2009, American Chemical Society, pp. 1593-1597.
Non-Final Office Action for U.S. Appl. No. 15/427,210, dated Feb. 28, 2019, 17 pages.
Applicant-Initiated Interview Summary for U.S. Appl. No. 15/427,210, dated May 29, 2019, 3 pages.
Notice of Reexamination for Chinese Patent Application No. 201280070343.4, dated Jun. 27, 2019, 14 pages.
Examination Report for European Patent Application No. 12874989.2, dated Mar. 5, 2019, 5 pages.
Notice of Preliminary Rejection for Korean Patent Application No. 10-2014-7020353, dated Apr. 15, 2019, 11 pages.
Non-Final Office Action for U.S. Appl. No. 15/612,405, dated Jun. 18, 2019, 12 pages.
Non-Final Office Action for U.S. Appl. No. 16/029,930, dated Apr. 3, 2019, 13 pages.
Examination Report No. 1 for Australian Patent Application No. 2015277264, dated Mar. 7, 2019, 4 pages.
Notification of the Second Office Action for Chinese Patent Application No. 201580043429.1, dated Jun. 20, 2019, 9 pages.
Notice of Reasons for Rejection for Japanese Patent Application No. 2016-573846, dated Feb. 26, 2019, 8 pages.
Search Report for Japanese Patent Application No. 2016-573846, dated Feb. 28, 2019, 44 pages.
Interview Summary for U.S. Appl. No. 14/945,232, dated Apr. 11, 2019, 3 pages.
Final Office Action for U.S. Appl. No. 14/945,232, dated Jul. 17, 2019, 8 pages.
Examination Report No. 1 for Australian Patent Application No. 2015349949, dated Mar. 8, 2019, 4 pages.
Notice of Acceptance for Australian Patent Application No. 2015349949, dated Jul. 12, 2019, 3 pages.
Notification of the Second Office Action for Chinese Patent Application No. 201580072540.3, dated Mar. 7, 2019, 12 pages.
Official Action for Eurasian Patent Application No. 201791078, dated Mar. 27, 2019, 5 pages.
Interview Summary for U.S. Appl. No. 15/382,871, dated Apr. 1, 2019, 10 pages.
Advisory Action for U.S. Appl. No. 15/382,871, dated Apr. 24, 2019, 3 pages.
Notice of Allowance for U.S. Appl. No. 15/382,871, dated May 17, 2019, 10 pages.
Extended European Search Report for European Patent Application No. 16879927.8, dated Jul. 9, 2019, 14 pages.
Final Office Action for U.S. Appl. No. 15/410,404, dated Feb. 21, 2019, 9 pages.
Non-Final Office Action for U.S. Appl. No. 15/410,404, dated May 24, 2019, 9 pages.
Applicant-Initiated Interview Summary for U.S. Appl. No. 16/029,930, dated Jul. 29, 2019, 4 pages.
Partial Supplementary European Search Report for European Patent Application No. 17741923.1, dated Jul. 23, 2019, 13 pages.
Non-Final Office Action for U.S. Appl. No. 15/472,409, dated May 31, 2019, 12 pages.
Non-Final Office Action for U.S. Appl. No. 15/688,342, dated Mar. 26, 2019, 9 pages.
International Preliminary Report on Patentability for International Patent Application No. PCT/US2017/048883, dated Mar. 14, 2019, 7 pages.
Non-Final Office Action for U.S. Appl. No. 15/466,425, dated Jul. 10, 2019, 8 pages.
Notification of the Third Office Action for Chinese Patent Application No. 201580072540.3, dated Jul. 17, 2019, 9 pages.
Intention to Grant for European Patent Application No. 13757195.6, dated Jun. 1, 2022, 7 pages.
Technical Report for Brazilian Patent Application No. 112016029468, dated Apr. 29, 2022, 16 pages.
Notification of the First Office Action for Chinese Patent Application No. 202110481254X, dated Apr. 2, 2022, 23 pages.
Intention to Grant for European Patent Application No. 15861794.4, dated May 25, 2022, 7 pages.
Notice of Allowance for Israeli Patent Application No. 260398, dated May 22, 2022, 3 pages.
Chen, Da, et al., "Graphene-based materials in electrochemistry," Chemical Society Reviews, vol. 39, Issue 8, Jun. 2010, 24 pages.
Paik, Pradip, et al., "Polyaniline nanotubes with rectangular-hollow-core- and its self-assembled surface decoration: high conductivity and dielectric properties," RSC Advances, vol. 4, Issue 24, 2014, pp. 12342-12352.
Patil, Dipali, et al., "Investigations on silver/polyaniline electrodes for electrochemical supercapacitors," Physical Chemistry Chemical Physics, vol. 14, 2012, pp. 11886-11895.
Shao, et al., "Fabrication of polyaniline nanowire/TiO2 nanotube array electrode for supercapacitors," Energy, vol. 87, 2015, Elsevier Ltd., pp. 578-585.
Non-Final Office Action for U.S. Appl. No. 16/791,504, dated Dec. 7, 2021, 14 pages.
Summons to Attend Oral Proceedings for European Patent Application No. 13757195.6, mailed Oct. 13, 2021, 6 pages.
Office Action for Canadian Patent Application No. 2952233, dated Jan. 6, 2022, 4 pages.
Office Action for Eurasian Patent Application No. 201790003, dated Dec. 9, 2021, 5 pages.
Examination Report for European Patent Application No. 15809519.0, dated Oct. 12, 2021, 5 pages.
Decision to Grant for Japanese Patent Application No. 2020-034093, dated Feb. 8, 2022, 5 pages.
Examination Report for Canadian Patent Application No. 2968139, dated Oct. 6, 2021, 5 pages.
Notice of Preliminary Rejection for Korean Patent Application No. 10-2017-7015753, dated Nov. 17, 2021, 9 pages.
Office Action for Vietnamese Patent Application No. 1-2017-01911, dated Oct. 7, 2021, 3 pages.
Notification of Reasons for Rejection for Japanese Patent Application No. 2018-532233, dated Oct. 26, 2021, 6 pages.
Examination Report for European Patent Application No. 17741923.1, dated Oct. 22, 2021, 5 pages.
Notification of Reasons for Rejection for Japanese Patent Application No. 2018-538110, dated Oct. 29, 2021, 12 pages.
Final Office Action for U.S. Appl. No. 16/751,314, dated Jan. 19, 2022, 19 pages.
Examination Report for Australian Patent Application No. 2017245151, dated Nov. 2, 2021, 5 pages.
Third Office Action for Chinese Patent Application No. 2017800273161, dated Nov. 2, 2021, 17 pages.
Office Action for Israeli Patent Application No. 261928, dated Oct. 12, 2021, 6 pages.
Notice of Allowance for Korean Patent Application No. 10-2018-7030385, dated Jan. 27, 2022, 5 pages.
Notice of Acceptance for Australian Patent Application No. 2017321294, dated Nov. 30, 2021, 3 pages.
First Office Action for Chinese Patent Application No. 201780063416.X, dated Sep. 1, 2021, 14 pages.
Office Action for Eurasian Patent Application No. 201990587, dated Dec. 10, 2021, 4 pages.
Examination Report for European Patent Application No. 17847303.9, dated Jan. 26, 2022, 6 pages.
Notice of Acceptance for Australian Patent Application No. 2017281543, dated Nov. 9, 2021, 3 pages.
First Office Action for Chinese Patent Application No. 2017800441862, dated Dec. 10, 2021, 17 pages.
Office Action for Israeli Patent Application No. 263442, dated Sep. 30, 2021, 8 pages.
Hearing Notice for Indian Patent Application No. 201817044642, dated Dec. 27, 2021, 2 pages.
Hearing Notice for Indian Patent Application No. 201817044642, mailed Jan. 18, 2022, 2 pages.
Hearing Notice for Indian Patent Application No. 201817044642, mailed Feb. 18, 2022, 2 pages.

(56) References Cited

OTHER PUBLICATIONS

Office Action for Korean Patent Application No. 10-2019-7001932, dated Oct. 25, 2021, 5 pages.
Notice of Acceptance for Australian Patent Application No. 2017238201, dated Jan. 14, 2022, 3 pages.
Office Action for Israeli Patent Application No. 261620, dated Aug. 31, 2021, 6 pages.
Grant of Patent for Korean Patent Application No. 10-2018-7029515, dated Nov. 25, 2021, 4 pages.
Final Office Action for U.S. Appl. No. 16/004,818, dated Feb. 2, 2022, 21 pages.
First Office Action for Chinese Patent Application No. 2018800459108, dated Oct. 29, 2021, 18 pages.
Non-Final Office Action for U.S. Appl. No. 17/332,008, dated Apr. 20, 2023, 8 pages.
Decision to Grant for Japanese Patent Application No. 2020-500741, dated Apr. 5, 2023, 5 pages.
Intention to Grant for European Patent Application No. 18818264.6, dated Mar. 10, 2023, 9 pages.
Non-Final Office Action for U.S. Appl. No. 16/004,818, dated Mar. 14, 2023, 22 pages.
Office Action for Brazilian Patent Application No. 112018068945, dated Apr. 4, 2023, 4 pages.
Examination Report for Canadian Patent Application No. 3017238, dated Mar. 31, 2023, 4 pages.
Notification of Reasons for Rejection for Japanese Patent Application No. 2022-001425, dated Mar. 10, 2023, 6 pages.
Notice of Allowance for U.S. Appl. No. 17/112,384, dated Jun. 2, 2023, 9 pages.
Technical Examination Report for Brazilian Patent Application No. 112019004128, dated Mar. 17, 2023, 7 pages.
Technical Report for Brazilian Patent Application No. 112016029468, dated Nov. 16, 2022, 8 pages.
Final Office Action for U.S. Appl. No. 16/791,517, dated Feb. 13, 2023, 12 pages.
Office Action for Canadian Patent Application No. 3006997, dated Dec. 16, 2022, 6 pages.
Non-Final Office Action for U.S. Appl. No. 17/110,397, dated Jan. 24, 2023, 9 pages.
Notice Before Allowance for Israeli Patent Application No. 263442, dated Jan. 10, 2023, 3 pages.
Final Office Action for U.S. Appl. No. 17/388,082, dated Apr. 27, 2023, 8 pages.
Office Action for Canadian Patent Application No. 3009208, dated Feb. 13, 2023, 5 pages.
Notice of Preliminary Rejection for Korean Patent Application No. 10-2018-7022104, dated Mar. 2, 2023, 11 pages.
Notice of Allowability for U.S. Appl. No. 17/080,352, dated Nov. 18, 2022, 4 pages.
Notice of Allowability for U.S. Appl. No. 17/080,352, dated Dec. 7, 2022, 4 pages.
Reasons for the Rejection for Taiwanese Patent Application No. 106129539, dated Oct. 6, 2022, 7 pages.
Written Decision on Registration for Korean Patent Application No. 10-2017-7015753, dated Sep. 19, 2022, 7 pages.
Decision to Grant for Japanese Patent Application No. 2018-532233, dated Oct. 4, 2022, 6 pages.
Notice of Allowance for Taiwanese Patent Application No. 106102134, dated Oct. 14, 2022, 3 pages.
Non-Final Office Action for U.S. Appl. No. 17/112,384, dated Nov. 3, 2022, 9 pages.
Office Action for Israeli Patent Application No. 264868, dated Sep. 29, 2022, 6 pages.
Office Action for Canadian Patent Application No. 3018568, dated Sep. 22, 2022, 4 pages.
Notification of Decision of Rejection for Japanese Patent Application No. 2021-041173, dated Jan. 5, 2023, 6 pages.
First Office Action for Chinese Patent Application No. 2018800466506, dated Dec. 19, 2022, 17 pages.
Office Action for Canadian Patent Application No. 2952233, dated Aug. 3, 2022, 4 pages.
Technical Examination Report for Brazilian Patent Application No. 112017010257-9, dated Aug. 9, 2022, 7 pages.
Non-Final Office Action for U.S. Appl. No. 17/388,082, dated Oct. 4, 2022, 13 pages.
Notice of Allowance for Israeli Patent Application No. 261928, dated Sep. 19, 2022, 3 pages.
Notice of Preliminary Rejection for Korean Patent Application No. 10-2019-7008481, dated Aug. 1, 2022, 11 pages.
Second Office Action for Chinese Patent Application No. 2017800441862, dated Aug. 3, 2022, 12 pages.
Decision to Grant for Japanese Patent Application No. 2018-567030, dated Aug. 25, 2022, 5 pages.
Notice of Allowance for Israeli Patent Application No. 261620, dated Aug. 9, 2022, 3 pages.
Examination Report for Taiwanese Patent Application No. 107124318, dated Aug. 5, 2022, 6 pages.
Shetzline, et al., "Quantifying Electronic and Ionic Conductivity Contributions in Carbon/Polyelectrolyte Composite Thin Films," Journal of the Electrochemical Society, vol. 161, Issue 14, Oct. 10, 2014, pp. H917-H923.
Notice of Allowance for U.S. Appl. No. 17/110,397, dated Jul. 31, 2023, 8 pages.
Office Action for Canadian Patent Application No. 3025940, dated May 23, 2023, 6 pages.
Office Action for Brazilian Patent Application No. 112018069339, dated May 30, 2023, 6 pages.
Office Action for Canadian Patent Application No. 3033140, dated Jul. 25, 2023, 3 pages.
Office Action for Canadian Patent Application No. 3018568, dated Jul. 13, 2023, 4 pages.
Notice of Allowance for Taiwanese Patent Application No. 107124318, dated Aug. 10, 2023, 3 pages.
Written Decision on Registration for Korean Patent Application No. 10-2020-7001506, dated Jun. 15, 2023, 8 pages.
Notice of Allowance for U.S. Appl. No. 16/791,517, dated Jun. 22, 2023, 7 pages.
Office Action for Brazilian Patent Application No. 112018076559-7, dated Apr. 18, 2023, 6 pages.
Notice of Last Preliminary Rejection for Korean Patent Application No. 10-2020-7000725, dated Apr. 25, 2023, 13 pages.
Kumar, et al., "Cobaltite oxide nanosheets anchored graphene nanocomposite as an efficient oxygen reduction reaction (ORR) catalyst for the application of lithium-air batteries," Journal of Power Sources, vol. 288, Apr. 2015, Isevier B.V., pp. 451-460.
Examination Report for European Patent Application No. 17847303.9, dated May 3, 2023, 7 pages.
Examination Report for European Patent Application No. 17771081.1, dated Apr. 28, 2023, 4 pages.
Notice of Allowance for U.S. Appl. No. 17/388,082, dated Sep. 19, 2023, 11 pages.
Hearing Notice for Indian Patent Application No. 201917010855, dated Aug. 23, 2023, 3 pages.
Hearing Notice for Indian Patent Application No. 201917010855, dated Sep. 12, 2023, 3 pages.
Hearing Notice for Indian Patent Application No. 201917010855, dated Oct. 18, 2023, 3 pages.
Invitation to Indicate the Subject Matter for European Patent Application No. 20870360.3, dated Sep. 26, 2023, 8 pages.
Non-Final Office Action for U.S. Appl. No. 17/872,380, dated Dec. 6, 2023, 15 pages.
Office Action for Israeli Patent Application No. 264868, dated Sep. 26, 2023, 8 pages.
Office Action for Mexican Patent Application No. MX/a/2019/001891, dated Nov. 23, 2023, 6 pages.
Office Action for Mexican Patent Application No. MX/a/2019/000049, dated Oct. 24, 2023, 8 pages.
Notice of Allowance and Examiner-Initiated Interview Summary for U.S. Appl. No. 17/332,008, dated Nov. 27, 2023, 11 pages.
Second Office Action for Chinese Patent Application No. 202210482024.X, dated Oct. 13, 2023, 10 pages.

(56) References Cited

OTHER PUBLICATIONS

Examination Report No. 2 for Australian Patent Application No. 2018283951, dated Nov. 23, 2023, 3 pages.
Decision of Rejection for Chinese Patent Application No. 2018800466506, dated Sep. 13, 2023, 8 pages.
Final Office Action for U.S. Appl. No. 16/004,818, dated Oct. 31, 2023, 23 pages.
Hearing Notice for Indian Patent Application No. 202017002602, dated Nov. 17, 2023 3 pages.

* cited by examiner

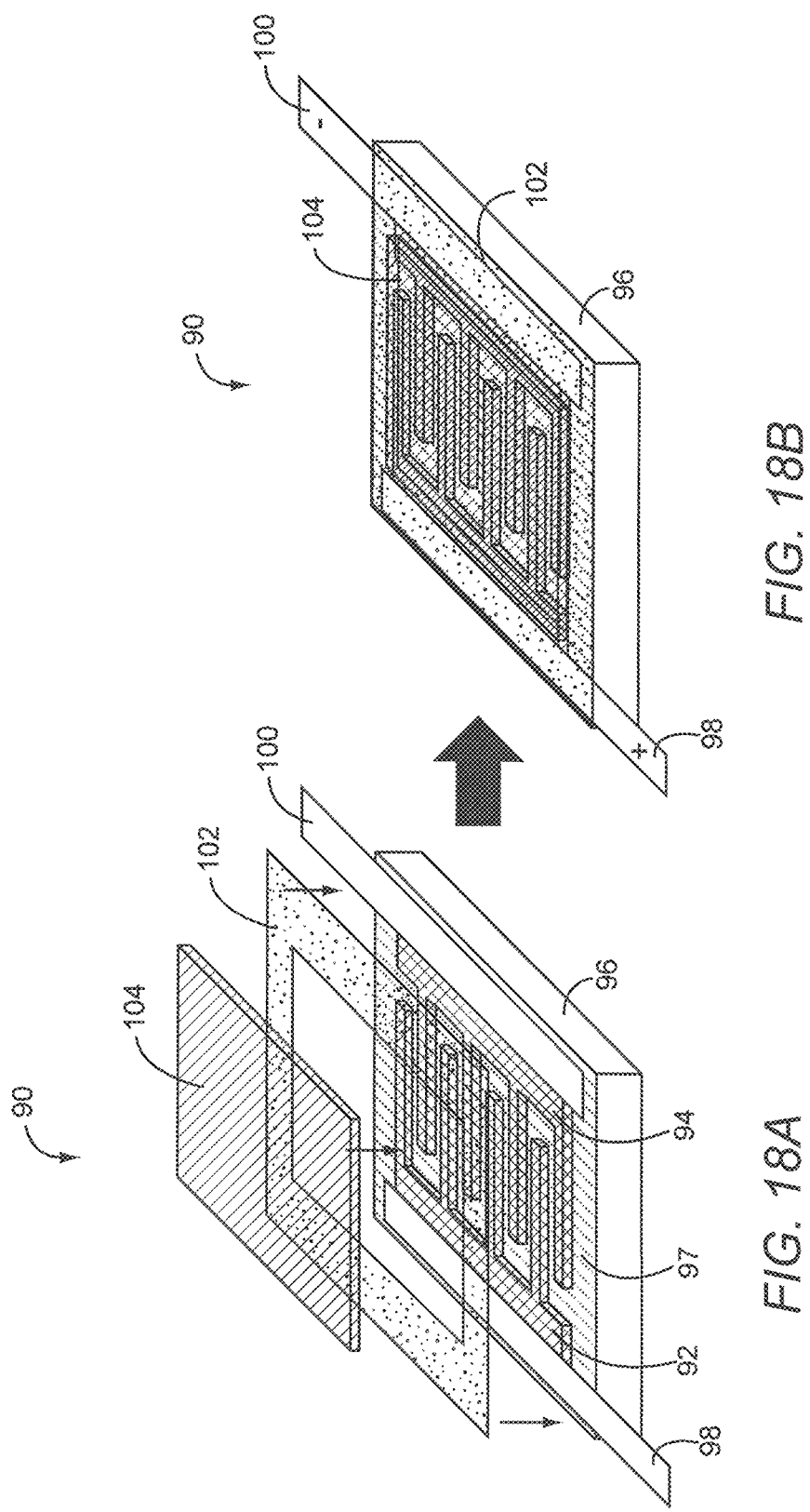

| NUMBER OF ELECTRODE DIGITS | 4 | 8 | 16 |
|---|---|---|---|
| WIDTH, W (μm) | 1770 | 810 | 330 |
| LENGTH, L (μm) | 4800 | 4800 | 4800 |
| INTERSPACE, I (μm) | 150 | 150 | 150 |
| EDGE, E (μm) | 200 | 200 | 200 |
| TOTAL AREA, (mm²) | 40 | 40 | 40 |

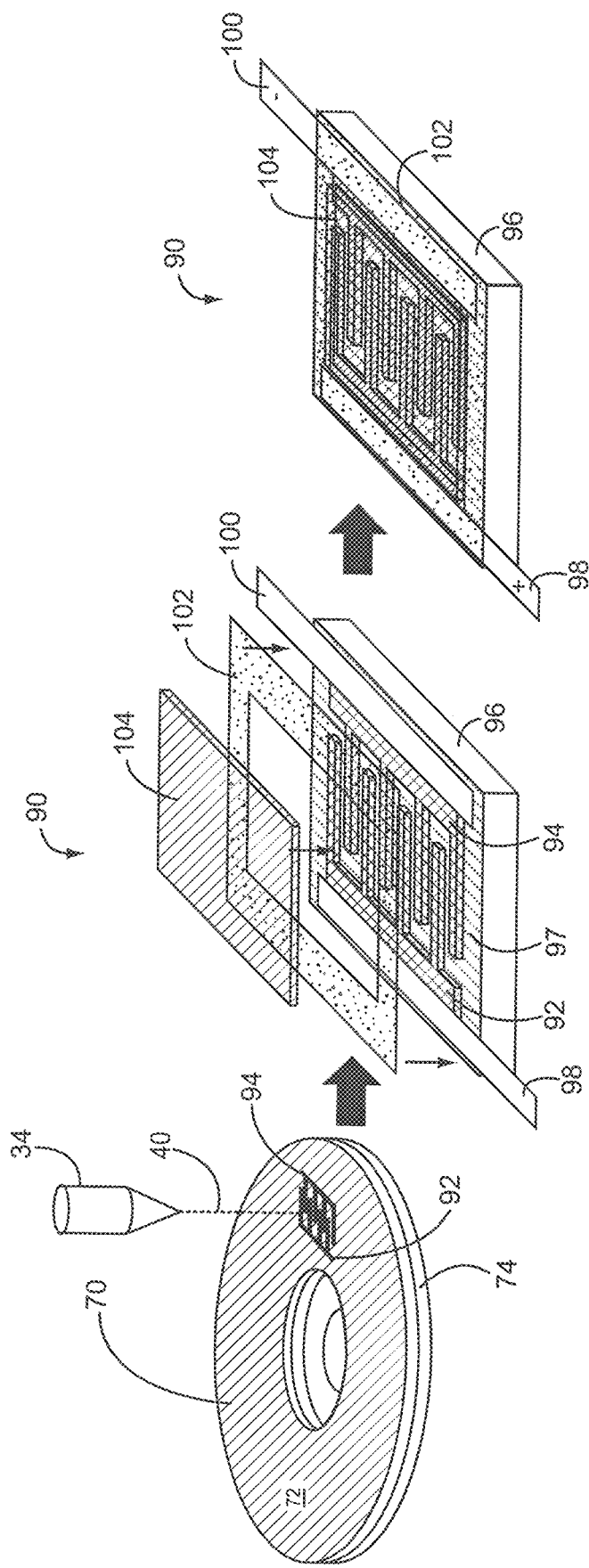

— AC-SC
- - Al ELECTROLYTIC CAPACITOR
--- ICCN-MSC(16)

CAPACITOR WITH ELECTRODES MADE OF AN INTERCONNECTED CORRUGATED CARBON-BASED NETWORK

RELATED APPLICATIONS

The present application is a continuation of U.S. patent application Ser. No. 16/029,930, filed Jul. 9, 2018, now U.S. Pat. No. 11,257,632, which is a continuation of U.S. patent application Ser. No. 15/612,405, filed Jun. 2, 2017, now U.S. Pat. No. 11,004,618, which is a continuation of U.S. patent application Ser. No. 14/382,463, filed Sep. 2, 2014, now U.S. Pat. No. 9,779,884.

U.S. patent application Ser. No. 14/382,463, filed Sep. 2, 2014, is a USC 371 national phase filing of PCT/US13/29022, filed Mar. 5, 2013, which claims priority to U.S. Provisional Patent Applications No. 61/606,637, filed Mar. 5, 2012, and No. 61/757,077, filed Jan. 25, 2013.

The present application is related to U.S. patent application Ser. No. 13/725,073, filed Dec. 21, 2012, and International Patent Application No. PCT/US12/71407, filed Dec. 21, 2012, both of which claim priority to U.S. Provisional Patent Application No. 61/578,431, filed Dec. 21, 2011.

All of the applications listed above are hereby incorporated herein by reference in their entireties.

This research was supported in part by the Ministry of Higher Education of Egypt through a graduate research fellowship—the Missions Program.

FIELD OF THE DISCLOSURE

The present disclosure provides an interconnected corrugated carbon-based network (ICCN) and an inexpensive process for making, patterning, and tuning the electrical, physical and electrochemical properties of the ICCN.

BACKGROUND

Batteries and electrochemical capacitors (ECs) stand at opposite ends of the spectrum in terms of their power and energy densities. Batteries store energy through electrochemical reactions and can exhibit high energy densities (on the order of 20 to 150 Wh/kg), whereas ECs, which store charge in electrochemical double layers (EDLs), can only achieve values of 4 to 5 Wh/kg. However, because ion flow is faster than redox reactions, ECs can deliver much higher power densities. ECs are also generally maintenance free and display a longer shelf and cycle life, so they are often favored in many electronic applications.

An EC that combines the power performance of capacitors with the high energy density of batteries would represent a major advance in energy storage technology, but this requires an electrode with higher and more accessible surface area than that of conventional EC electrodes while maintaining high conductivity. Carbon-based materials are attractive in this regard because of their mechanical and electrical properties as well as exceptionally high surface area. Recently, the intrinsic capacitance of single layer graphene was reported to be $\sim 21$ $\mu F/cm^2$; this value now sets the upper limit for EDL capacitance for all carbon-based materials. Thus, ECs based on carbon-based materials could, in principle, achieve an EDL capacitance as high as $\sim 550$ F/g if their entire surface area could be used.

Currently, carbon-based materials derived from graphite oxide (GO) can be manufactured on the ton scale at low cost, making them potentially cost effective materials for charge storage devices. Although these carbon-based materials have shown excellent power density and life-cycle stability, their specific capacitance (130 F/g in aqueous potassium hydroxide and 99 F/g in an organic electrolyte) still falls far below the theoretical value of $\sim 550$ F/g calculated for a single layer of carbon. A variety of other carbon-based materials derived from GO have also been used, yet the values of specific capacitance, energy density, and power density have remained lower than expected. These effects are often attributed to the restacking of carbon sheets during processing as a result of the strong sheet-to-sheet van der Waals interactions. This reduction in the specific surface area of single layer carbon accounts for the overall low capacitance. In addition, these ECs exhibited relatively low charge/discharge rates, which precludes their use for high power applications. Recently, EC devices composed of curved graphene, activated graphene, and solvated graphene have demonstrated enhanced performance in terms of energy density. However, further improvements in energy density are needed that do not sacrifice high power density. In particular, the production of mechanically robust carbon-based electrodes with large thicknesses ($\sim 10$ µm or higher) and high surface-to-volume ratio in a binder free process would result in high power and high energy density ECs.

In the pursuit of producing high quality bulk carbon-based devices such as ECs and organic sensors, a variety of syntheses now incorporate graphite oxide (GO) as a precursor for the generation of large scale carbon-based materials. Inexpensive methods for producing large quantities of GO from the oxidation of graphitic powders are now available. In addition, the water dispersibility of GO combined with inexpensive production methods make GO an ideal starting material for producing carbon-based devices. In particular, GO has water dispersible properties. Unfortunately, the same oxygen species that give GO its water dispersible properties also create defects in its electronic structure, and as a result, GO is an electrically insulating material. Therefore, the development of device grade carbon-based films with superior electronic properties requires the removal of these oxygen species, re-establishment of a conjugated carbon network, as well as a method for controllably patterning carbon-based device features.

Methods for reducing graphite oxide have included chemical reduction via hydrazine, hydrazine derivatives, or other reducing agents, high temperature annealing under chemical reducing gases and/or inert atmospheres, solvothermal reduction, a combination of chemical and thermal reduction methods, flash reduction, and most recently, laser reduction of GO. Although several of these methods have demonstrated relatively high quality graphite oxide reduction, many have been limited by expensive equipment, high annealing temperatures and nitrogen impurities in the final product. As a result, of these difficulties, a combination of properties that includes high surface area and high electrical conductivity in an expanded interconnected carbon network has remained elusive. In addition, large scale film patterning via an all-encompassing step for both GO reduction and patterning has proven difficult and has typically been dependent on photo-masks to provide the most basic of patterns. Therefore, what is needed is an inexpensive process for making and patterning an interconnected corrugated carbon-based network (ICCN) having a high surface area with highly tunable electrical conductivity and electrochemical properties.

SUMMARY

The present disclosure provides a capacitor having at least one electrode made up of an interconnected corrugated carbon-based network (ICCN). The ICCN produced has a combination of properties that includes high surface area and high electrical conductivity in an expanded network of interconnected carbon layers.

In one embodiment, each of the expanded and interconnected carbon layers is made up of at least one corrugated carbon sheet that is one atom thick. In another embodiment, each of the expanded and interconnected carbon layers is made up of a plurality of corrugated carbon sheets that are each one atom thick. The interconnected corrugated carbon-based network is characterized by a high surface area with highly tunable electrical conductivity and electrochemical properties.

In one embodiment, a method produces a capacitor having electrodes made of a patterned ICCN. In that particular embodiment, an initial step receives a substrate having a carbon-based oxide film. Once the substrate is received, a next step involves generating a light beam having a power density sufficient to reduce portions of the carbon-based oxide film to an ICCN. Another step involves directing the light beam across the carbon-based oxide film in a predetermined pattern via a computerized control system while adjusting the power density of the light beam via the computerized control system according to predetermined power density data associated with the predetermined pattern.

In one embodiment, the substrate is a disc-shaped, digital versatile disc (DVD) sized thin plastic sheet removably adhered to a DVD sized plate that includes a DVD centering hole. The DVD sized plate carrying the disc-shaped substrate is loadable into a direct-to-disc labeling enabled optical disc drive. A software program executed by the computerized control system reads data that defines the predetermined pattern. The computerized control system directs a laser beam generated by the optical disc drive onto the disc-shaped substrate, thereby reducing portions of the carbon-based oxide film to an electrically conductive ICCN that matches shapes, dimensions, and conductance levels dictated by the data of the predetermined pattern.

Those skilled in the art will appreciate the scope of the disclosure and realize additional aspects thereof after reading the following detailed description in association with the accompanying drawings.

BRIEF DESCRIPTION OF THE DRAWINGS

The accompanying drawings incorporated in and forming a part of this specification illustrate several aspects of the disclosure, and together with the description serve to explain the principles of the disclosure.

Figure 17A:
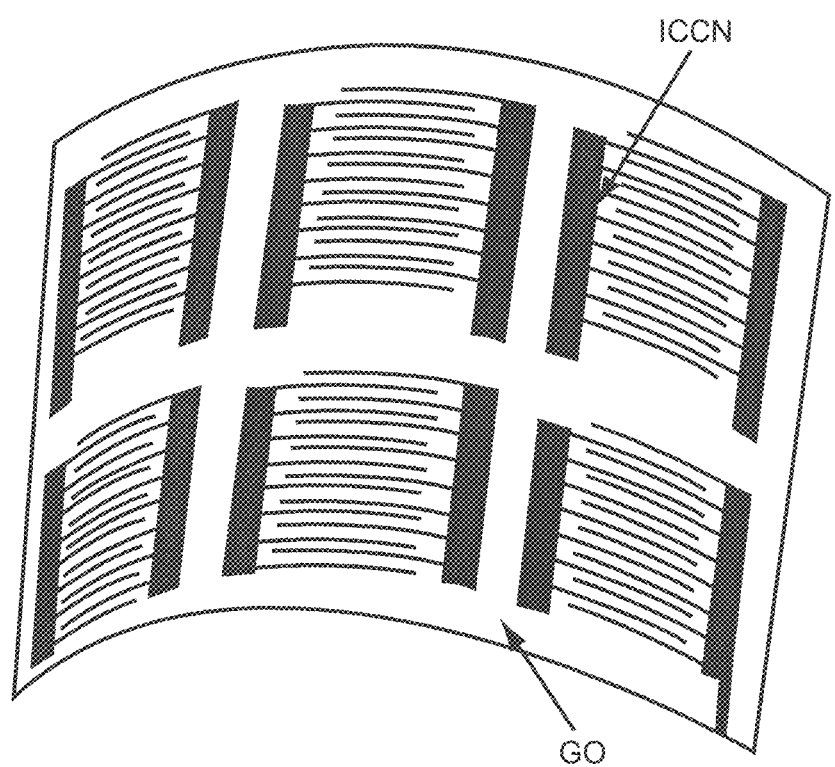
FIG. 17A is a structural diagram showing a set of interdigitated electrodes made of ICCNs with dimensions of 6 mm×6 mm, spaced at around about 500 µm, that are directly patterned onto a thin film of GO.
Figure 17B:
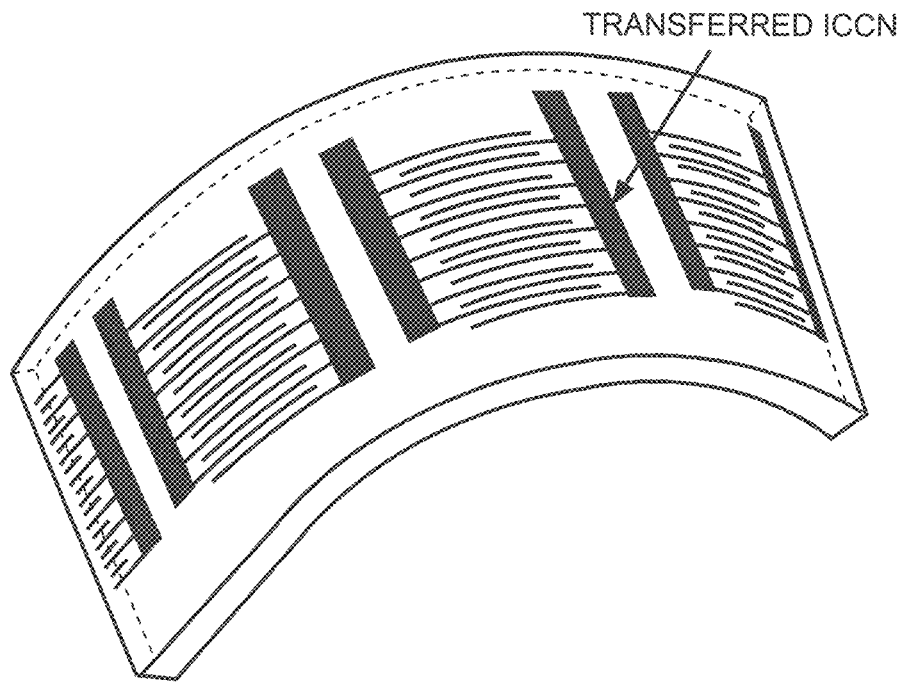

FIG. 17B is a structural diagram showing the set of interdigitated electrodes transferred onto another type of substrate.

FIG. 18A shows an exploded view of a micro-supercapacitor made up of a plurality of expanded and interconnected carbon layers that are electrically conductive.

FIG. 18B shows the micro-supercapacitor of FIG. 18A after assembly.

Figures 19A, 19B, 19C, 20:
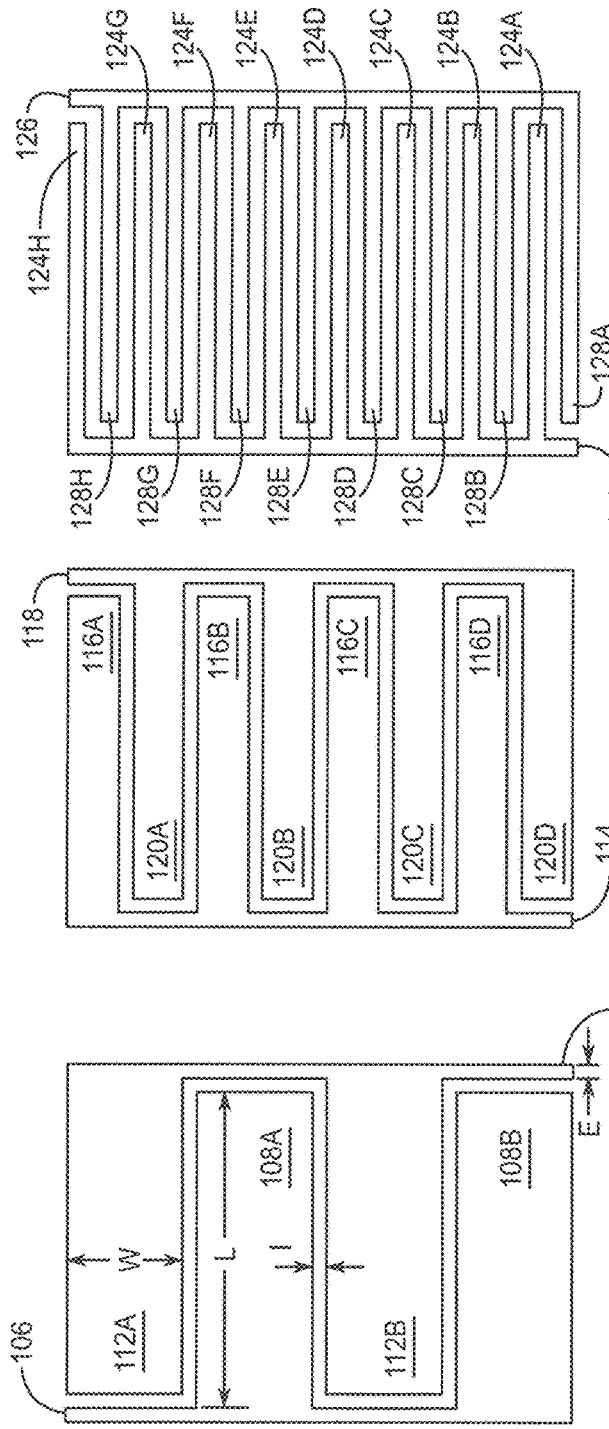

FIG. 19A depicts a micro-supercapacitor configuration having a first electrode with two extending electrode digits that are interdigitated with two extending electrode digits of a second electrode.

FIG. 19B depicts a micro-supercapacitor configuration having a first electrode with four extending electrode digits that are interdigitated with four extending electrode digits of a second electrode.

FIG. 19C depicts a micro-supercapacitor configuration having a first electrode with eight extending electrode digits that are interdigitated with eight extending electrode digits of a second electrode.

FIG. 20 is a table listing dimensions for the micro-supercapacitors of FIGS. 19A-19C.

FIGS. 21A-21E depict the fabrication of ICCN micro-supercapacitors.

Figure 22C:
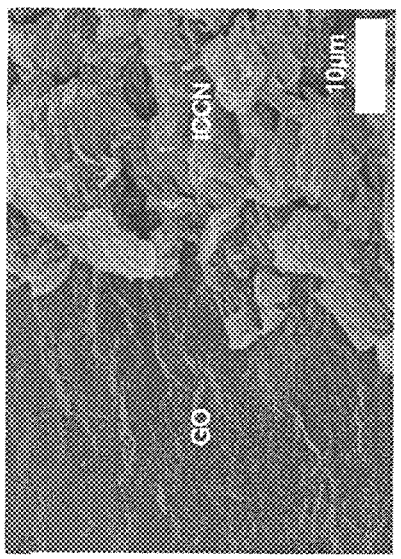
Figure 22B:
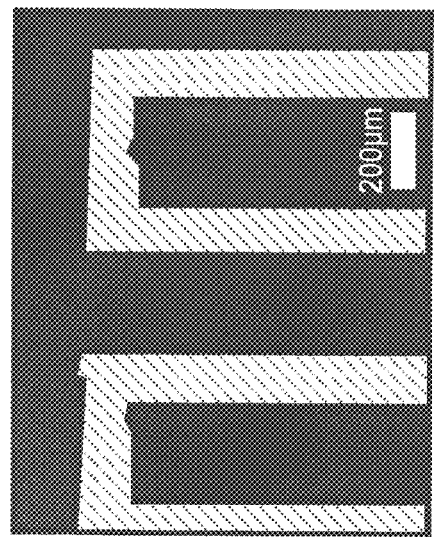
Figure 22A:
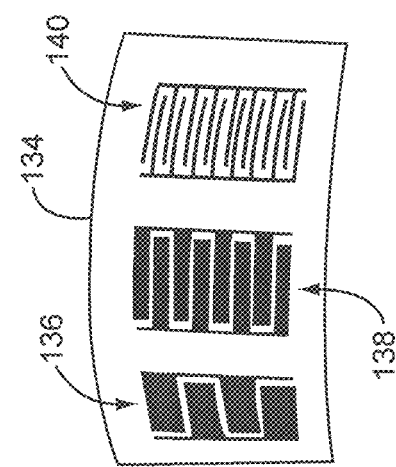

FIG. 22A depicts ICCN micro-devices with 4, 8, and 16 interdigitated electrodes.

FIG. 22B depicts an ICCN micro-device with 16 interdigitated fingers with 150-µm spacings.

FIG. 22C is a tilted view (45°) SEM image that shows the direct reduction and expansion of the GO film after exposure to the laser beam.

Figure 22D:
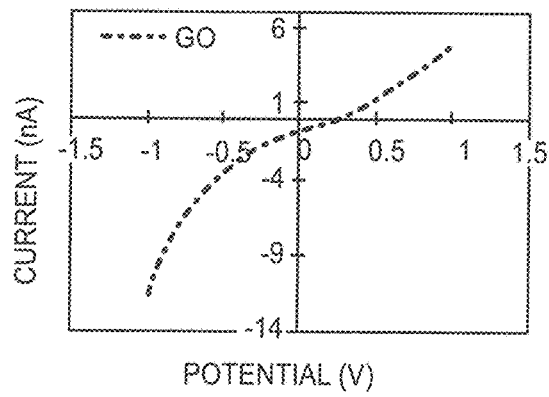
Figure 22E:
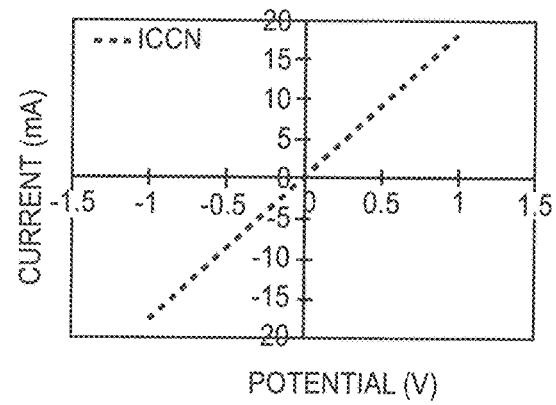

FIGS. 22D and 22E show I-V curves of GO and an ICCN, respectively.

Figure 22F:
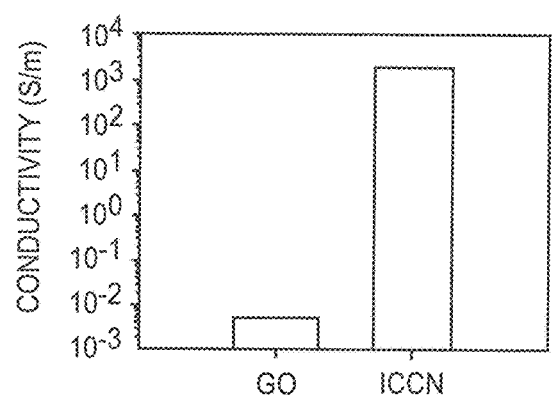

FIG. 22F is a graphical comparison of electrical conductivity values for GO and an ICCN.

FIGS. 23A-23I are graphs depicting electrochemical performance of ICCN micro-supercapacitors in PVA-$H_2SO_4$ gelled electrolyte.

FIGS. 24A-24F are graphs depicting the behavior of ICCN micro-supercapacitors under mechanical stress in series and parallel configurations.

FIGS. 25A-25E are images depicting the fabrication of ICCN micro-supercapacitors on a chip along with graphs showing the characteristics of the micro-supercapacitors.

Figure 26A:
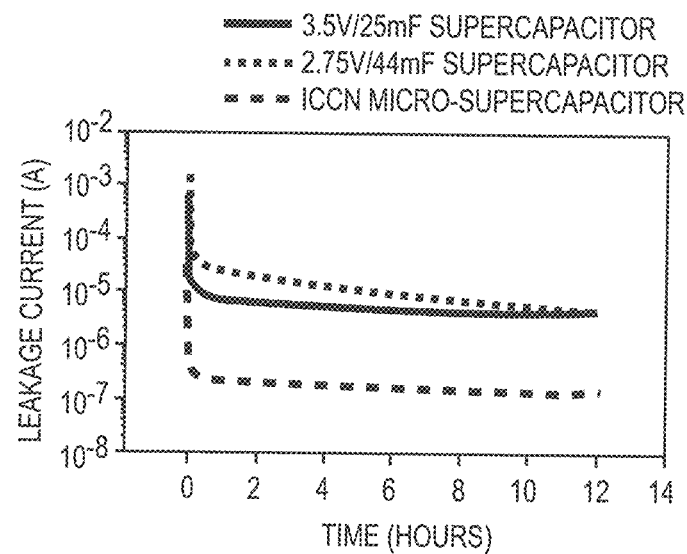
Figure 26B:
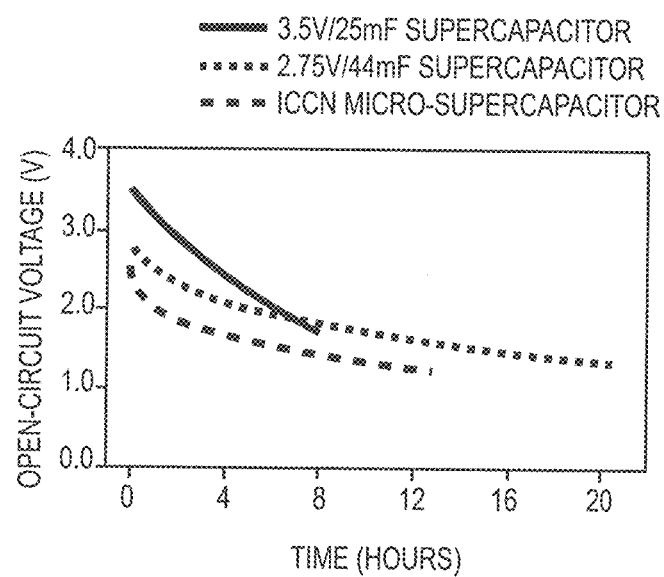

FIGS. 26A-26B are graphs depicting self discharge rates for ICCN micro-supercapacitors.

Figure 27:
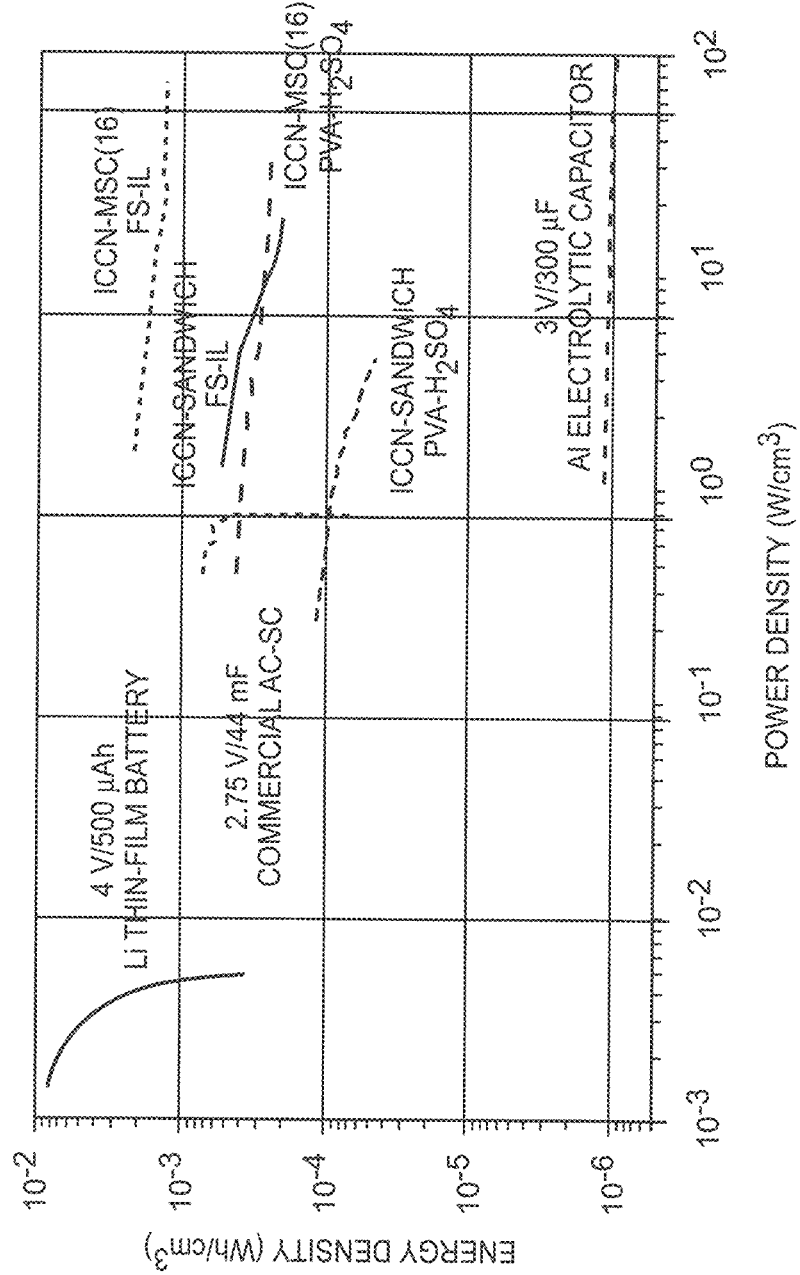

FIG. 27 is a Ragone plot of energy and power densities of ICCN micro-supercapacitors compared with commercially available energy storage systems.

DETAILED DESCRIPTION

The embodiments set forth below represent the necessary information to enable those skilled in the art to practice the disclosure and illustrate the best mode of practicing the disclosure. Upon reading the following description in light of the accompanying drawings, those skilled in the art will understand the concepts of the disclosure and will recognize applications of these concepts not particularly addressed herein. It should be understood that these concepts and applications fall within the scope of the disclosure and the accompanying claims.

The present disclosure provides an inexpensive process for making and patterning an ICCN having stringent requirements for a high surface area with highly tunable electrical conductivity and electrochemical properties. The embodiments described herein not only meet these stringent requirements, but provide direct control over the conductivity and patterning of an ICCN while creating flexible electronic devices in a single step process. Moreover, the production of the ICCN does not require reducing agents, or expensive equipment. The simple direct fabrication of an ICCN on flexible substrates therefore simplifies the development of lightweight electrical energy storage devices. The ICCN can be synthesized on various substrates, such as plastic, metal, and glass. Herein an electrochemical capacitor (EC), and in particular a micro-supercapacitor, is disclosed.

In at least one embodiment, the ICCNs are conducting films produced using a common and inexpensive infrared laser that fits inside a compact disc/digital versatile disc (CD/DVD) optical drive unit that provides a direct-to-disc label writing function. LightScribe (Registered Trademark of Hewlett Packard Corporation) and LabelFlash (Registered Trademark of Yamaha Corporation) are exemplary direct-to-disc labeling technologies that pattern text and graphics onto the surface of a CD/DVD disc. LightScribe DVD drives are commercially available for around $20 and the LightScribing process is controlled using a standard desktop computer.

Figure 1:
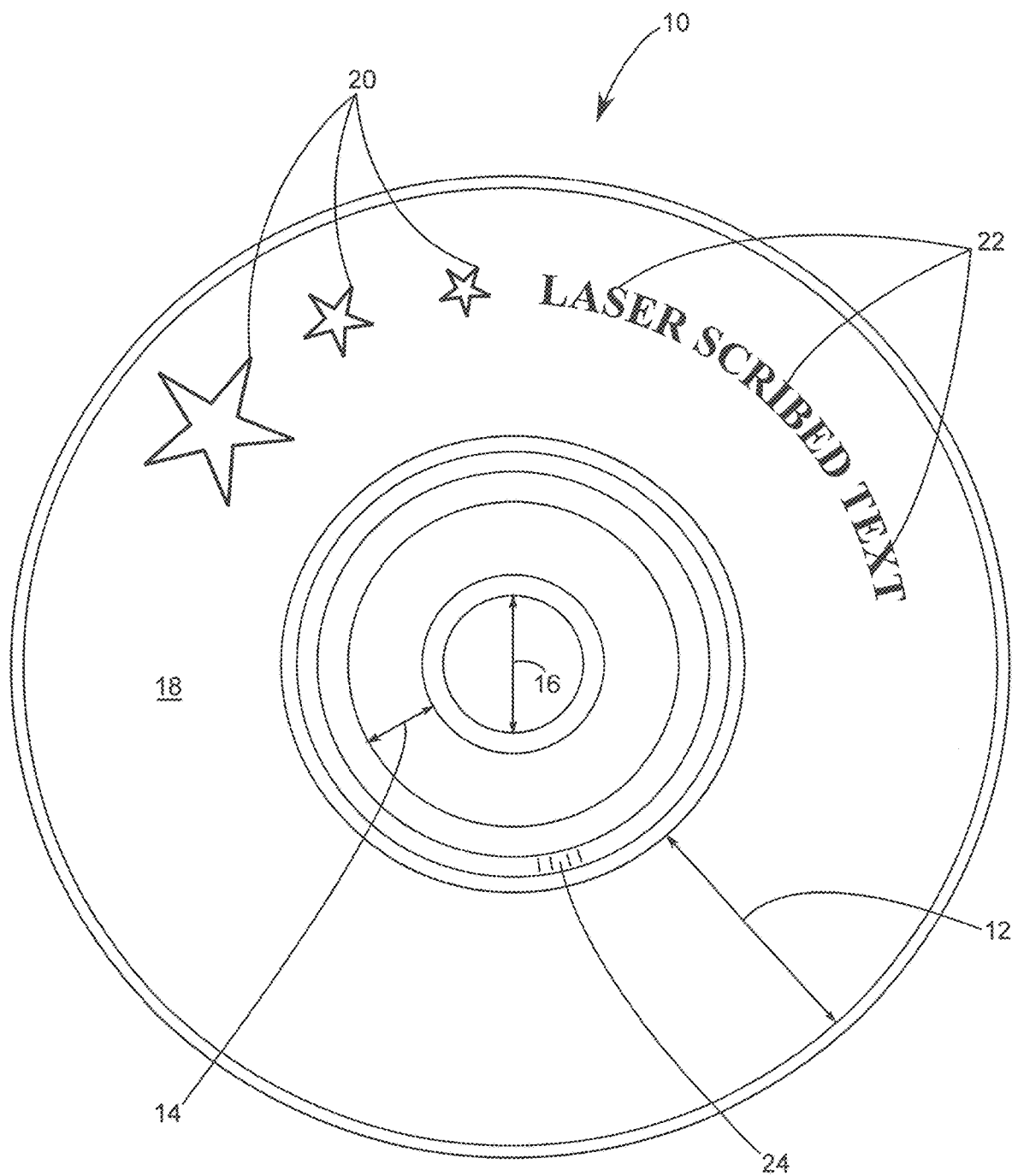
FIG. 1 depicts the label side of a prior art direct-to-disc labeling type CD/DVD disc.

FIG. 1 depicts the label side of a standard direct-to-disc labeling type CD/DVD disc 10 that includes a label area 12 and a clamping area 14 that surrounds a centering hole 16. A dye film 18 covers the label area 12 and is sensitive to laser energy that is typically directed onto the label area 12 to produce a permanent visible image that may comprise graphics 20 and text 22. A position tracking indicia 24 is usable by an optical disc drive (not shown) to accurately locate an absolute angular position of the CD/DVD disc 10 within the optical disc drive so that the graphics 20 and/or text 22 can be re-written to provide increased contrast. Moreover, the position tracking indicia 24 is usable by the optical disc drive to allow additional graphics and/or text to be written without undesirably overwriting the graphics 20 and/or text 22.

Figure 2:
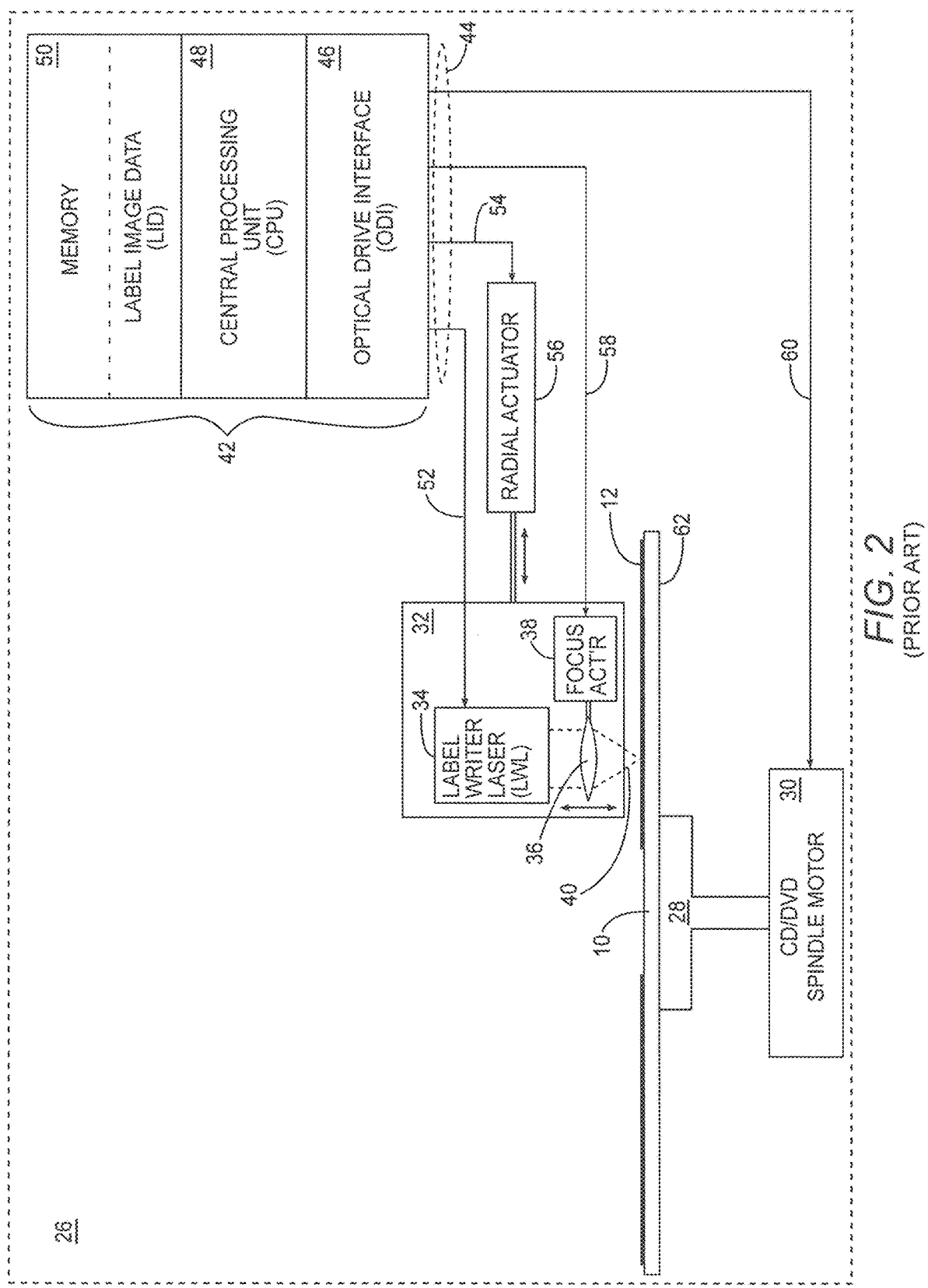
FIG. 2 is a schematic of a prior art direct-to-disc labeling type optical disc drive.

FIG. 2 is a schematic of a prior art direct-to-disc labeling type optical disc drive system 26. In this exemplary case, the CD/DVD disc 10 is depicted in cross-section and loaded onto a spindle assembly 28 that is driven by a CD/DVD spindle motor 30. The label area 12 is shown facing a laser assembly 32 that includes a label writer laser (LWL) 34, a lens 36, and a focus actuator 38. The LWL 34 is typically a laser diode. Exemplary specifications for the LWL 34 includes a maximum pulse optical power of 350 mW at 780 nm emission and a maximum pulse output power of 300 mW at 660 nm emission. A laser beam 40 emitted by the LWL 34 is focused by the lens 36 that is alternately translated towards and away from the LWL 34 by the focus actuator 38 in order to maintain focus of the laser beam 40 onto the label area 12 of the CD/DVD disc 10. The laser beam 40 is typically focused to a diameter that ranges from around 0.7 µm to around 1 µm.

The laser assembly 32 is responsive to a control system 42 that provides control signals 44 through an optical drive interface (ODI) 46. The control system 42 further includes a central processor unit (CPU) 48 and a memory 50. Label image data (LID) having information needed to realize a permanent image to be written onto the label area 12 of the CD/DVD disc 10 is processed by the CPU 48, which in turn provides an LID stream signal 52 that pulses the LWL 34 on and off to heat the dye film 18 to realize the image defined by the LID.

The CPU 48 also processes the LID through the ODI 46 to provide a position control signal 54 to a radial actuator 56 that translates the laser assembly 32 in relation to the label area 12 in response to position information contained in the LID. In some versions of the present embodiments, the optical disc drive system 26 monitors the focus of the laser beam 40 with an optical receiver (not shown), so that the ODI 46 can generate a focus control signal 58 for the focus actuator 38. The ODI 46 also provides a motor control signal 60 for the CD/DVD spindle motor 30 that maintains an appropriate rotation speed of the CD/DVD disc 10 while a label writing process is ongoing.

In some versions of the optical disc drive system 26 the LWL 34 is used exclusively for label writing directly to the label area 12 of the CD/DVD disc and a separate laser diode (not shown) is used to write and/or read data to/from a data side 62 of the CD/DVD disc 10. In other versions of the optical disc drive system 26, the LWL 34 is used for label writing and data reading and/or writing. When the LWL 34 is used for data reading and/or writing, the CD/DVD disc 10 is flipped over to expose the data side 62 of the CD/DVD disc 10 to the laser beam 40. In versions wherein the LWL 34 is also used as a data read/write laser, the laser assembly 32 includes optical pick-up components (not shown) such as a beam splitter and at least one optical receiver. The output power of the LWL 34 is typically around 3 mW during data read operations.

In order to use the optical disc drive system 26 to realize an inexpensive process for making and patterning an ICCN having a high surface area with highly tunable electrical conductivity and electrochemical properties, a carbon-based film is substituted for the dye film 18 (FIG. 1). In one embodiment, graphite oxide (GO) is synthesized from high purity graphite powder using a modified Hummer's method. Dispersions of GO in water (3.7 mg/mL) are then used to make GO films on various substrates. Exemplary substrates include but are not limited to polyethylene terephthalate (PET), nitrocellulose membrane (with 0.4 μm pore size), aluminum foil, carbonized aluminum, copper foil, and regular copier paper.

Figure 3:
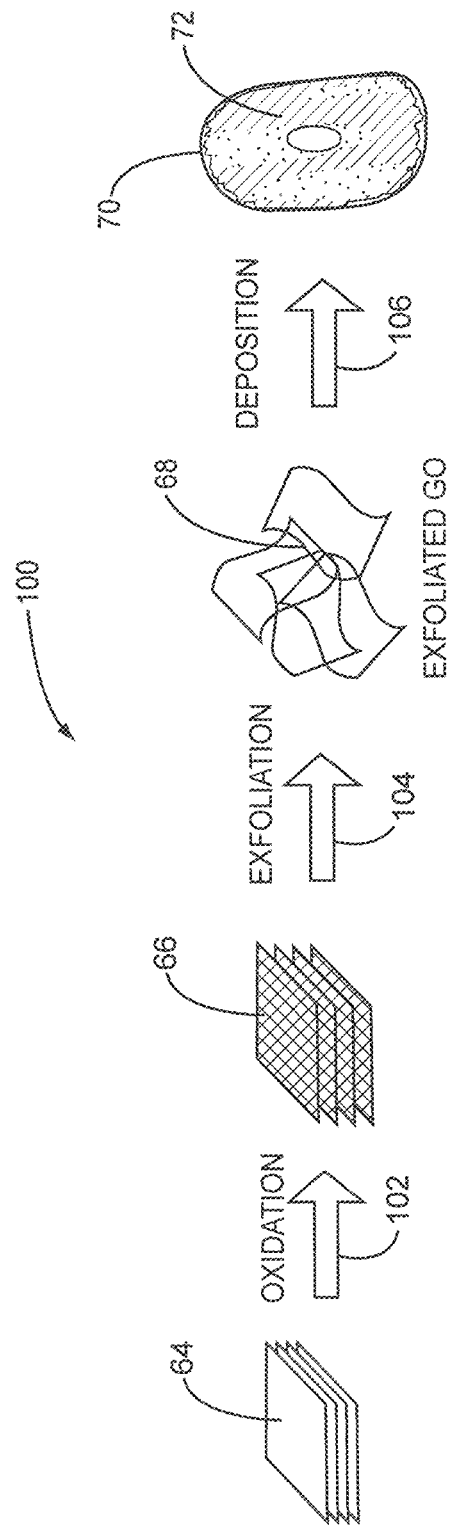
FIG. 3 is a process diagram for an exemplary process for providing graphite oxide (GO) films on a substrate.

Referring to FIG. 3, a process 100 begins with providing graphite powder 64. The graphite powder 64 undergoes an oxidation reaction using the modified Hummer's method to become GO 66 (step 102). However, it is to be understood that other oxidation methods for producing GO are available and such methods are within the scope of the present disclosure. An exfoliation procedure produces exfoliated GO 68 (step 104). The exfoliation procedure may be accomplished via ultrasonication. It is to be understood that the exfoliated GO 68 results from a partial exfoliation and not a complete exfoliation to a single layer of GO. The partial exfoliation is used to create a high accessible surface area that enables a fast redox response which enables a fast sensor response. Additionally, the partial exfoliation of GO 68 provides the high surface area for growing metal nanoparticles that could then be used in catalysis. A substrate 70 carries a GO film 72 that is produced by a deposition procedure that deposits the exfoliated GO 68 onto the substrate 70 (step 106). In at least some embodiments, a GO film 72 is made by either drop-casting or vacuum filtering GO dispersions onto the substrate 70 that is the size of a CD/DVD disc. The GO film 72 is typically allowed to dry for 24 hours under ambient conditions. However, controlling conditions to expose the GO film 72 to a relatively lower humidity and relatively higher temperature will dry the GO film 72 relatively quickly. The term GO herein refers to graphite oxide.

Figure 4:
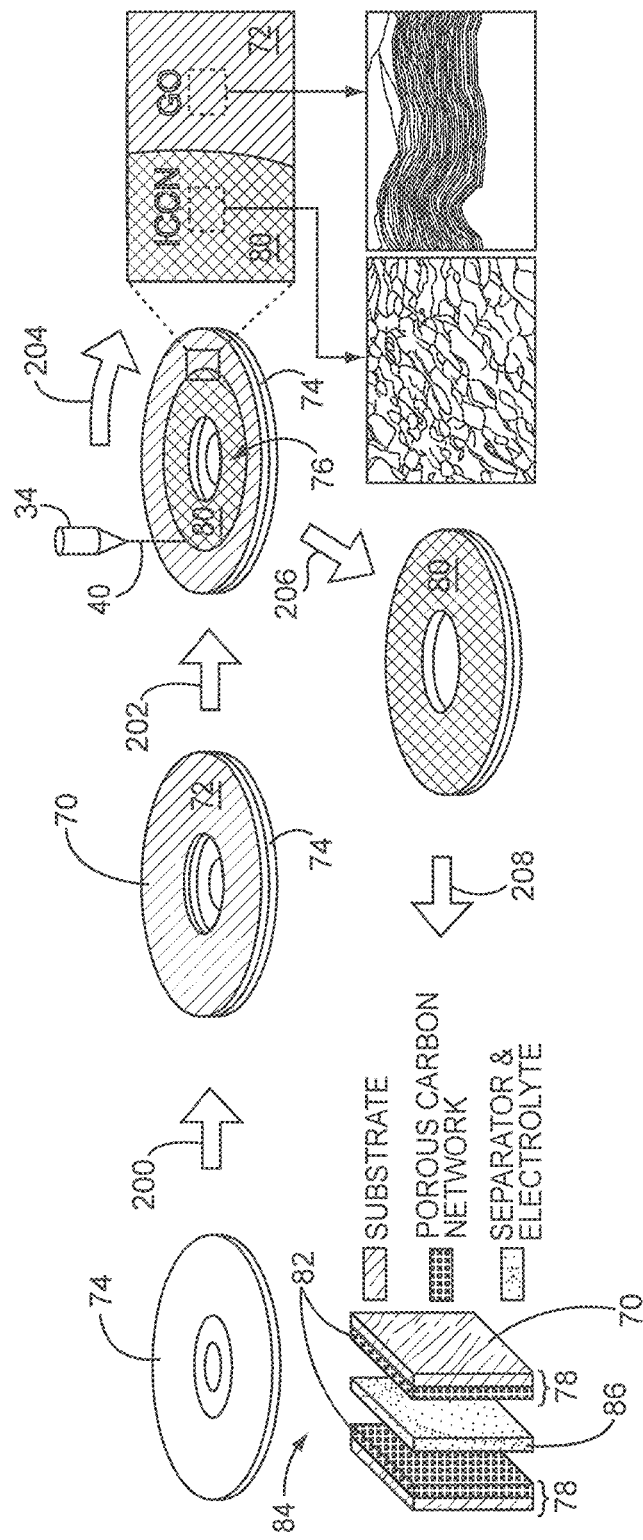
FIG. 4 is a process diagram for laser scribing an interconnected corrugated carbon-based network (ICCN) and then fabricating electrical components from the ICCN.

Referring to FIG. 4, individual ones of the GO film(s) 72 are then affixed to a substrate carrier 74, which has dimensions similar to the CD/DVD disc 10 (FIG. 1)(step 200). The substrate carrier 74 carrying the substrate 70 with the GO film 72 is loaded into the optical disc drive system 26 (FIG. 2) such that the GO film 72 faces the LWL 34 for laser treatment (step 202). In this way, the present embodiments use the GO film 72 in place of the dye film 18 (FIG. 1). It is to be understood that the substrate carrier 74 can be a rigid or semi-rigid disc onto which the GO film 72 can be fabricated directly. In that case, the substrate carrier 74 replaces the function of the substrate 70.

Images 76 for realizing electrical components 78 are patterned in concentric circles, moving outward from the center of the substrate carrier 74 (step 204). The laser irradiation process results in the removal of oxygen species and the reestablishment of $sp^2$ carbons. This causes a change in the conductivity of the GO film 72 with a typical resistance of >20 MΩ/sq to become a relatively highly conducting plurality of expanded and interconnected carbon layers that make up an ICCN 80. The number of times the GO film 72 is laser treated results in a significant and controllable change in the conductivity of the ICCN 80. The ICCN 80 has a combination of properties that includes high surface area and high electrical conductivity in an expanded interconnected network of carbon layers. In one embodiment, the plurality of expanded and interconnected carbon layers has a surface area of greater than around about 1400 $m^2$/g. In another embodiment, the plurality of expanded and interconnected carbon layers has a surface area of greater than around about 1500 $m^2$/g. In yet another embodiment, the surface area is around about 1520 $m^2$/g. In one embodiment, the plurality of expanded and interconnected carbon layers yields an electrical conductivity that is greater than around about 1500 S/m. In another embodiment, the plurality of expanded and interconnected carbon layers yields an electrical conductivity that is greater than around about 1600 S/m. In yet another embodiment, the plurality of expanded and interconnected carbon layers yields an electrical conductivity of around about 1650 S/m. In still another embodiment, the plurality of expanded and interconnected carbon layers yields an electrical conductivity that is greater than around about 1700 S/m. In yet one more embodiment, the plurality of expanded and interconnected carbon layers yields an electrical conductivity of around about 1738 S/m. Moreover, in one embodiment, the plurality of expanded and interconnected carbon layers yields an electrical conductivity that is greater than around about 1700 S/m and a surface area that is greater than around about 1500 $m^2$/g. In another embodiment, the plurality of expanded and interconnected carbon layers yields an electrical conductivity of around about 1650 S/m and a surface area of around about 1520 $m^2$/g.

The electrical components 78 comprising electrodes 82 used in the fabrication of an electrochemical capacitor (EC) 84 are laser irradiated 6 times before reaching the relatively high conductivity of around about 1738 S/m. An exemplary laser irradiation process takes around about 20 minutes per cycle. However, it is to be understood that faster laser irradiation rates are possible depending on the power of the laser light emitted from the LWL 34 combined with an increased positioning rate of the substrate carrier. Moreover, other imaging techniques that employ photomasks and flashlamps may provide even faster fabrication of the electrical components 78. Afterwards, the substrate 70 carrying the ICCN 80 and any remaining GO film 72 is removed from the substrate carrier 74 (step 206). Next, the ICCN 80 is fabricated into the electrical components 78 that make up the EC 84 (step 208). In this exemplary case, portions of the ICCN 80 on the substrate 70 are cut into rectangular sections to make the electrical components 78, which include the electrodes 82 formed from the ICCN 80. A separator/electrolyte 86 is sandwiched between the electrodes 82 to form the EC 84.

Figure 5:
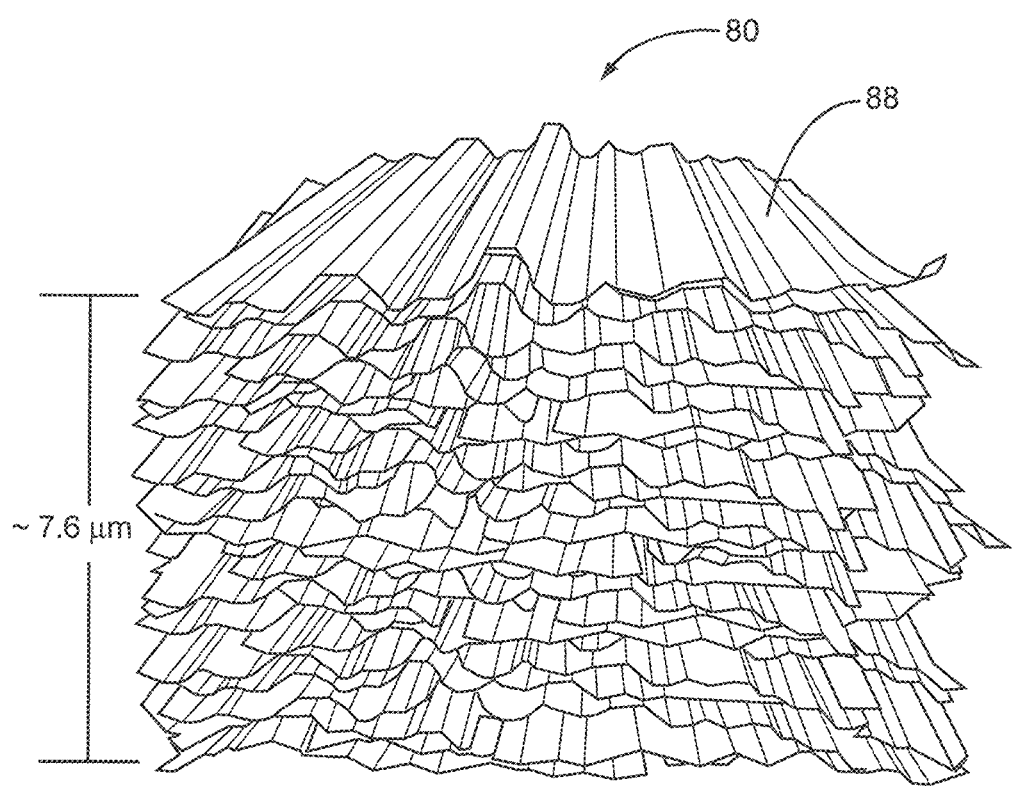
FIG. 5 is a line drawing of a sample of the ICCN of the present embodiments.

The ICCN 80 possesses a very low oxygen content of only around about 3.5%, which contributes to a relatively very high charging rate. In other embodiments, the oxygen content of the expanded and interconnected carbon layers ranges from around about 1% to around about 5%. FIG. 5 is a line drawing of a sample of the ICCN 80, which is made up of the plurality of expanded and interconnected carbon layers that include corrugated carbon layers such as a single corrugated carbon sheet 88. In one embodiment, each of the expanded and interconnected carbon layers comprises at least one corrugated carbon sheet that is one atom thick. In another embodiment, each of the expanded and interconnected carbon layers comprises a plurality of corrugated carbon sheets 88. The thickness of the ICCN 80, as measured from cross-sectional scanning electron microscopy (SEM) and profilometry, was found to be around about 7.6 μm. In one embodiment, a range of thicknesses of the plurality of expanded and interconnected carbon layers making up the ICCN 80 is from around about 7 μm to 8 μm.

Figures 6A, 6B:
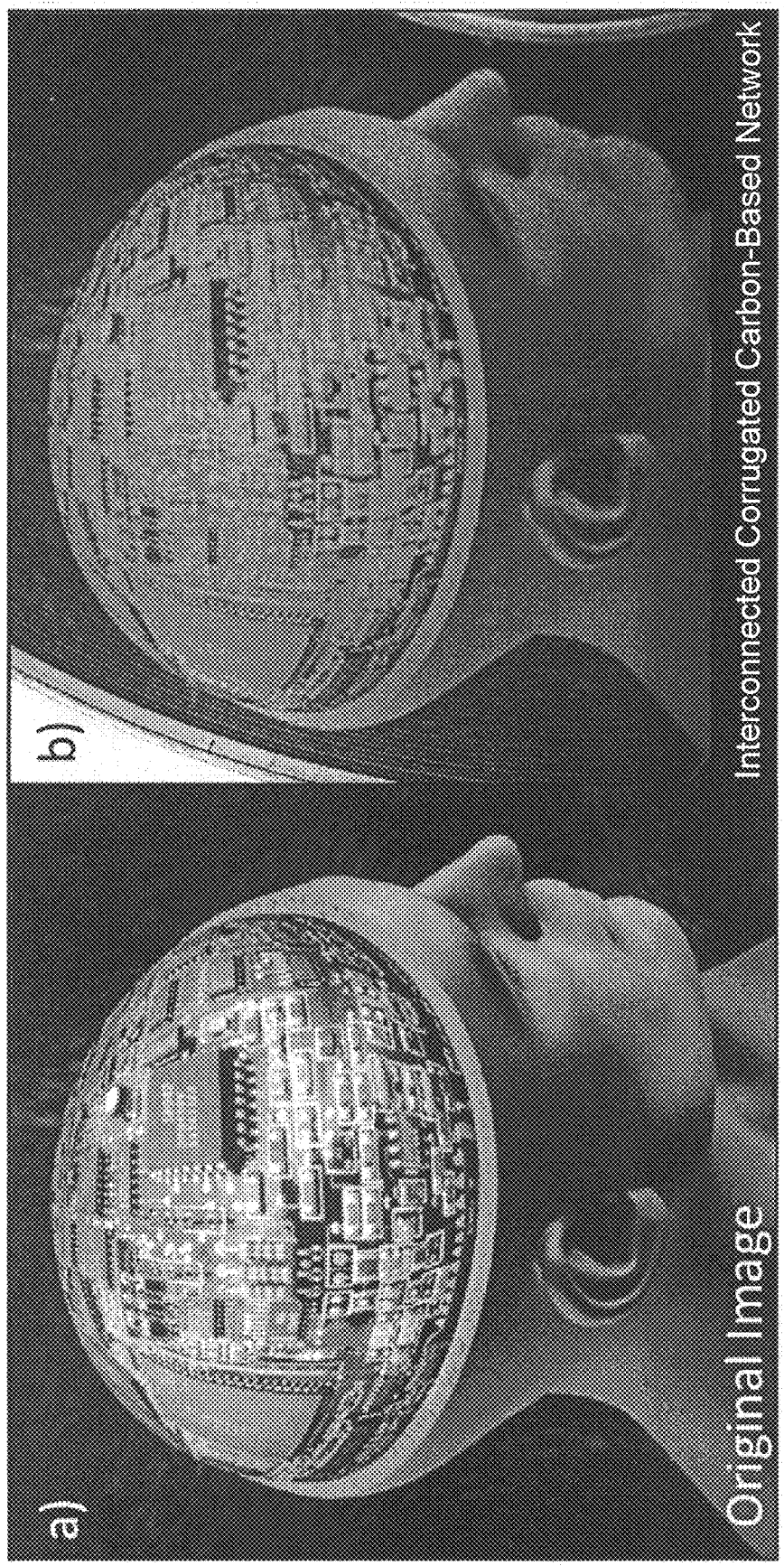
FIG. 6A is an artwork image of a man's head covered with circuits.
FIG. 6B is a photograph of a GO film after the artwork image of FIG. 6A is directly patterned on the GO film using the laser scribing technique of the present disclosure.
Figure 7:
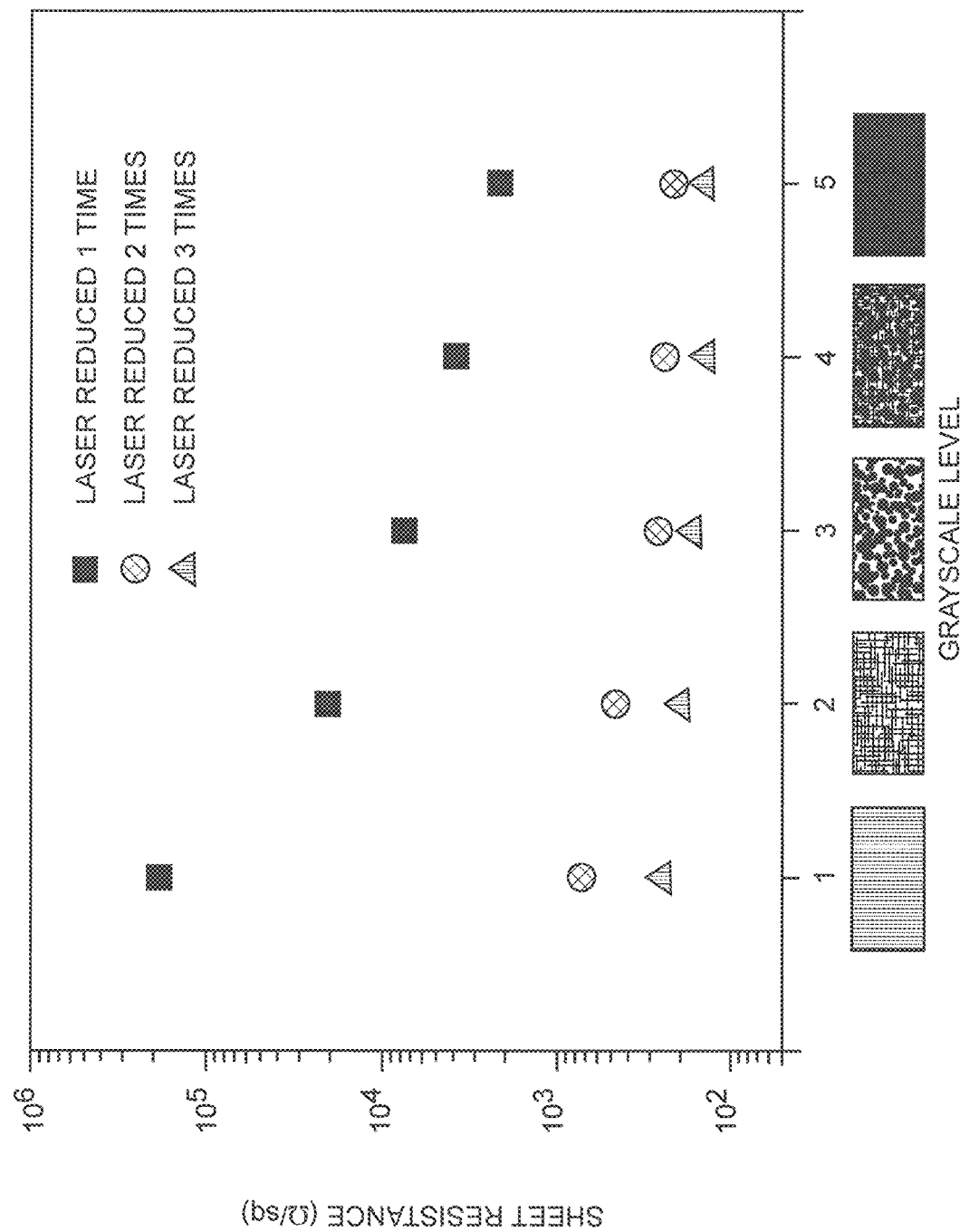
FIG. 7 is a graph that provides a comparison between changes in electrical conductivity by reducing the GO film of FIG. 6B by using various grayscale levels to laser scribe the artwork of FIG. 6A to produce the patterned GO film of FIG. 6B.

As an illustration of the diversity in image patterning that is possible, a complex image formed by the direct laser reduction of GO is shown in FIGS. 6A and 6B. FIG. 6A is an artwork image of a man's head covered with circuits. FIG. 6B is a photograph of a GO film after the artwork image of FIG. 6A is directly patterned on the GO film using the laser scribing technique of the present disclosure. Essentially, any part of the GO film that comes in direct contact with the 780 nm infrared laser is effectively reduced to an ICCN, with the amount of reduction being controlled by the laser intensity; a factor that is determined by power density of the laser beam impinging on the GO film. The resulting image of FIG. 6B is an effective print of the original image of FIG. 6A. However, in this case the image of FIG. 6B is made up of various reductions of the GO film. As expected, the darkest black areas indicate exposure to the strongest laser intensities, while the lighter gray areas are only partially reduced. Since different grayscale levels directly correlate with the laser's intensity, it is possible to tune the electrical properties of the generated ICCN over five to seven orders of magnitude in sheet resistance (Ω/sq) by simply changing the grayscale level used during the patterning process. As illustrated in FIG. 7, there is a clear relationship between sheet resistance, grayscale level and the number of times the GO film is laser irradiated. Control over conductivity from a completely insulating GO film, with a typical sheet resistance value of >20 MΩ/sq, to a conducting ICCN that registers a sheet resistance value of approximately 80 Ω/sq, which translates to a conductivity of around about 1650 S/m, is possible. This method is sensitive enough to differentiate between similar grayscale levels as shown in the graph of FIG. 7, where the sheet resistance varies significantly with only a small variation in grayscale level. In addition, the number of times a GO film is laser treated results in a significant and controllable change in sheet resistance. Each additional laser treatment lowers the sheet resistance as seen in FIG. 7, where a film is laser irradiated once (black squares), twice (circles) and three times (triangles) with respect to the grayscale level. Therefore, the film's sheet resistance is tunable both by controlling the grayscale level used and the number of times the film is reduced by the laser, a property that has so far been difficult to control through other methods.

Figure 8A:
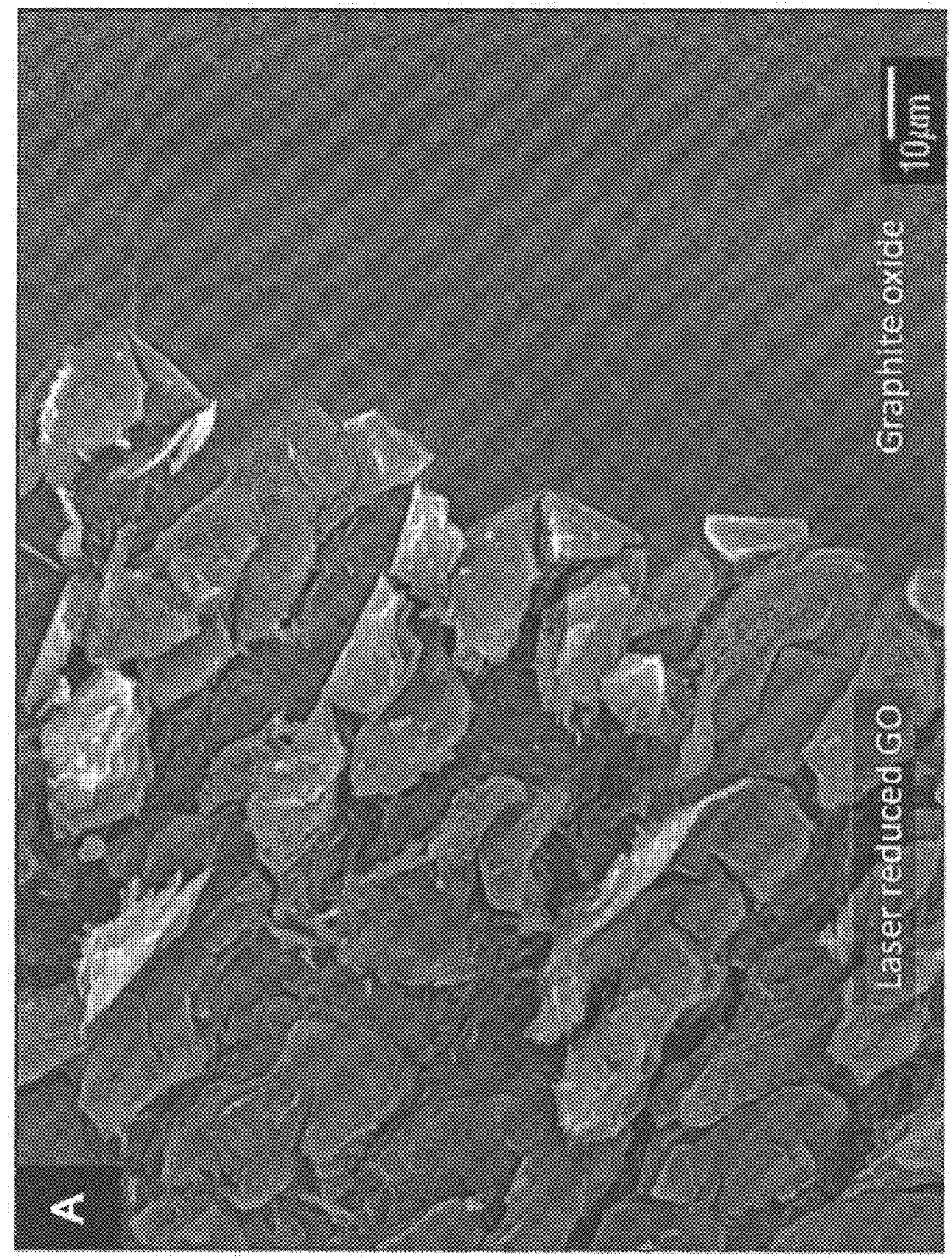
FIG. 8A is a scanning electron microscope (SEM) image that illustrates an infrared laser's effect on GO film prior to laser treatment on the right side of the image in contrast to an aligned ICCN on the left side of the image.

Scanning electron microscope (SEM) techniques are usable to understand the effects a low energy infrared laser has on the structural properties of GO film by comparing the morphological differences between an ICCN and untreated graphite oxide GO film. FIG. 8A is an SEM image that illustrates the infrared laser's effect on GO film prior to laser treatment on the right side of the image in contrast to an aligned ICCN on the left side of the image that occurs after being reduced with the infrared laser. The image not only gives a clear definition between the ICCN and untreated GO regions, but also demonstrates the level of precision possible when using this method as a means to pattern and reduce GO. The regions of ICCN, which result from the laser treatment, can be further analyzed through cross-sectional SEM.

Figure 8B:
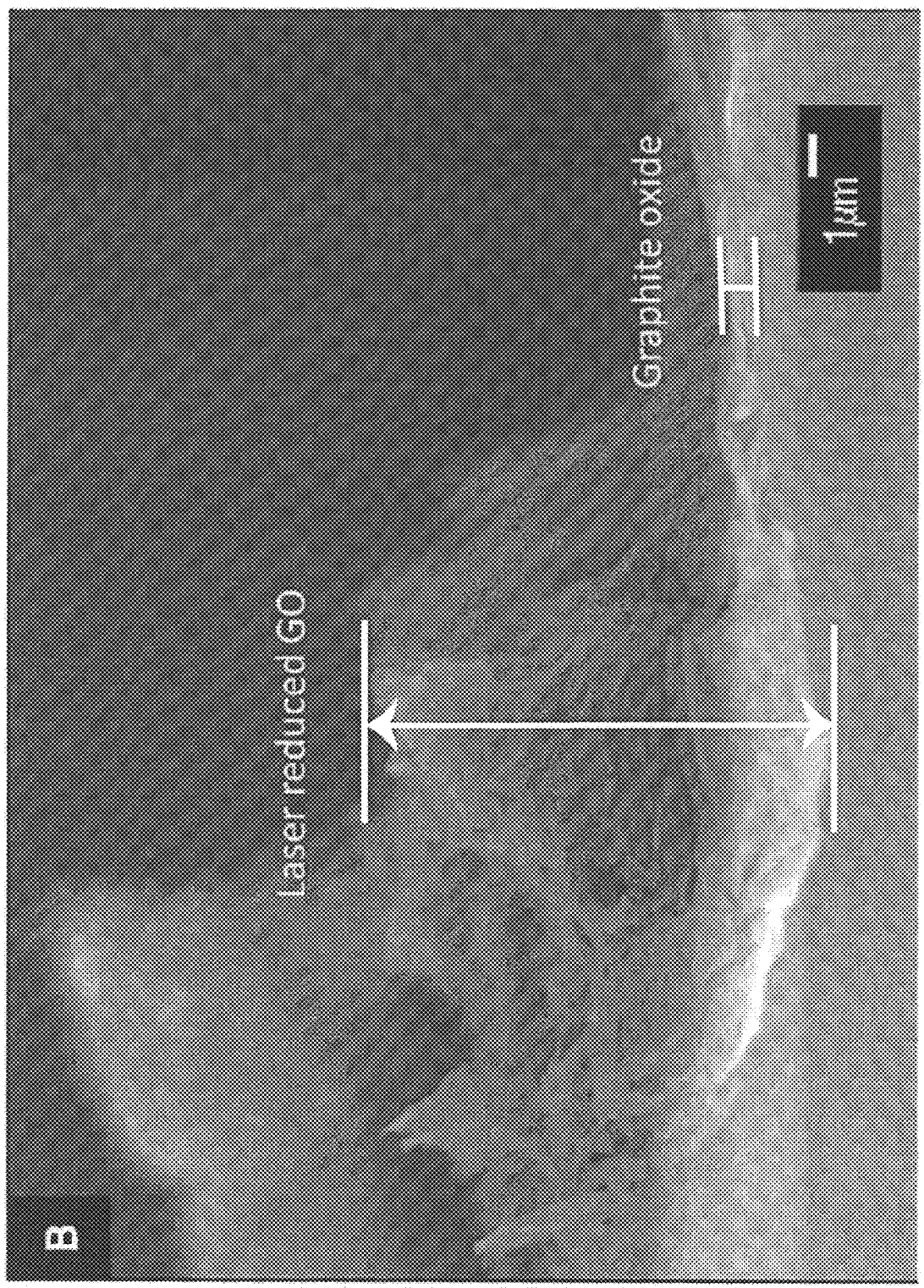
FIG. 8B is an SEM image showing that an ICCN has a thickness that is approximately 10 times larger in comparison to that of untreated GO film.
Figure 8C:
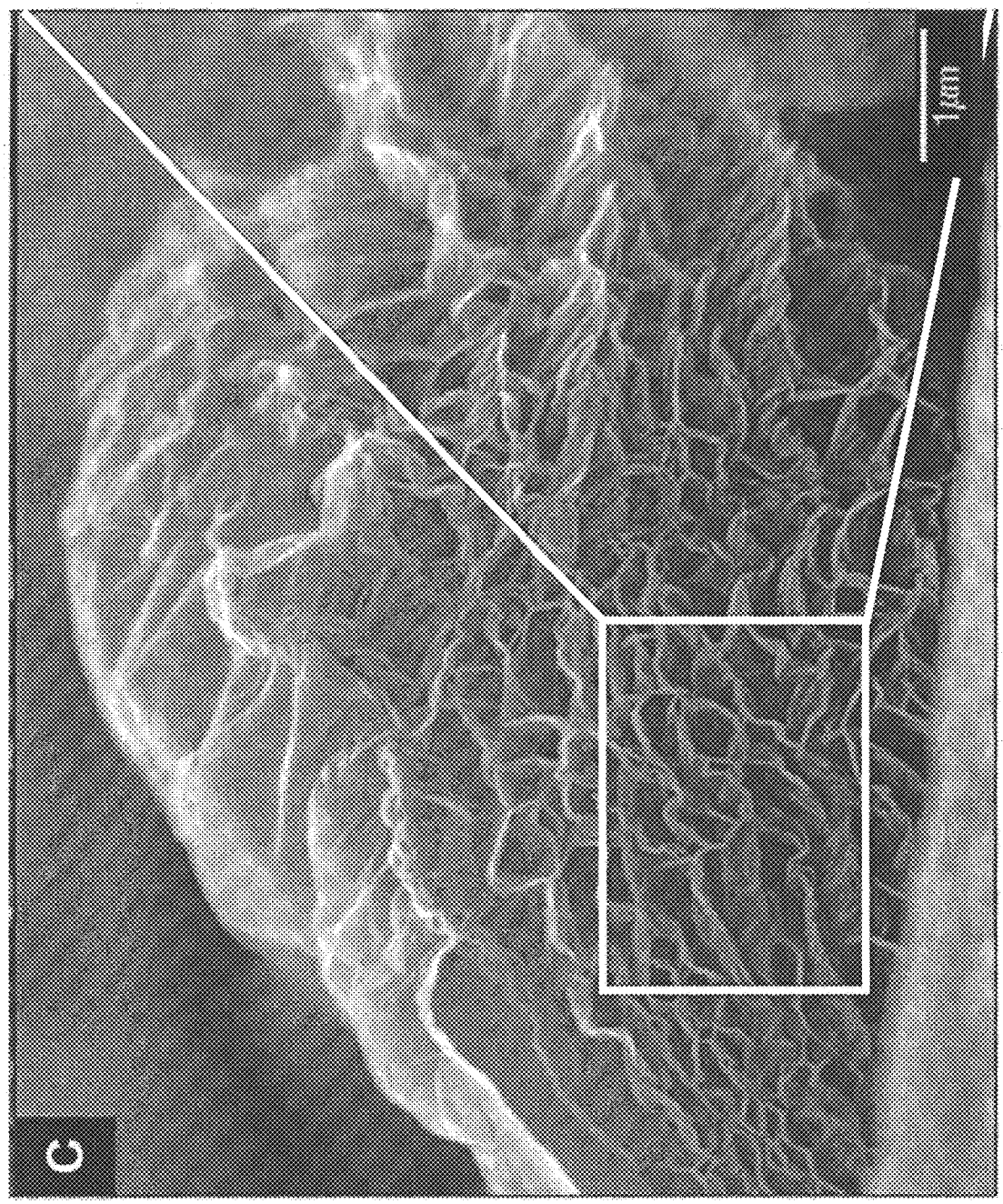
FIG. 8C is an SEM image showing a cross-sectional view of a single laser converted ICCN.

FIG. 8B is an SEM image showing a cross-sectional view of a free standing film of laser treated and untreated GO film, which shows a significant difference between GO film thicknesses. As indicated by the white brackets in FIG. 8B, an ICCN increases in thickness by approximately 10 times in comparison to that of untreated GO film. Moreover, a range of thicknesses of the plurality of expanded and interconnected carbon layers is from around about 7 μm to around 8 μm. In one embodiment, an average thickness of the plurality of expanded and interconnected carbon layers is around about 7.6 μm. The increased thickness stems from rapid degassing of gases generated and released during laser treatment, similar to thermal shock, which effectively causes the reduced GO to expand and exfoliate as these gases rapidly pass through the GO film. FIG. 8C is an SEM image showing a cross-sectional view of a single ICCN, which shows an expanded structure that is a characteristic of the ICCN of the present disclosure.

Figure 8D:
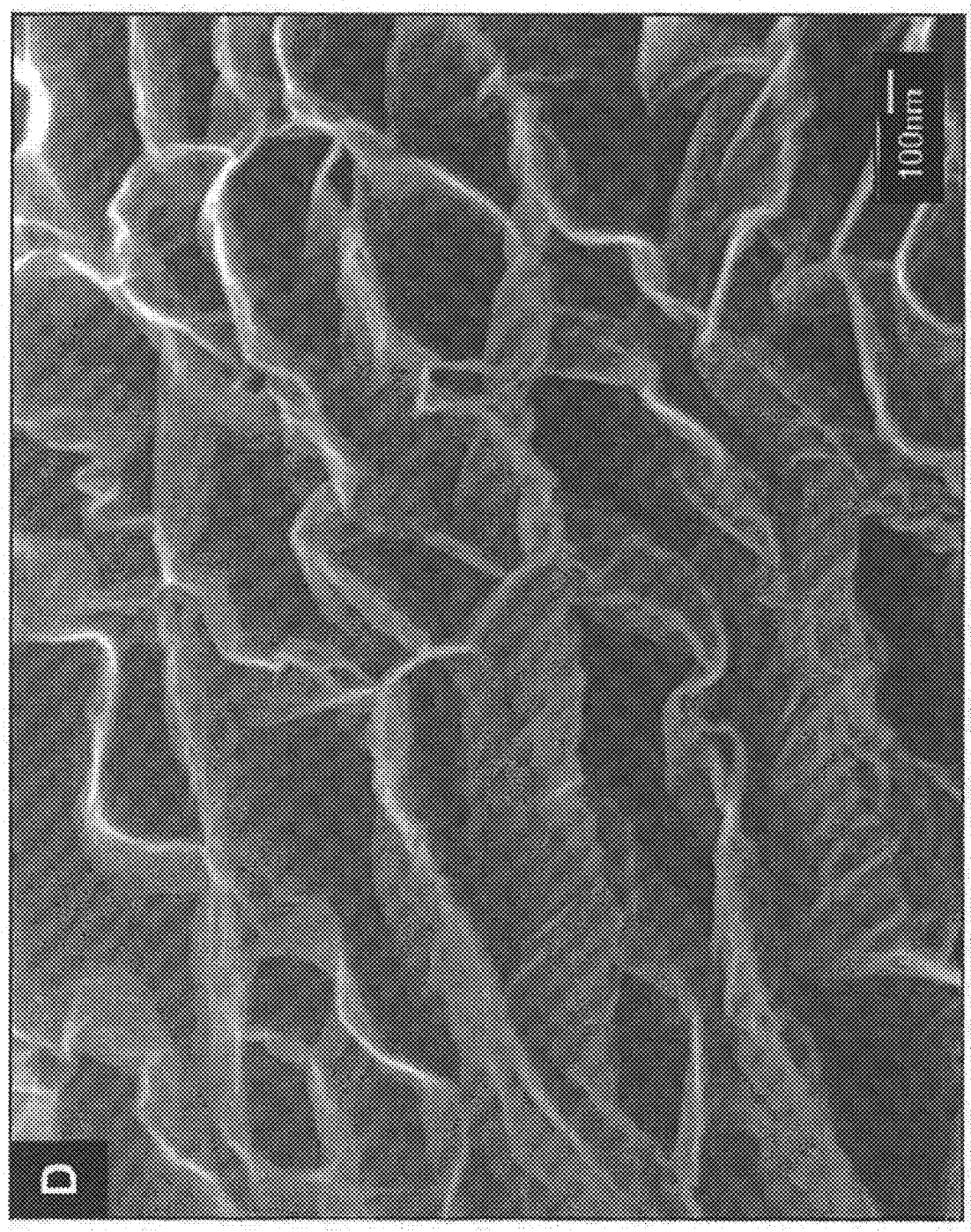
FIG. 8D is an SEM image showing a greater magnification of a selected area within the ICCN in FIG. 8C.

FIG. 8D is an SEM image showing a greater magnification of a selected area within the ICCN in FIG. 8C. The SEM image of FIG. 8D allows the thickness of the plurality of expanded and interconnected carbon layers to be calculated to be between around about 5-10 nm. However, the number of carbon layers in the plurality of expanded and interconnected carbon layers making up the ICCN is greater than around about 100. In another embodiment the number of carbon layers in the plurality of expanded and interconnected carbon layers is greater than around about 1000. In yet another embodiment the number of carbon layers in the plurality of expanded and interconnected carbon layers is greater than around about 10,000. In still another embodiment, the number of carbon layers in the plurality of expanded and interconnected carbon layers is greater than around about 100,000. The SEM analysis shows that although an infrared laser emission is only marginally absorbed by GO, enough power and focus (i.e., power density) can cause sufficient thermal energy to efficiently reduce, deoxygenate, expand, and exfoliate the GO film. Moreover, the surface area of the ICCN is greater than around about 1500 $m^2/g$.

Since each of the carbon layers has a theoretical surface area of around about 2630 $m^2/g$, a surface greater than around about 1500 $m^2/g$ indicates that almost all surfaces of the carbon layers are accessible. The ICCN has an electrical conductivity that is greater than around about 17 S/cm. The ICCN forms when some wavelength of light hits the surface of the GO, and is then absorbed to practically immediately convert to heat, which liberates carbon dioxide ($CO_2$). Exemplary light sources include but are not limited to a 780 nm laser, a green laser, and a flash lamp. The light beam emission of the light sources may range from near infrared to ultraviolet wavelengths. The typical carbon content of the ICCN is greater than around about 97% with less than around about 3% oxygen remaining. Some samples of the ICCN are greater than around about 99% carbon even though the laser reduction process is conducted in the air.

Figure 9:
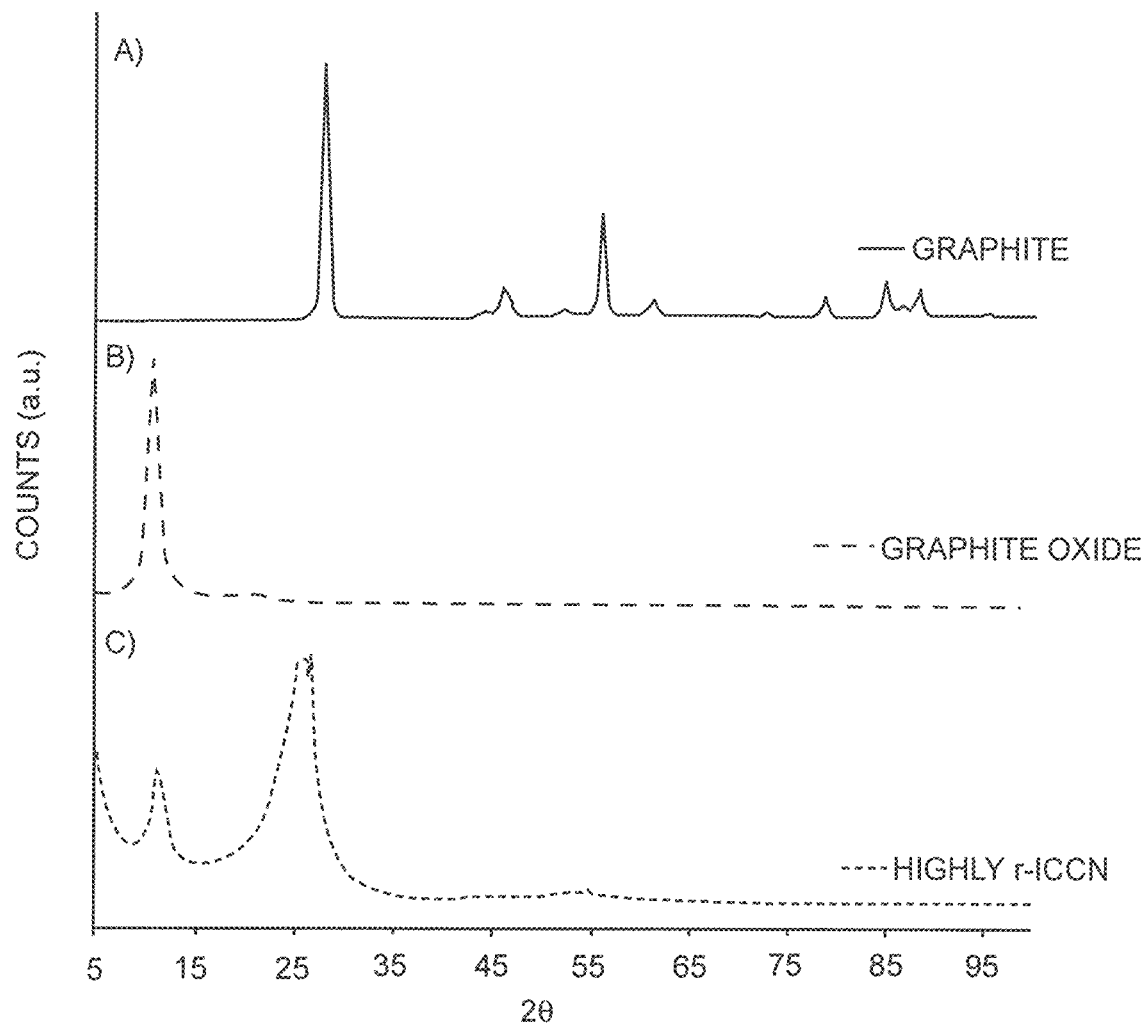
FIG. 9 compares a powder X-ray diffraction (XRD) pattern of the ICCN with both graphite and graphite oxide diffraction patterns.

FIG. 9 compares a powder X-ray diffraction (XRD) pattern of the corrugated carbon-based network with both graphite and graphite oxide diffraction patterns. A typical XRD pattern for graphite, shown in FIG. 9 trace A, displays the characteristic peak of 2θ=27.8° with a d-spacing of 3.20 Å. An XRD pattern (FIG. 9, trace B) for GO, on the other hand, exhibits a single peak of 2θ=10.76°, which corresponds to an interlayer d-spacing of 8.22 Å. The increased d-spacing in GO is due to the oxygen containing functional groups in graphite oxide sheets, which tend to trap water molecules between the basal planes, causing the sheets to expand and separate. The XRD pattern of the corrugated carbon-based network (FIG. 9, trace C) shows the presence of both GO (10.76° 2θ) and a broad graphitic peak at 25.97° 2θ associated with a d-spacing of 3.43 Å. The GO presence in the corrugated carbon-based network is expected since the laser has a desirable penetration depth, which results in the reduction of only the top portion of the film with the bottom layer being unaffected by the laser. The small presence of GO is more prominent in thicker films, but begins to diminish in thinner films. In addition, one can also observe a partially obstructed peak at 26.66° 2θ, which shows a similar intensity to the broad 25.97° 2θ peak. Both of these peaks are considered graphitic peaks, which are associated to two different lattice spacing between basal planes.

It has been previously shown that the immobilization of carbon nanotubes (CNTs) on glassy carbon electrodes will result in a thin CNT film, which directly affects the voltammetric behavior of the CNT modified electrodes. In a ferro/ferrocyanide redox couple, the voltammetric current measured at the CNT modified electrode will likely have two types of contributions. The thin layer effect is a significant contributor to the voltammetric current. The thin layer effect stems from the oxidation of ferrocyanide ions, which are trapped between the nanotubes. The other contribution results from the semi-infinite diffusion of ferrocyanide towards the planar electrode surface. Unfortunately, the mechanistic information is not easily de-convoluted and requires knowledge of the film thickness.

Figure 10:
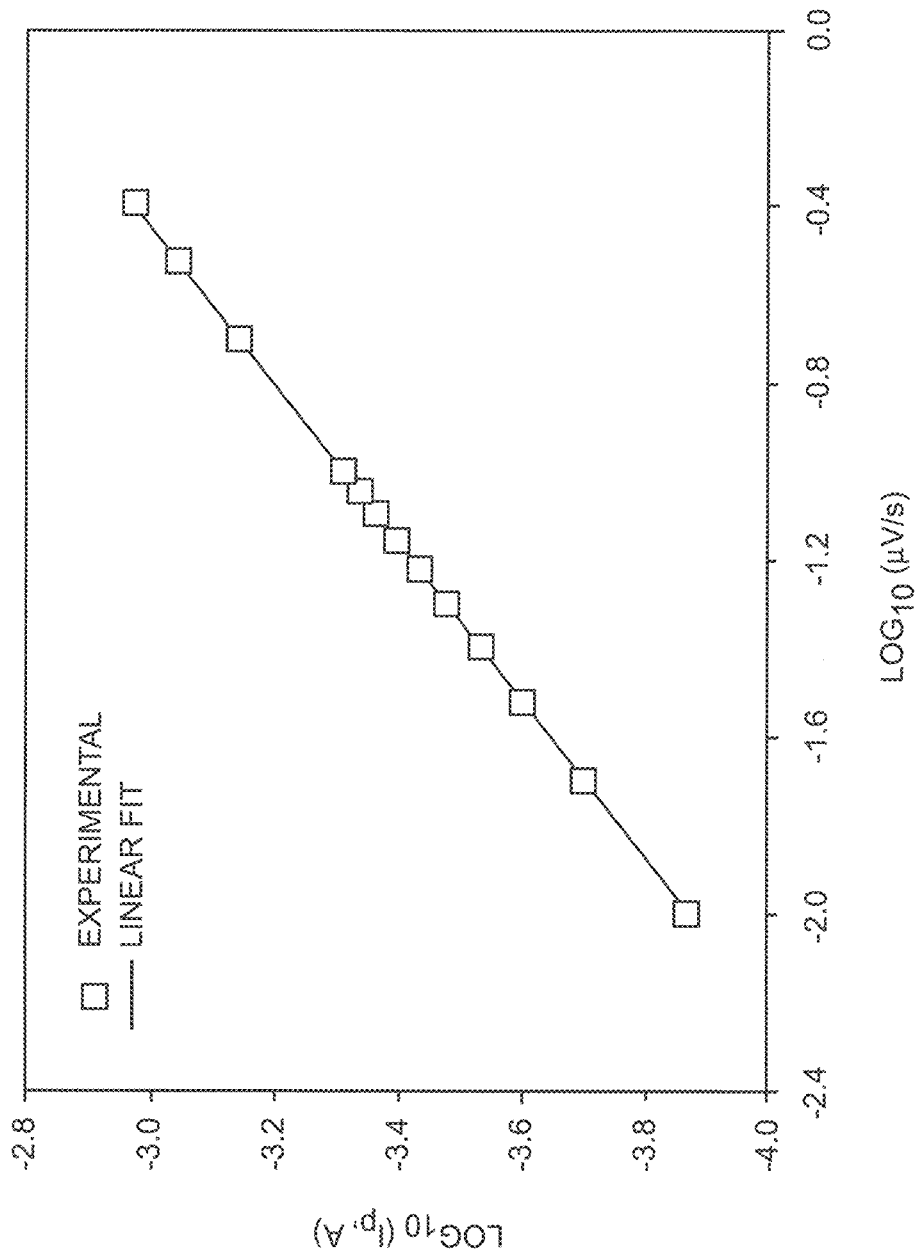
FIG. 10 is a plot of $\log_{10}$ of peak current versus $\log_{10}$ of an applied voltammetric scan rate.

In contrast, no thin layer effect is observed in association with the interconnected corrugated carbon-based network of the present disclosure. FIG. 10 is a plot of $\log_{10}$ of peak current versus $\log_{10}$ of an applied voltammetric scan rate. In this case, no thin layer effect is observed since the plot has a consistent slope of 0.53 and is linear. The slope of 0.53 is relatively close to theoretical values calculated using a semi-infinite diffusion model governed by the Randles-Sevcik equation:

$$i_p = 0.3443 A C_o^* \sqrt{\frac{D_o v (nF)^3}{RT}}$$

Figure 11A:
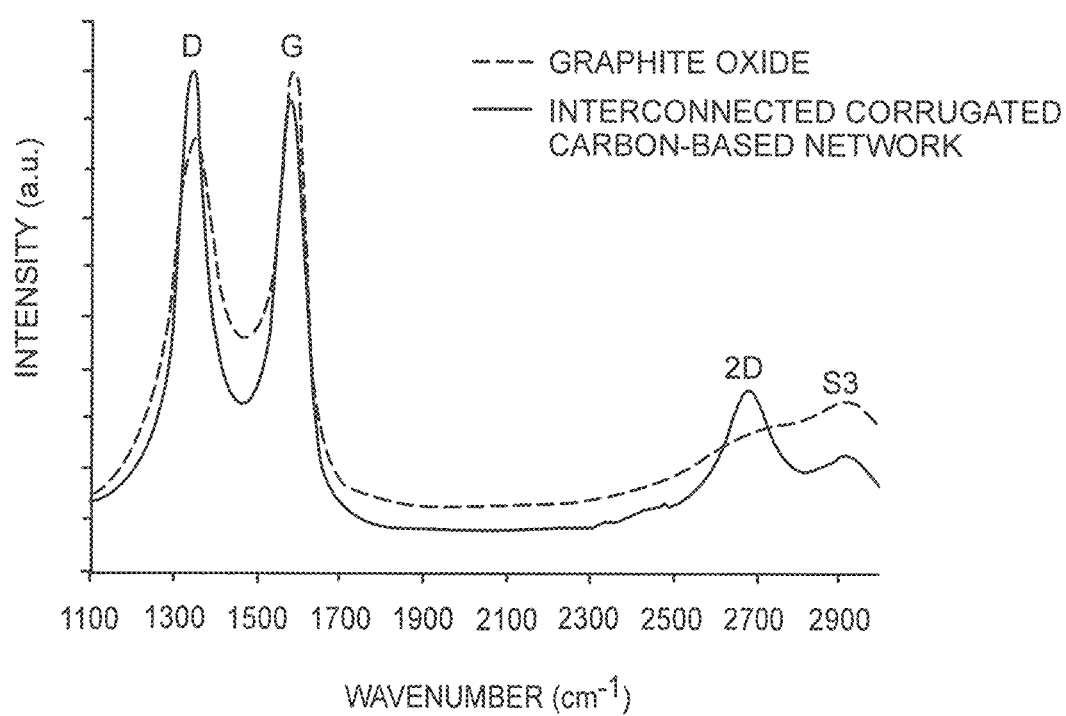
FIGS. 11A-11E are graphs related to Raman spectroscopy analysis.

Raman spectroscopy is used to characterize and compare the structural changes induced by laser treating GO film. FIGS. 11A-11E are graphs related to Raman spectroscopic analysis. As can be seen in FIG. 11A, characteristic D, G, 2D and S3 peaks are observed in both GO and the ICCN. The presence of the D band in both spectra suggests that carbon $sp^3$ centers still exist after reduction. Interestingly, the spectrum of the ICCN shows a slight increase in the D band peak at around about 1350 $cm^{-1}$. This unexpected increase is due to a larger presence of structural edge defects and indicates an overall increase in the amount of smaller graphite domains. The result is consistent with SEM analysis, where the generation of exfoliated accordion-like graphitic regions (FIG. 5) caused by the laser treatment creates a large number of edges. However the D band also shows a significant overall peak narrowing, suggesting a decrease in these types of defects in the ICCN. The G band experiences a narrowing and a decrease in peak intensity as well as a peak shift from around about 1585 to 1579 $cm^{-1}$. These results are consistent with the re-establishment of $sp^2$ carbons and a decrease in structural defects within the basal planes. The overall changes in the G band indicate a transition from an amorphous carbon state to a more crystalline carbon state. In addition, a prominent and shifted 2D peak from around about 2730 to around about 2688 $cm^{-1}$ is seen after GO is treated with the infrared laser, indicating a considerable reduction of the GO film and strongly points to the presence of a few-layer interconnected graphite structure. In one embodiment, the 2D Raman peak for the ICCN shifts from around about 2700 $cm^{-1}$ to around about 2600 $cm^{-1}$ after the ICCN is reduced from a carbon-based oxide. Moreover, as a result of lattice disorder, the combination of D-G generates an S3 second order peak, which appears at around about 2927 $cm^{-1}$ and, as expected, diminishes with decreasing disorder after infrared laser treatment. In some embodiments, the plurality of expanded and interconnected carbon layers has a range of Raman spectroscopy S3 second order peak that ranges from around about 2920 $cm^{-1}$ to around about 2930 $cm^{-1}$. The Raman analysis demonstrates the effectiveness of treating GO with an infrared laser as a means to effectively and controllably produce the ICCN.

Figure 11B:
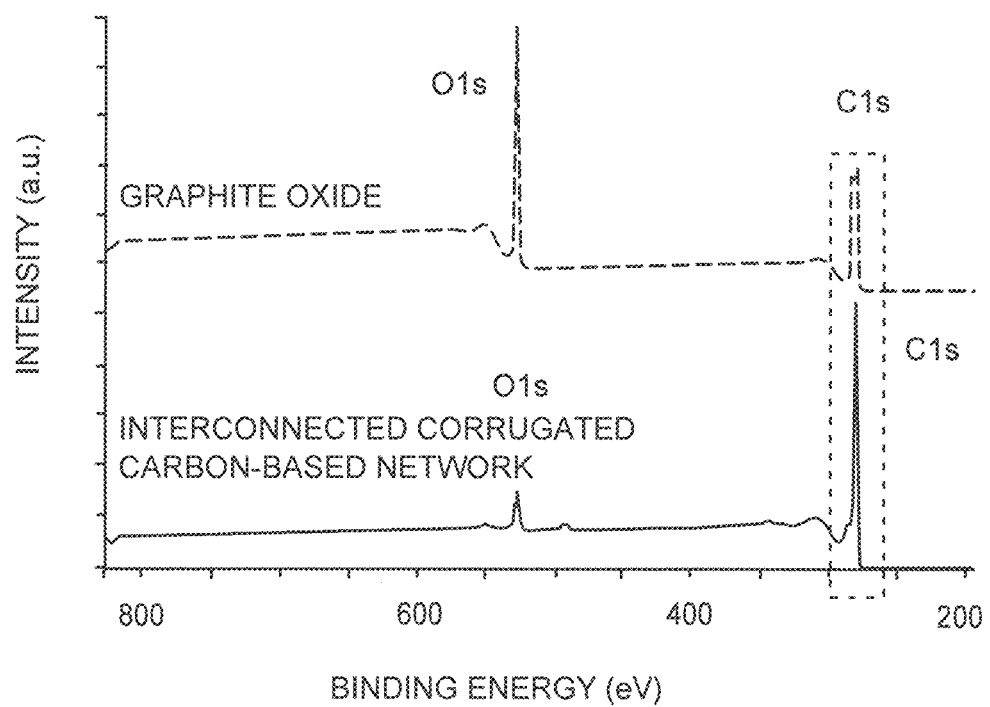

X-ray photoelectron spectroscopy (XPS) was employed to correlate the effects of laser irradiation on the oxygen functionalities and to monitor the structural changes on the GO film. Comparing the carbon to oxygen (C/O) ratios between GO and the ICCN provides an effective measurement of the extent of reduction achieved using a simple low energy infrared laser. FIG. 11B illustrates the significant disparity between the C/O ratios before and after laser treatment of the GO films. Prior to laser reduction, typical GO films have a C/O ratio of approximately 2.6:1, corresponding to a carbon/oxygen content of around about 72% and 38%. In one exemplary embodiment, the ICCN has an enhanced carbon content of around about 96.5% and a diminished oxygen content of around about 3.5%, giving an overall C/O ratio of 27.8:1. In yet another exemplary embodiment, a laser reduction of GO results in a C/O ratio of 333:1, which is around about 0.3% oxygen content. This relatively low oxygen content was measured using photoelectron spectroscopy (XPS). In other embodiments, the plurality of expanded and interconnected carbon layers has a C/O ratio that ranges from around about 333:1 to around about 25:1. Since the laser reduction process takes place under ambient conditions, it is postulated that some of the oxygen present in the ICCN film is a result of the film having a static interaction with oxygen found in the environment.

Figure 11C:
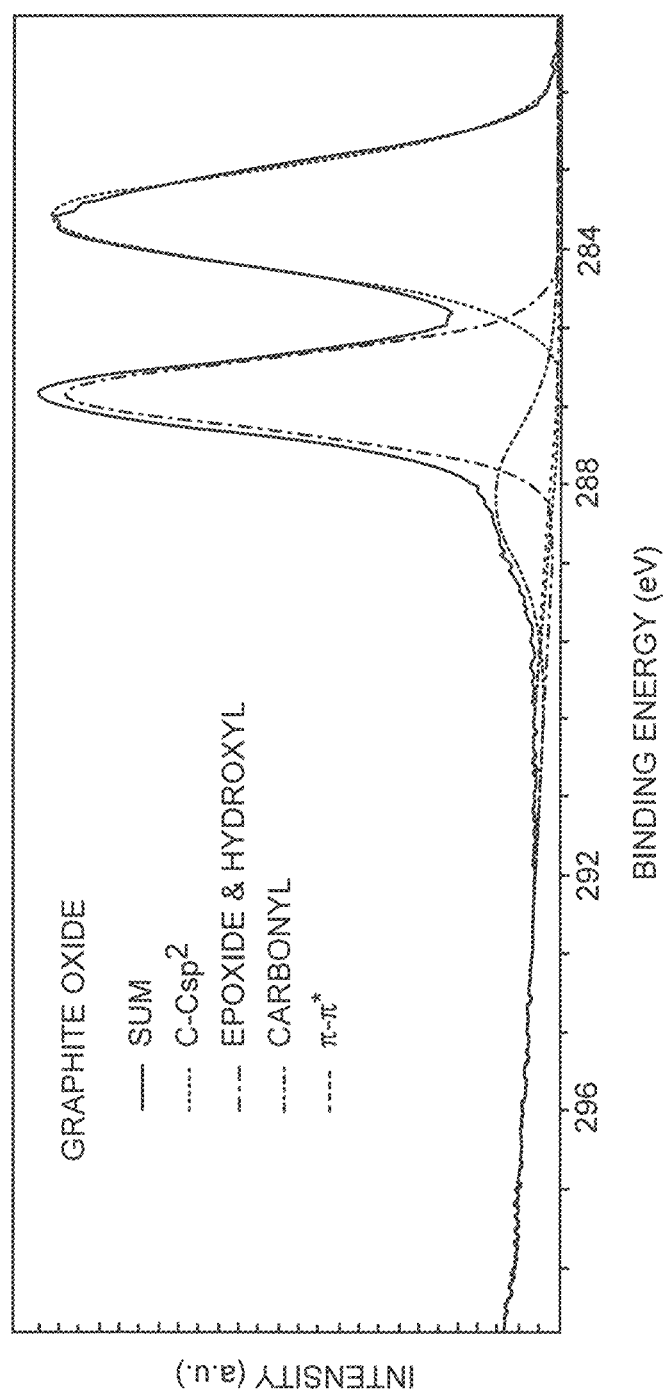

FIG. 11C shows that the C1s XPS spectrum of GO displays two broad peaks, which can be resolved into three different carbon components corresponding to the functional groups typically found on the GO surface, in addition to a small π to π* peak at 290.4 eV. These functional groups include carboxyl, $sp^3$ carbons in the form of epoxide and hydroxyl, and sp² carbons, which are associated with the following binding energies: approximately 288.1, 286.8 and 284.6 eV, respectively.

Figure 11D:
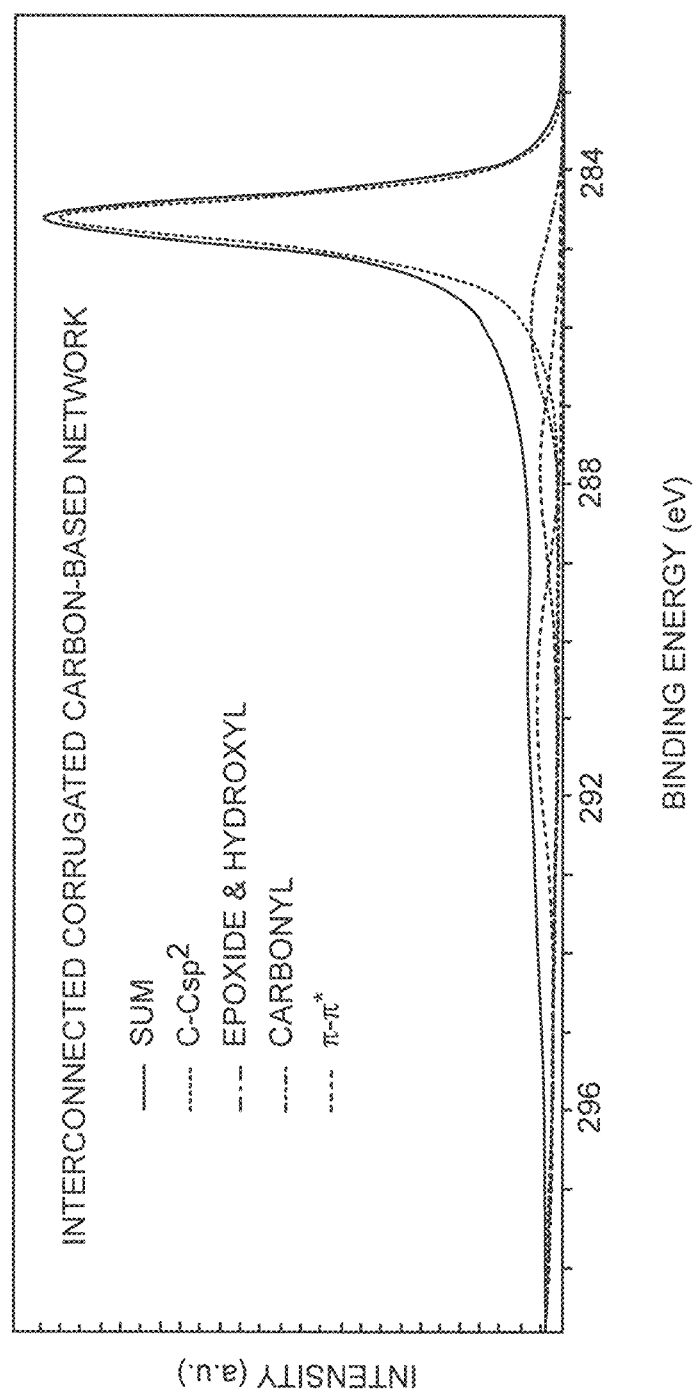

FIG. 11D shows expected results, in that the large degree of oxidation in GO results in various oxygen components in the GO C1s XPS spectrum. These results are in contrast to the ICCN, which shows a significant decrease in oxygen containing functional groups and an overall increase in the C—C sp² carbon peak. This points to an efficient deoxygenating process as well as the re-establishment of C=C bonds in the ICCN. These results are consistent with the Raman analysis. Thus, an infrared laser such as the LWL 34 (FIG. 2) is powerful enough to remove a majority of the oxygen functional groups, as is evident in the XPS spectrum of the ICCN, which only shows a small disorder peak and a peak at 287.6 eV. The latter corresponds to the presence of sp³ type carbons suggesting that a small amount of carboxyl groups remain in the final product. In addition, the presence of a π to π* satellite peak at ~290.7 eV indicates that delocalized π conjugation is significantly stronger in the ICCN as this peak is miniscule in the GO XPS spectrum. The appearance of the delocalized π peak is a clear indication that conjugation in the GO film is restored during the laser reduction process and adds support that an sp² carbon network has been re-established. The decreased intensity of the oxygen containing functional groups, the dominating C=C bond peak and the presence of the delocalized π conjugation all indicate that a low energy infrared laser is an effective tool in the generation of the ICCN.

Figure 11E:
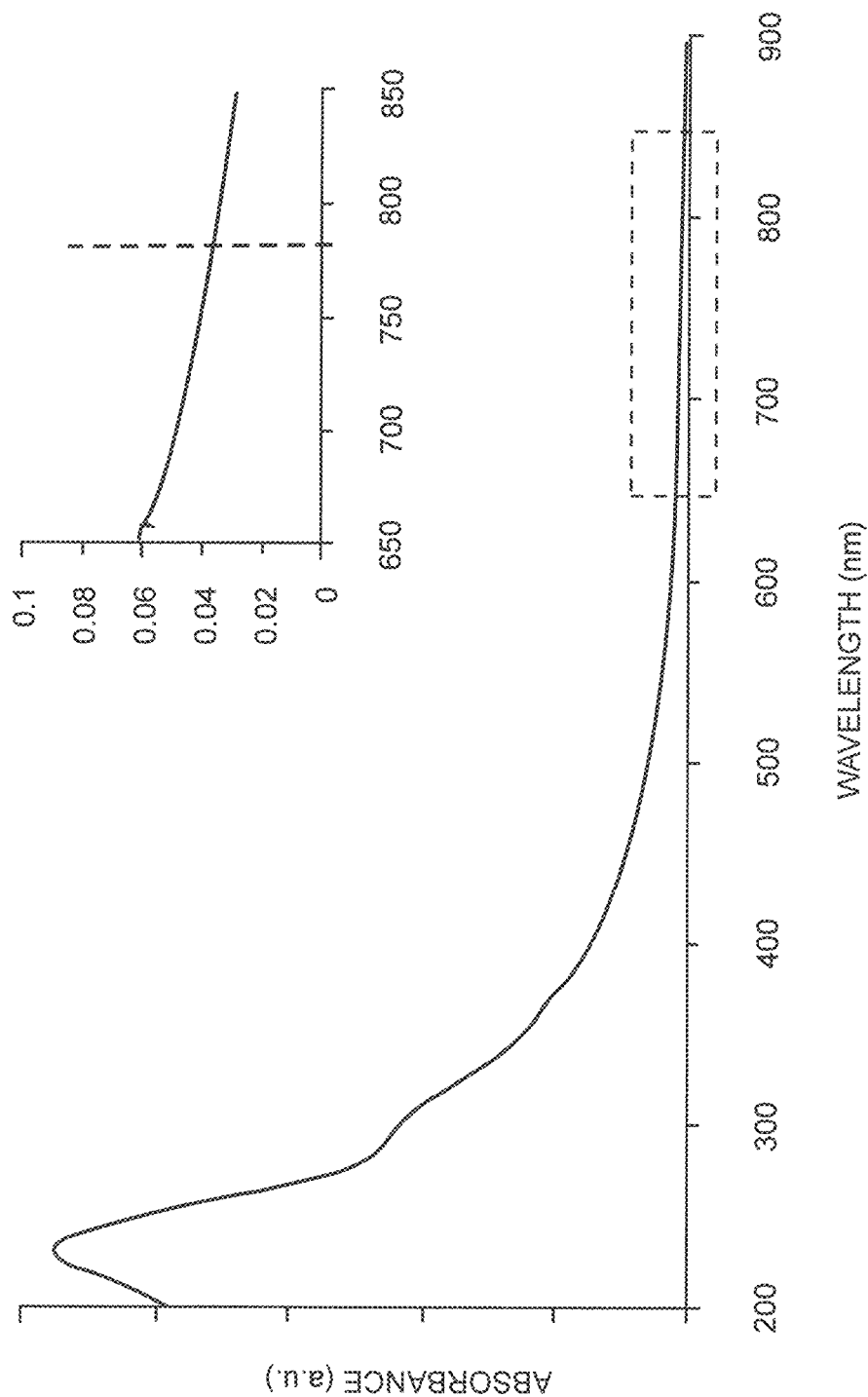

FIG. 11E depicts UV-visible light absorbance spectra of GO shown in black. The inset shows a magnified view of the boxed area showing the absorbance of GO with respect to a 780 nm infrared laser in the 650 to 850 nm region.

Having established that an ICCN has an effective π conjugation, it is possible to construct devices to make use of the conducting material. In this regard, at least one embodiment of the present disclosure provides the production of ICCN ECs through a simple all-solid-state approach that avoids the restacking of carbon sheets such as the corrugated carbon sheet 88 (FIG. 5). Irradiation of the GO film 72 (FIG. 3) with an infrared laser such as the LWL 34 (FIG. 2) inside the inexpensive commercially available direct-to-disc labeling type optical disc drive system 26 (FIG. 2) which, as discussed above, reduces the GO film 72 to an ICCN, as indicated by the change in film color from golden brown to black. Analysis of cross sections of the film with scanning electron microscopy showed that the initially stacked GO sheets were converted into partially-exfoliated carbon sheets through laser irradiation (FIG. 3). The resulting ICCN showed excellent conductivity (around about 1738 S/m) as opposed to 10 to 100 S/m for activated carbons, the current state-of-the-art material used in commercial devices.

Figure 12A:
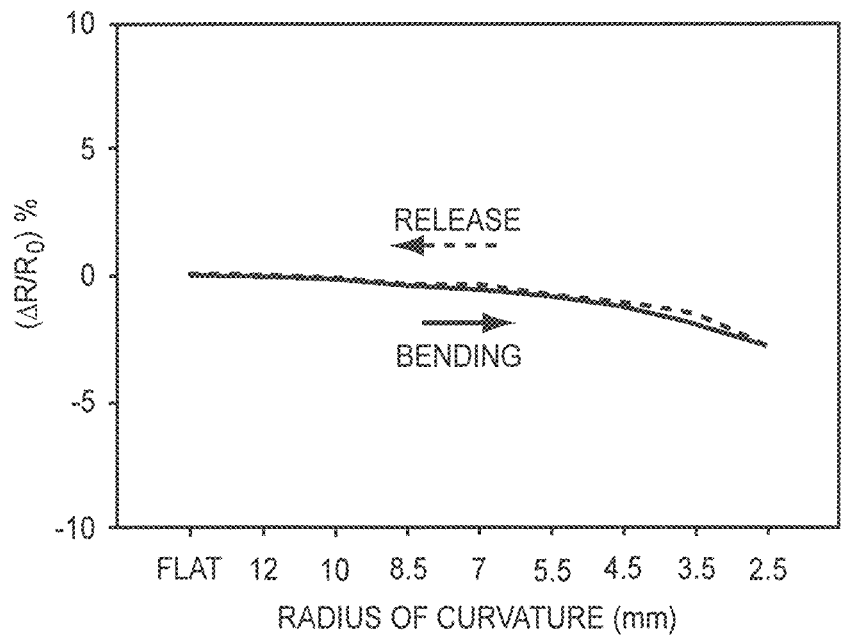
FIG. 12A is a graph depicting an electrical resistance change of a flexible ICCN electrode as a function of a bending radius.
Figure 12B:
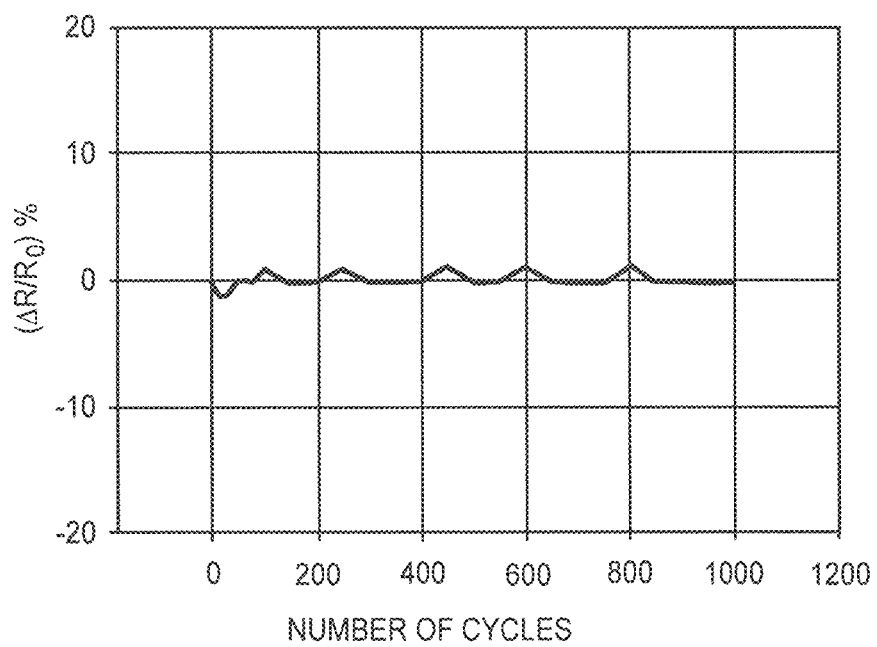
FIG. 12B is a graph depicting an electrical resistance change of a flexible ICCN electrode as a function of bending cycles.

In addition, FIGS. 12A and 12B show that the ICCN made up of corrugated carbon sheets shows excellent mechanical flexibility with only around about 1% change in the electrical resistance of the film after 1000 bending cycles. Thus, ICCNs can be directly used as EC electrodes without the need for any additional binders or conductive additives. More importantly, these properties allow ICCNs to act as both an active material and current collector in the EC. The combination of both functions in a single layer leads to a simplified and lightweight architecture. Thus, a device can be readily made by sandwiching an ion porous separator [Celgard 3501 (Celgard, Charlotte, NC)] between two ICCN electrodes. ICCN ECs are relatively thin with a total thickness of less than around about 100 mm, making them potentially useful in microdevice applications. Other devices can be made by putting ICCNs on porous substrates such as a nitrocellulose membrane or photocopy paper or on conductive aluminum foil, which is often used in commercial devices. Therefore, ICCN ECs can be readily made into different designs, including stacked and spirally wound structures to target different applications.

The ICCN electrodes are fabricated to satisfy the critical features for high-performance ECs. First, the relatively large and accessible specific surface area of an ICCN (1520 m²/g compared with 1000 to 2000 m²/g for a typical activated carbon material) results in a sizeable charge storage capacity and accounts for the high areal and volumetric stack capacitances observed. Second, the LWL 34 (FIG. 2) that is typically a LightScribe or a LabelFlash laser, causes the simultaneous reduction and partial exfoliation of GO sheets and produces the ICCN 80 (FIG. 5). The novel structure of the ICCN 80 is porous, which prevents the agglomeration of carbon sheets, which has been a major barrier in achieving the full potential of carbon-based ECs. The network structure of the ICCN 80 has open pores, which facilitates electrolyte accessibility to the electrode surfaces. This offers an opportunity to optimize ionic diffusion in the electrodes 82, which is crucial for charging the electrochemical double layers (EDLs), and generates high power ECs. Moreover, the ICCN 80 possesses excellent electronic conductivity, which is another key factor for achieving high power. Working with these properties, three dimensional composite electrodes have been successfully used to make batteries with relatively high energy density and fast charge/discharge rates. Although activated carbons can provide high surface area, the difficulty of controlling their pore structure and pore size distribution has so far limited the energy densities and rate capabilities of commercial ECs.

Figure 13A:
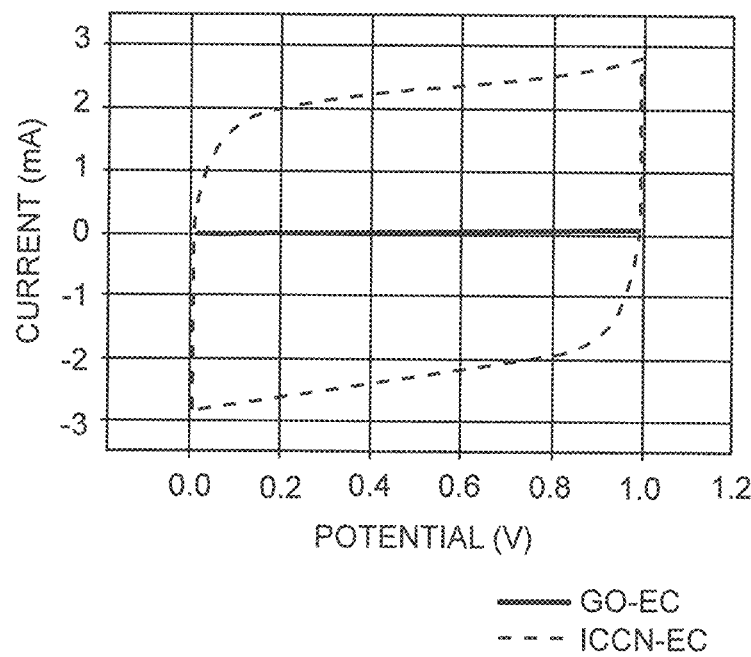
FIG. 13A is a cyclic voltammetry graph comparing a GO electrochemical capacitor (EC) with an ICCN EC.
Figure 13B:
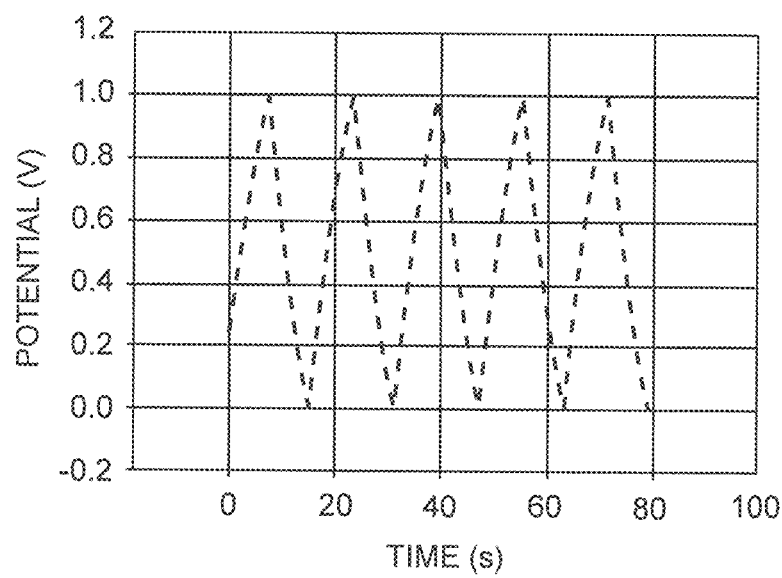
FIG. 13B is a graph depicting galvanostatic charge/discharge (CC) curves of an ICCN EC measured at a high current density of 10 $A/g_{ICCN/electrode}$.
Figure 13C:
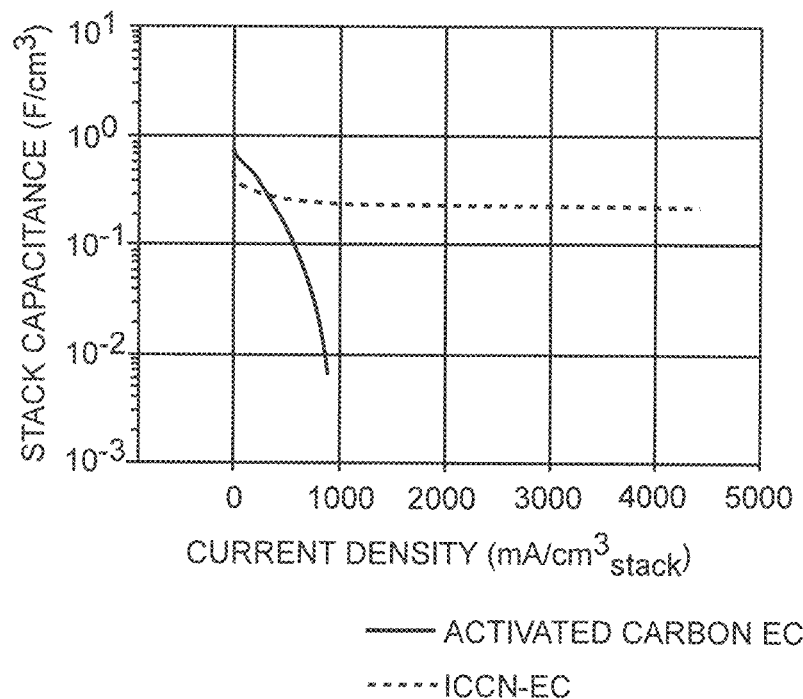
FIG. 13C is a graph of volumetric stack capacitance of an ICCN EC that is calculated from the CC curves at different charge/discharge current densities.
Figure 13D:
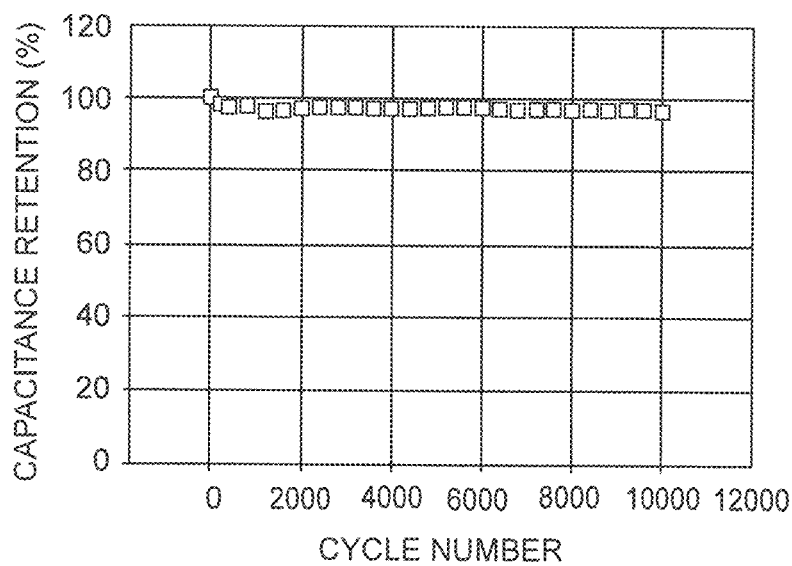
FIG. 13D is a graph of ICCN EC cyclic stability versus CC cycles.

In order to demonstrate the superior performance of ICCN electrodes for electrochemical energy storage, symmetric ICCN ECs were assembled using polyethylene terephthalate (PET) as a thin flexible substrate and an aqueous electrolyte of 1.0 molar (M) phosphoric acid ($H_3PO_4$). As shown in FIGS. 13A-13F, the ICCN EC performance was analyzed through both cyclic voltammetry (CV) and galvanostatic charge/discharge (CC) experiments. In comparison with GO, the ICCN EC shows an enhanced electrochemical performance with a nearly rectangular CV shape at a scan rate of 1000 mV/s, which is indicative of nearly ideal capacitive behavior (FIG. 13A) even though no metal current collectors, binders, or electroactive additives were used, as is the case in commercial ECs. Additionally, the ICCN EC is robust enough to be charged and discharged over a wide range of scan rates (100 to 10,000 mV/s) and still maintain its nearly ideal rectangular CV shape. FIG. 13B shows the nearly triangular shape of the CC curves obtained at a high current density of 10 A/g of ICCN per electrode (abbreviated 10 A/$g_{ICCN/electrode}$). This is indicative of the formation of an efficient EDL and fast ion transport within the ICCN electrodes. In addition, these CC curves show only a small voltage drop of 0.018 V at the start of the discharge curve, indicating a device with a low equivalent series resistance (ESR). The specific capacitance from the CC curves was measured over a wide range of charge/discharge current densities. Here, the areal and volumetric capacitances of the stack (this includes the flexible substrate, the current collector, the active material, and the separator) were calculated and compared with a commercial activated-carbon EC (AC-EC) tested under the same dynamic conditions. Although the AC-EC shows a slightly higher volumetric capacitance at low charge/discharge rates, its capacitance falls off quickly at higher rates, whereas the ICCN EC continues to provide high capacitance even when operated at very high rates (FIG. 13C). In addition, the areal capacitance of the ICCN EC was calculated to be 3.67 mF/cm$^2$ and 4.04 mF/cm$^2$ in 1.0 M H$_2$SO$_4$ at 1 A/g$_{ICCN/electrode}$. The device also shows a very high rate capability while still maintaining a capacitance of more than 1.84 mF/cm$^2$, even when the ICCN EC is operated at an ultrafast charge/discharge rate of 1000 A/g$_{ICCN/electrode}$. This is comparable with values reported in the literature for micro-devices and thin film ECs at much lower current charge/discharge rates (0.4 to 2 mF/cm$^2$). These ECs can be efficiently charged/discharged on the 0.1-s time scale. Additionally, the ICCN EC retained around about 96.5% of its initial capacitance after 10,000 cycles (FIG. 13D).

Figure 13E:
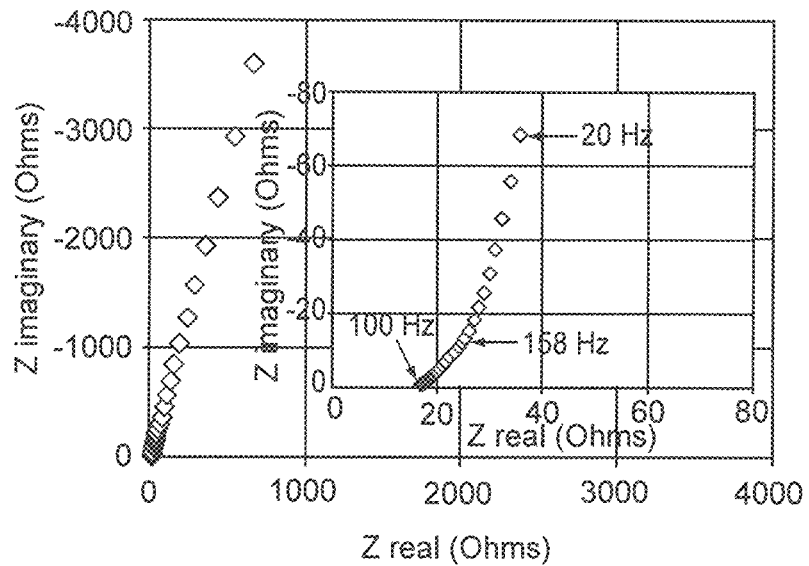
FIG. 13E is a graph of a complex plane plot of the impedance of an ICCN EC, with a magnification for the high-frequency region in a graph inset.
Figure 13F:
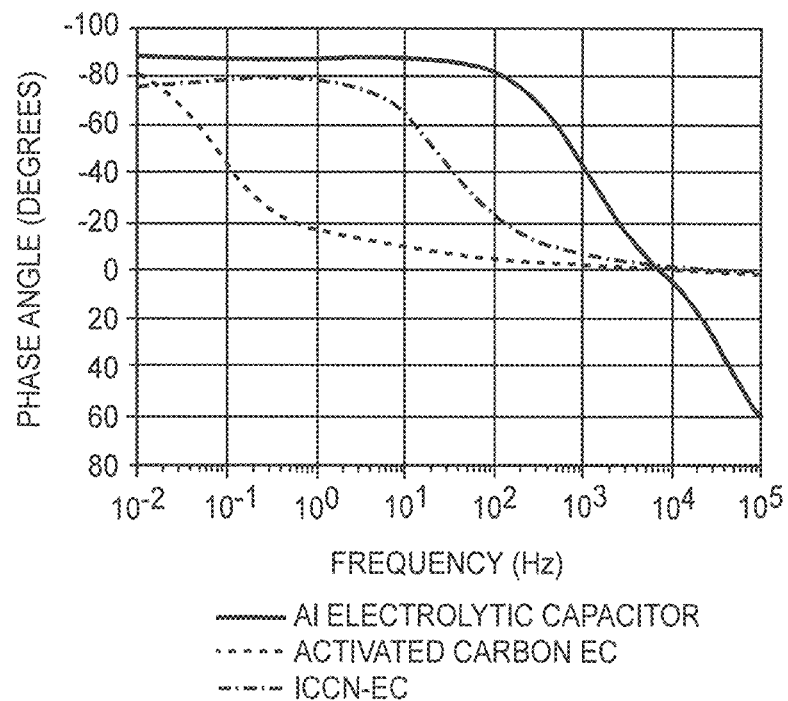
FIG. 13F is a graph of impedance phase angle versus frequency for an ICCN EC and a commercial activated carbon EC.

Electrochemical impedance spectroscopy (EIS) confirmed fast ion transport within the ICCN electrodes. A complex plan plot of the impedance data of the ICCN EC is shown in FIG. 13E with an expanded view provided in the inset. The device displays a pure capacitive behavior, even at high frequencies of up to ~158 Hz. The series resistance of the device is estimated to be ~16 ohms. This value can be attributed to the contact resistance of the device with the external circuit that could be reduced by using current collectors. The dependence of the phase angle on the frequency for the ICCN EC, AC-EC, and an aluminum electrolytic capacitor is shown in FIG. 13F. For frequencies up to 10 Hz, the phase angle of the ICCN EC is close to −90°, which suggests that the device functionality is close to that of an ideal capacitor. The characteristic frequency f0 for a phase angle of −45° is 30 Hz for the ICCN EC. This frequency marks the point at which the resistive and capacitive impedances are equal. The corresponding time constant t0 (=1/f0) equals 33 ms compared with 10 seconds for the conventional AC-EC and 1 ms for the aluminum electrolytic capacitor. This rapid frequency response of the ICCN EC can be accounted for by the large and accessible surface area of the ICCN, whose exposed flat sheets enhance the ion transport rate in the device. This is consistent with results reported recently for an EC made from vertically oriented graphene nanosheets grown directly on metal current collectors and carbon nanotube electrodes made with an electrophoretic deposition technique.

Figure 14A:
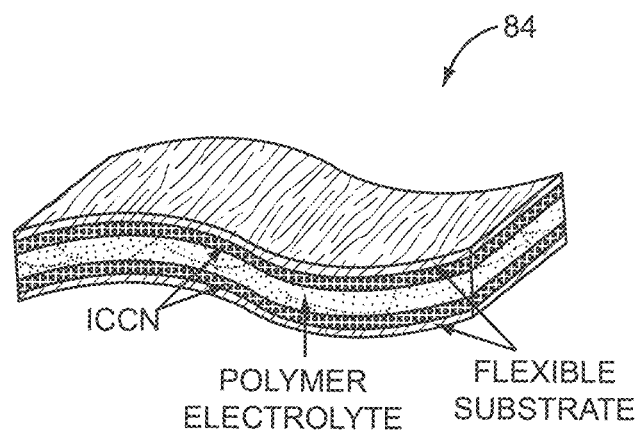
FIG. 14A is a structural diagram of an assembled ICCN EC.
Figure 14B:
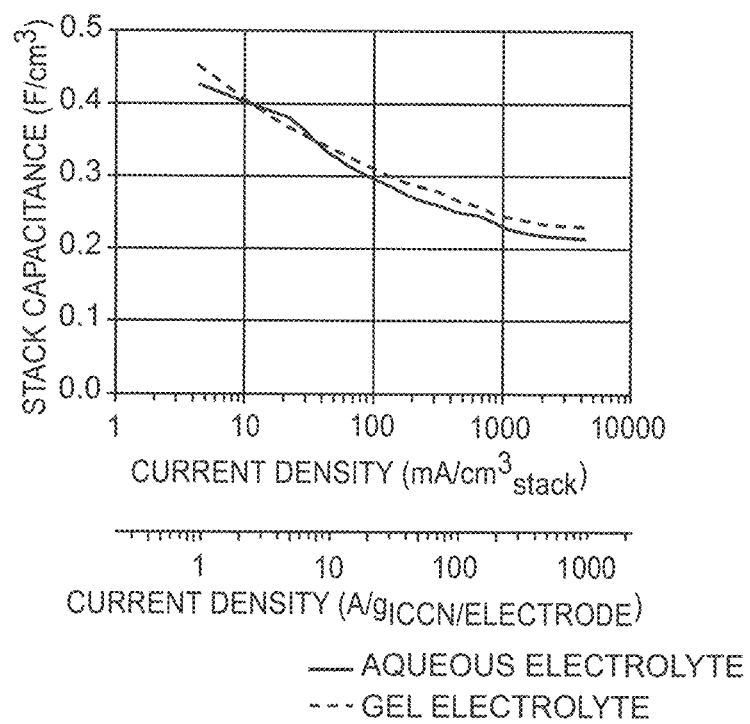
FIG. 14B is a graph of stack capacitance as a function of current density.
Figure 14C:
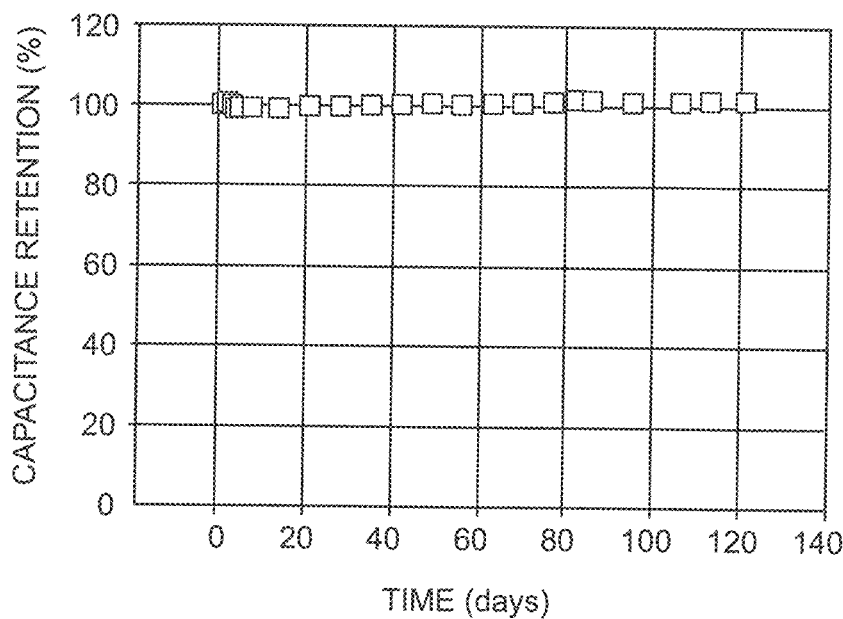
FIG. 14C is a graph of capacitance retention for the ICCN EC over a 4 month period.

The future development of multifunctional flexible electronics such as roll-up displays, photovoltaic cells, and even wearable devices presents new challenges for designing and fabricating lightweight, flexible energy storage devices. Commercially available ECs consist of a separator sandwiched between two electrodes with liquid electrolyte, which is then either spirally wound and packaged into a cylindrical container or stacked into a button cell. Unfortunately, these device architectures not only suffer from the possible harmful leakage of electrolytes, but their design makes it difficult to use them for practical flexible electronics. Referring to FIG. 14A depicting the structure of the EC 84, the liquid electrolyte was replaced with poly(vinyl alcohol) (PVA)-H$_3$PO$_4$ polymer gelled electrolyte, which also acts as the separator. This electrolyte reduced the device thickness and weight compared with phosphoric acid and simplified the fabrication process because it does not require any special packaging materials. As demonstrated in FIG. 14B, at any given charge/discharge rate, the specific capacitance values for the all-solid-state device were comparable with those obtained with an aqueous electrolyte. The high-rate performance of the EC 84 can be accounted for by the porous structure of the ICCN electrodes, which can effectively absorb the gelled electrolyte and act as an electrolyte reservoir to facilitate ion transport and minimize the diffusion distance to the interior surfaces. Another key factor is that ICCN electrodes are binder free, thus enabling a reduction in interfacial resistance and enhancing the electrochemical reaction rate. As illustrated in FIG. 14C, the device performance was completely stable over 4 months of testing. As with the aqueous ICCN EC, the flexible all-solid-state ICCN EC maintains its excellent cycling stability: >97% of the initial capacitance was maintained even after 10,000 cycles.

Figure 14D:
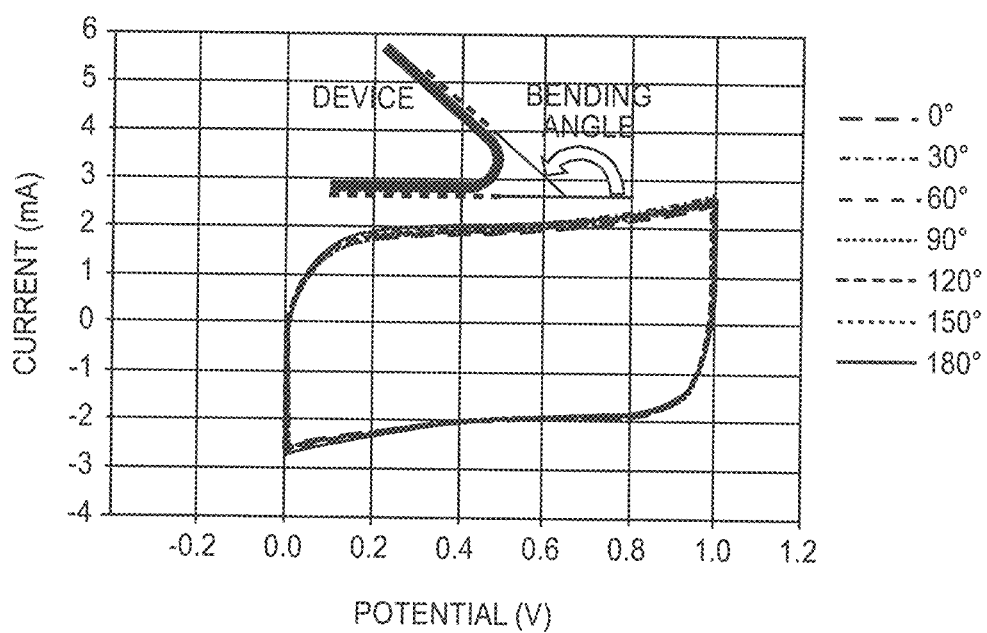
FIG. 14D is a graph of cyclic voltammetry (CV) performance of the ICCN EC when tested under different bending conditions.

In order to evaluate under real conditions the potential of all-solid-state ICCN ECs, such as the EC 84, for flexible energy storage, a device was placed under constant mechanical stress and its performance analyzed. FIG. 14D shows the CV performance of this device when tested under different bending conditions. The bending had almost no effect on the capacitive behavior; it can be bent arbitrarily without degrading performance. Moreover, the stability of the device was tested for more than 1000 cycles while in the bent state, with only ~5% change in the device capacitance. This performance durability can be attributed to the high mechanical flexibility of the electrodes along with the interpenetrating network structure between the ICCN electrodes and the gelled electrolyte. The electrolyte solidifies during the device assembly and acts like a glue that holds all the device components together, improving the mechanical integrity and increasing its cycle life even when tested under extreme bending conditions. Because the increased cycle life of the present EC has yet to be realized in commercial devices, the present ECs may be ideal for next-generation flexible, portable electronics.

Figure 14E:
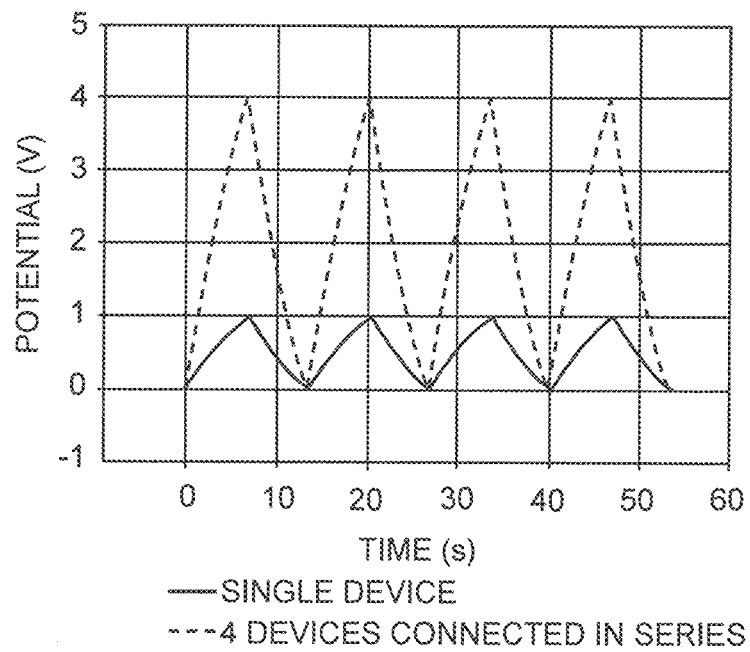
FIG. 14E is a graph of galvanostatic charge/discharge curves for four tandem ICCN ECs connected in series.
Figure 14F:
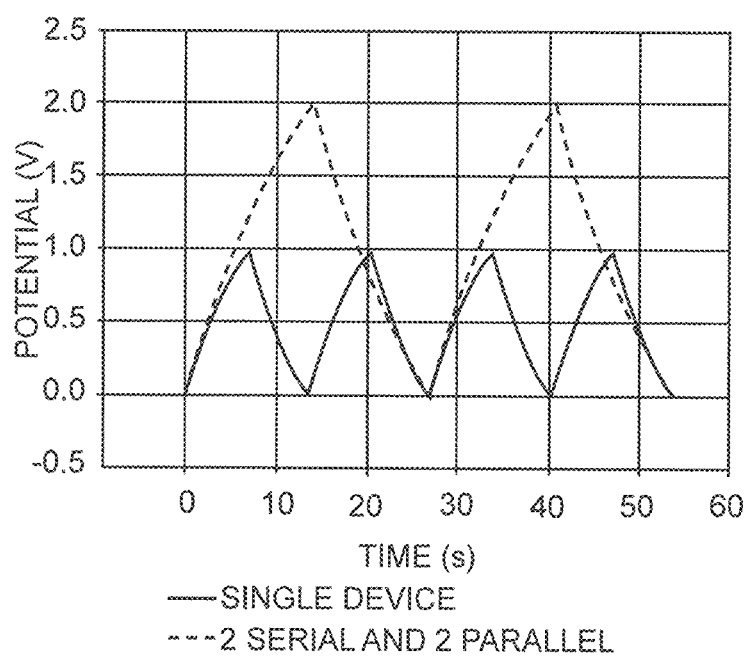
FIG. 14F is a graph of galvanostatic charge/discharge curves for four ICCN ECs in a series and parallel combination.

Portable equipment often requires cells packaged either in series, in parallel, or in combinations of the two in order to meet energy and power requirements. For example, laptop batteries commonly have four 3.6-V lithium ion cells connected in series to achieve a voltage of 14.4 V, and two in parallel to increase the capacity from 2400 mAh to 4800 mAh. Thus, it would be of interest to develop an EC that could exhibit control over the operating voltage and current by using tandem serial and parallel assemblies with minimal energy losses. The performances of a set of tandem ICCN ECs were evaluated by assembling four devices both in series and in parallel configurations. Compared with a single EC, which operates at 1.0 V, the tandem series ECs exhibited a 4.0 V charge/discharge voltage window. In the parallel assembly, the output current increased by a factor of 4, and thus the discharge time was four times that of a single device when operated at the same current density. As expected, when the four ECs were combined, two in series and two in parallel, both the output voltage and the runtime (capacitive current) increased by a factor of 2 under the same charge/discharge current. As with the single devices, the tandem devices show essentially perfect triangular CC curves with a miniscule voltage drop, which again indicates excellent capacitive properties with minimal internal resistance. Thus, when used in tandem, the ICCN ECs undergo minimal energy losses. As a demonstration, a tandem EC's ability to light a red light-emitting diode (LED) that operates at a minimum voltage of 2 V is shown in the FIGS. 14E and 14F.

Figure 15:
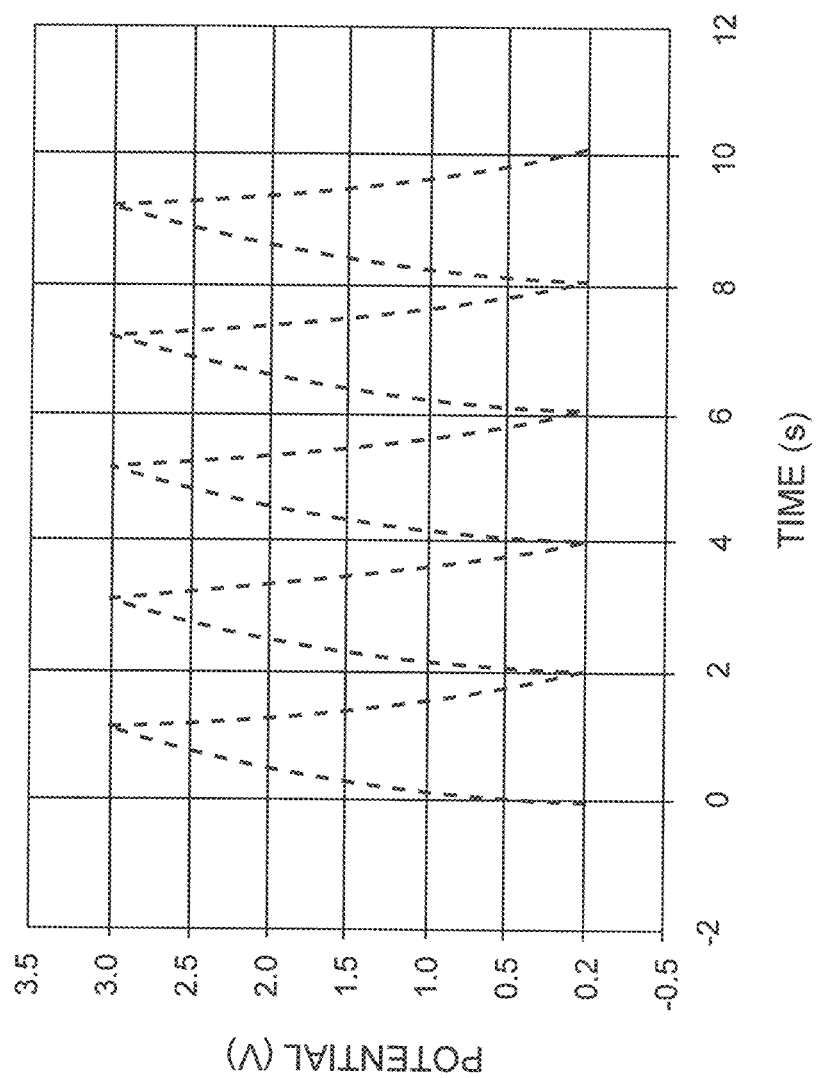
FIG. 15 is a graph of galvanostatic charge/discharge curves of the device when operated at an ultrahigh current density of 250 $A/g_{ICCN/electrode}$.

An organic electrolyte was also examined, and was discovered to allow the operation of the devices at higher voltages, thus achieving higher energy densities. In this case, tetraethylammonium tetrafluoroborate dissolved in acetonitrile was used because this is the most common organic electrolyte used in commercial devices. As shown in FIG. 15, the ICCN EC again exhibits enhanced performance and rate capabilities when compared with the commercial AC- EC; this is consistent with the data acquired in the aqueous and gelled electrolytes. Furthermore, the ICCN EC can be operated over a wider voltage window of 3 V. This ICCN EC offers a specific capacitance of up to 4.82 mF/cm$^2$ (265 F/$g_{ICCN/electrode}$) and retains a capacitance of 2.07 mF/cm$^2$ when operated at the ultrahigh current density of 1000 A/$g_{ICCN/electrode}$. Recently, room-temperature ionic liquids have been intensively studied as an attractive alternative to conventional electrolytes for ECs because of their high ion density, good thermal stability, and nonvolatility, as well as their wider potential window when compared with organic electrolytes. An ICCN EC was fabricated using the ionic liquid 1-ethyl-3-methylimidazoliumtetrafluoroborate (EMIMBF$_4$) that exhibited a specific capacitance as high as 5.02 mF/cm$^2$ (276 F/$g_{ICCN/electrode}$) and at a wider potential window of 4 V. A prototype ICCN EC was made and encapsulated in the EMIMBF$_4$ electrolyte, charged at a constant potential of 3.5 V, and used to energize a red LED for ~24 minutes.

Figure 16:
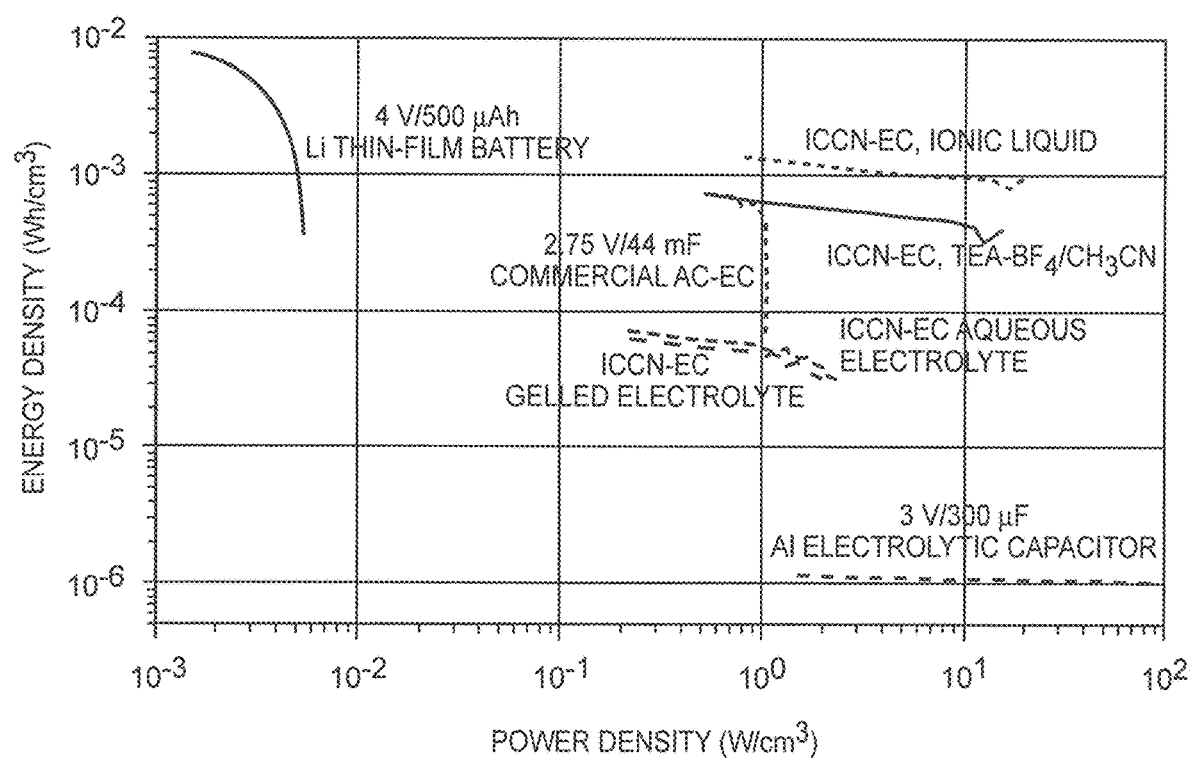
FIG. 16 is a Ragone plot comparing the performance of ICCN ECs with different energy storage devices designed for high power microelectronics.

FIG. 16 is a Ragone plot comparing the performance of ICCN ECs with different energy storage devices designed for high power microelectronics. FIG. 16 also shows the overall performance of the ICCN ECs using various electrolytes. The Ragone plot includes a commercial 2.75 V/44 mF AC-EC and a 4 V/500-µAh thin film lithium battery and a 3 V/300 µF aluminum electrolytic capacitor, all tested under the same dynamic conditions. The plot shows the volumetric energy density and power density of the stack for all the devices tested. The ICCN EC can exhibit energy densities of up to 1.36 mWh/cm$^3$, which is a value that is approximately two times higher than that of the AC-EC. Additionally, ICCN ECs can deliver a power density of around about 20 W/cm$^3$, which is 20 times higher than that of the AC-EC and three orders of magnitude higher than that of the 4 V/500-µAh thin film lithium battery. Although the electrolytic capacitor delivers ultrahigh power, it has an energy density that is three orders of magnitude lower than the ICCN EC. Because of the simplicity of the device architecture and the availability of the GO precursor which is already manufactured on the ton scale, the ICCN ECs of the present embodiments hold promise for commercial applications.

Embodiments of the present disclosure also include other types of ECs, such as planer and interdigitated ECs. For example, FIG. 17A shows a set of interdigitated electrodes with dimensions of 6 mm×6 mm, spaced at around about 500 µm, that are directly patterned onto a thin film of GO. Prior to being patterned, the GO film was deposited on a thin flexible substrate, polyethylene terephthalate (PET), in order to fabricate a set of electrodes that are mechanically flexible. The top arrow points to the region of the ICCN that makes up the black interdigitated electrodes, while the bottom arrow points to the un-reduced GO film. Since the electrodes are directly patterned onto the GO film on a flexible substrate, the need for post-processing such as transferring the film to a new substrate is unnecessary. Although, if desired, a peel and stick method could be used to selectively lift-off the black interdigitated electrodes made of ICCN(s) with e.g. polydimethysiloxane (PDMS) and transfer it onto other types of substrates (FIG. 17B). The simplicity of this method allows substantial control over pattern dimensions, substrate selectivity and electrical properties of the ICCN(s) by controlling laser intensity and thereby the amount of reduction in each film.

These interdigitated electrodes can, in turn, be used to construct supercapacitors. FIG. 18A shows an exploded view of a micro-supercapacitor 90 having a first electrode 92 and a second electrode 94 that are fabricated from ICCNs made up of a plurality of expanded and interconnected carbon layers that are electrically conductive. It is to be understood that optionally either the first electrode 92 or the second electrode 94 can be made of a metal, while the remaining one of either the first electrode 92 or the second electrode 94 is made of ICCNs. However, the first electrode 92 and the second electrode 94 are typically laser scribed from a GO film disposed onto a suitable substrate 96 such as PET or silicon (Si) having an insulating layer 97 such as a silicon dioxide (SiO$_2$) layer. A first conductive strip 98 and a second conductive strip 100 are interfaced with the first electrode 92 and the second electrode 94 to provide electrically conductive terminals to couple to external circuitry (not shown). Exemplary external circuitry to be powered by the micro-supercapacitor 90 can be, but is not limited to, integrated circuits and other electrically powered microscale devices. A liner 102 that is non-electrically conductive covers the portions of the first electrode 92 and the second electrode 94 that are interfaced with the first conductive strip 98 and the second conductive strip 100. The liner 102 includes a central window through which an electrolyte 104 is placed in contact with the first electrode 92 and the second electrode 94. A polyimide tape can be used as the liner 102. The electrolyte is preferably a gel electrolyte such as fumed silica (FS) nano-powder mixed with an ionic liquid. An exemplary ionic liquid is 1-butyl-3-methylimidazolium bis (trifluoromethylsulfonyl)imide. Another suitable gel electrolyte is a hydrogel such as poly(vinyl alcohol) (PVA)-H$_2$SO$_4$. Other electrolytes are also suitable, but the disclosed electrolytes provide a voltage window between a maximum charged voltage and a minimum discharged voltage of around about 2.5V.

FIG. 18B depicts the micro-supercapacitor 90 fully assembled. In this exemplary depiction, the first conductive strip 98 becomes a positive terminal and the second conductive strip 100 becomes a negative terminal. It is to be understood that the first conductive strip 98 and the second conductive strip 100 may be made from an electrical conductor such as copper (Cu), aluminum (Al), and/or additional ICCN structures.

FIG. 19A depicts a micro-supercapacitor configuration having a first electrode 106 with two extending electrode digits 108A and 108B. A second electrode 110 has two extending electrode digits 112A and 112B that are interdigitated with the extending electrode digits 108A and 108B.

FIG. 19B depicts another micro-supercapacitor configuration having a first electrode 114 with four extending electrode digits 116A through 116D. A second electrode 118 has four extending electrode digits 120A through 120D that are interdigitated with the four extending electrode digits 116A through 116D.

FIG. 19C depicts yet another micro-supercapacitor configuration having a first electrode 122 with eight extending electrode digits 124A through 124H. A second electrode 126 has eight extending electrode digits 128A through 128H that are interdigitated with the eight extending electrode digits 124A through 124H.

FIG. 20 is a table listing exemplary dimensions for the micro-supercapacitors of FIGS. 19A-19C. Referring to both FIG. 20 and FIG. 19A, the extending electrode digits 108A, 108B, 112A, and 112B are depicted with exemplary individual widths (W) of 1770 µm. The extending electrode digits 108A, 108B, 112A, and 112B are depicted with an exemplary length (L) of 4800 µm.

Referring to both FIG. 19B and FIG. 20, the width of the extending electrode digits 116A through 116D and the extending electrode digits 120A through 120D are depicted with exemplary individual widths of 810 µm. Referring to both FIG. 19C and FIG. 20, the extending electrode digits 124A through 124H and the extending electrode digits 128A through 128H are depicted with exemplary individual widths of 330 µm. The exemplary configurations shown in FIGS. 19A, 19B, and 19C all have an exemplary edge dimension (E) of 200 µm, and an exemplary interspace dimension (I) that separates the first electrodes 106, 114, and 122 from the second electrodes 110, 118, and 126 with a serpentine gap. Moreover, the exemplary micro-supercapacitor configurations shown in FIGS. 19A, 19B, and 19C each have a total area 40 mm². In regard to the micro-supercapacitor configurations of FIGS. 19A, 19B, and 19C, it is to be understood that ranges of widths (W) are available for each of the first extending electrode digits 108A, 108B, 116A through 116D, and 124A through 124H and each of the second extending electrode digits 112A, 112B, 120A through 120D, and 128A through 128H. In various exemplary embodiments, the width (W) of each of the first extending electrode digits 108A, 108B, 116A through 116D, and 124A through 124H and for each of the second extending electrode digits 112A, 112B, 120A through 120D, and 128A through 128H are greater than around about 330 µm, or greater than around about 810 µm, or greater than around about 1770 µm in width. Moreover, ranges of interspace distance (I) between the first extending electrode digits 108A, 108B, 116A through 116D, and 124A through 124H and each of the second extending electrode digits 112A, 112B, 120A through 120D, and 128A through 128H respectively, may be less than around about 150 µm, or less than around about 100 µm, or less than around about 50 µm. The edge dimension (E) can also have multiple ranges that are around about the same dimensions as those given for the ranges of width (W). These various dimensions provide various area ranges for the micro-supercapacitor configurations of FIG. 19A. For example, in one embodiment, a total geometric area of each of the first electrodes 106, 114, and 122 and each of the second electrodes 110, 118 and 126 is less than around about 50 mm². In another embodiment, a total geometric area of each of the first electrodes 106, 114, and 122 and each of the second electrodes 110, 118 and 126 is less than around about 40 mm². In yet another embodiment, a total geometric area of each of the first electrodes 106, 114, and 122 and each of the second electrodes 110, 118 and 126 is less than around about 30 mm².

It is to be understood that the physical size of the supercapacitors of the present disclosure is only limited by the wavelength of light that exfoliates ICCN patterns into GO. Therefore, supercapacitors produced according to the present disclosure range from the macro-scale that includes supercapacitors large enough to power electric vehicles and supply industrial electrical power grids down to nano scale nano-supercapacitors that are useable to power nano sized devices such as nanoelectromechanical (NEMS) devices.

Between the macro-scale and the nano-scale is a sub-micron scale that includes a range of micro-supercapacitors that are usable to power integrated circuits. For example, the first electrode and the second electrode have dimensions around about a sub-micron range. As such, these micro-supercapacitors can be integrated with integrated circuitry such that the integrated circuitry and micro-supercapacitors can be fabricated into a single integrated circuit package.

The ICCNs of the present disclosure are also usable to fabricate relatively large first and second electrodes separated by an electrolyte that provides enough charge storage capacity to power passenger car sized electric vehicles. Moreover, supercapacitors fabricated in accordance with the present disclosure are also usable to supply electrical power to industrial electrical power grids during peak power demands. For example, the first electrode and the second electrode of a supercapacitor according to the present disclosure can be sized to supply peak power to a megawatt capacity electrical power grid.

Figure 21E:
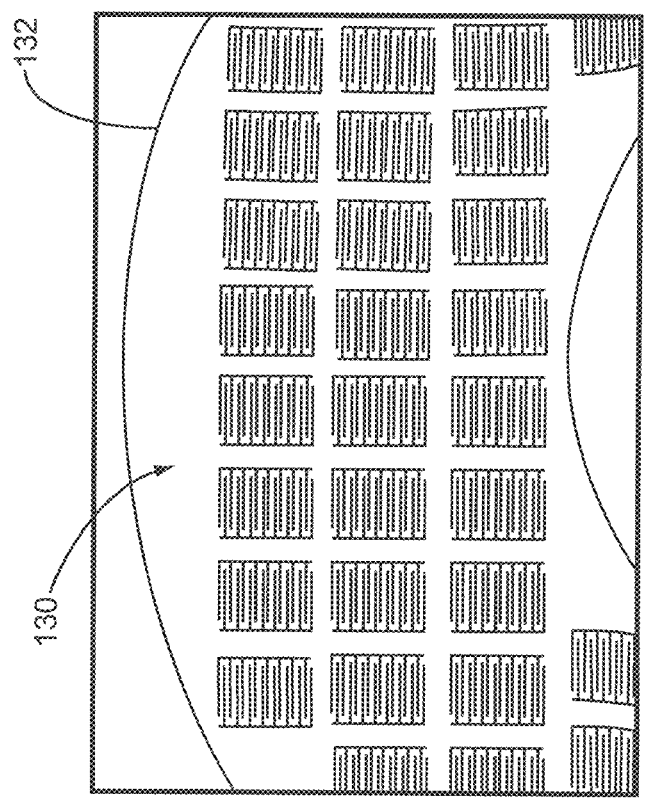
Figure 21D:
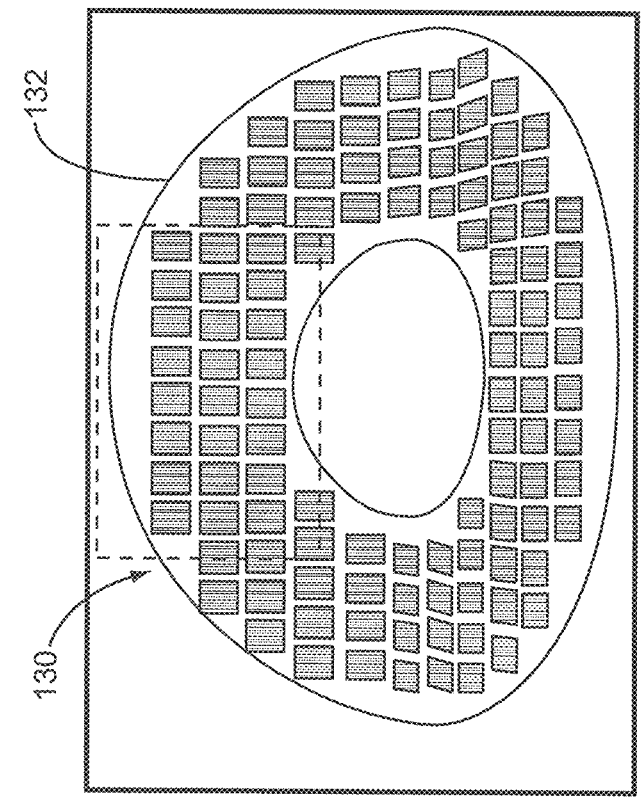

A process for fabricating the supercapacitors of the present disclosure is schematically illustrated in FIG. 21A. Circuits designed on a computer can be patterned onto the GO film 72 on the substrate 70 which is carried by a substrate carrier such as a DVD disc. In the process GO absorbs high intensity light from a light source such as the laser beam 40 and is converted into ICCN(s). By using the precision of a laser such as the LWL 34, a direct-to-disc labeling drive renders a computer-designed pattern onto the GO film 72 to produce desired ICCN circuits. In this way, interdigitated ICCN electrodes 92 and 94 can be readily scribed on the GO film and transferred to the substrate 96 as shown in FIG. 21B. With its nearly insulating properties, GO serves as a good separator between the positive and negative ICCN interdigitated electrodes. These ICCN circuits can thus be directly used as planar micro-supercapacitors after receiving an electrolyte overcoat, as depicted in FIG. 21C. Unlike conventional micro-fabrication methods, this direct "writing" technique does not require masks, expensive materials, post-processing or clean room operations. Furthermore, the technique is cost effective and readily scalable. For example, using an exemplary design chosen for this work, 112 micro-supercapacitors 130 were produced on a single piece of GO deposited on a flexible DVD disc-shaped substrate 132 as depicted in FIG. 21D. Interdigitated electrodes can be precisely patterned with a lateral spatial resolution of around about 20 µm using direct-to-disc labeling. This technique is thus appropriate for the fabrication of high-resolution micro-supercapacitors taking into account that the interdigitated electrodes made with conventional micro-fabrication techniques are usually on the order of around about 100 µm.

The laser scribing process of the present disclosure is associated with significant changes in the optical properties, the electrical properties and the structure of the film. For example, GO changes from a golden brown color to black; a direct impact of the reduction of GO into an ICCN. FIG. 22A shows a line drawing of the as-prepared ICCN micro-supercapacitors 134. In particular, a micro-device 136 having 4 interdigitated electrodes, 2 positive and 2 negative; along with another micro device having 8 interdigitated electrodes, 4 positive and 4 negative; are shown with yet another micro-device 140 with 16 interdigitated microelectrodes, 8 positive and 8 negative. FIG. 22B is a line drawing of an optical microscope image showing a well-defined pattern with no short circuits between the microelectrodes. FIG. 22C shows the expansion of the GO film when treated with the laser, thus enabling full access to the electrode surface that is essential for charging the electrodes. Analysis of the cross-section of the micro-device reveals a thickness of 7.6 µm. For comparison, I-V tests were carried out for both GO and an ICCN as shown in FIGS. 22D and 22E, respectively. The GO film exhibits nonlinear and slightly asymmetric behavior with a differential conductivity value ranging from around about $8.07 \times 10^{-4}$ through $5.42 \times 10^{-3}$ S/m depending on the gate voltage. Reducing GO within the direct-to-disc labeling laser results in a linear I-V curve associated with a significant increase in the film conductivity to around about $2.35 \times 10^3$ S/m as calculated for the ICCN as depicted in FIG. 22F. Because of its high electrical conductivity and exceptionally high surface area of over 1500 m²/g, the ICCN can serve as both the electrode material and current collector. This simplifies the fabrication process and results in cost-effective micro-supercapacitors.

Figure 23A:
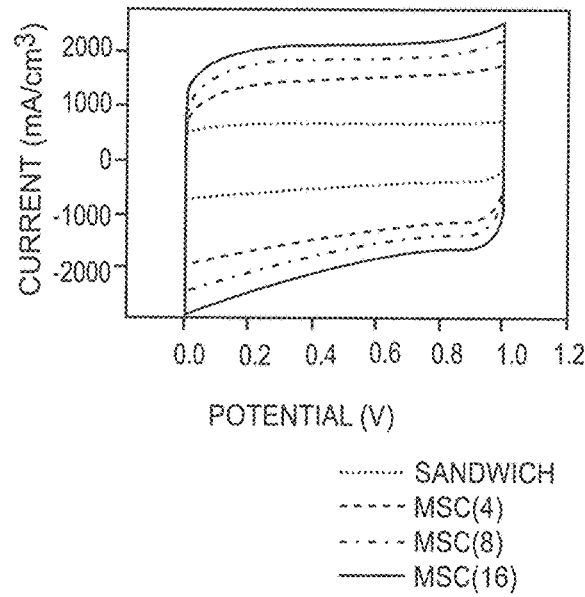
Figure 23B:
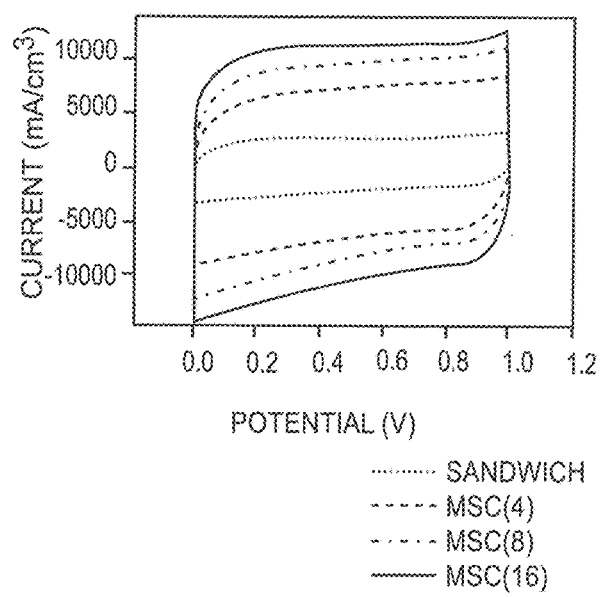
Figure 23C:
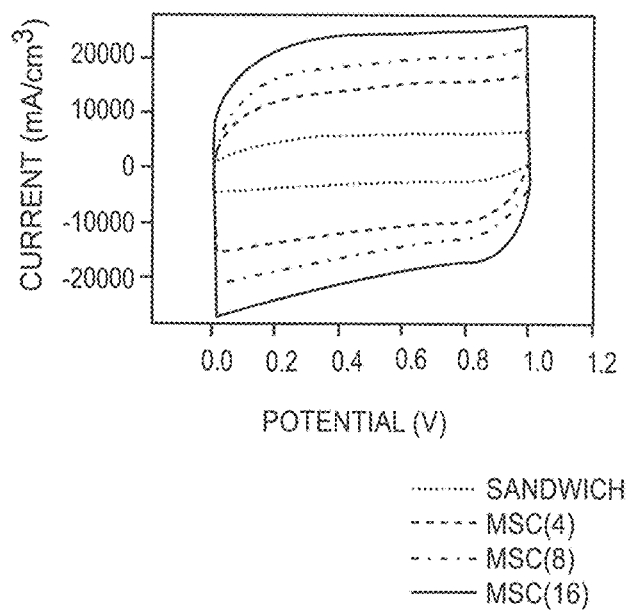

In order to understand the role of the micro-scale architecture of the device on its electrochemical properties, different configurations were designed and tested. Micro-supercapacitors with 4 (MSC4), 8 (MSC8), and 16 (MSC16) interdigitated microelectrodes were constructed and their electrochemical performance at 1,000, 5,000 and 10,000 mV/s tested, as shown in FIGS. 23A-23C. A hydrogel-polymer electrolyte, PVA-H$_2$SO$_4$, was used to fabricate the all-solid-state micro-supercapacitors. A sandwich-type ICCN supercapacitor was also tested for comparison.

Figure 23D:
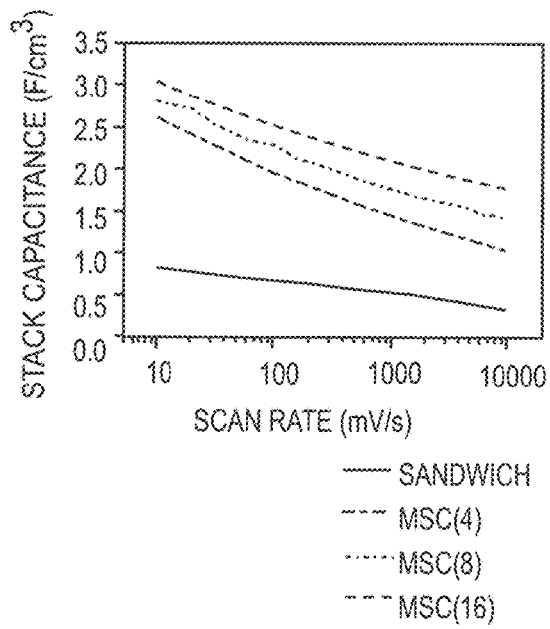

The CV profiles are all rectangular in shape, confirming the formation of an efficient electrochemical double layer (EDL) capacitor and fast charge propagation within the electrodes. Even at an ultrafast scan rate of 10,000 mV/s, the CV remains rectangular in shape indicating the high power capability of this micro-supercapacitor. Volumetric and areal capacitances give a more accurate picture of the true performance of a supercapacitor compared with gravimetric values. This is even more relevant in the case of micro-devices since the mass of the active material is very small. Therefore, calculations of the specific capacitance of the micro-devices have been made based on the volume of the stack. This includes the combined volume of the active material, current collector and the gap between the electrodes. The stack capacitances of the different micro-supercapacitors as a function of the scan rate are shown in FIG. 23D. Interestingly, the micro-devices show higher capacitance when using the interdigitated structure as opposed to the sandwich structure. Furthermore, the more interdigitated electrodes per unit area, the more power and energy can be extracted from the micro-devices. This can be explained by the unique porous network structure of the ICCN electrodes that helps minimize the pathway for ion diffusion from the electrolyte to the electrode material. Moreover, the micro-scale architecture of the devices results in a significant reduction of the mean ionic diffusion pathway between two microelectrodes. This effect becomes even more pronounced when increasing the number of interdigitated electrodes per unit area. This allows for maximizing the available electrochemical surface area and results in the increased capacitance and the fast charge/discharge rates observed with the micro-devices.

Figure 23E:
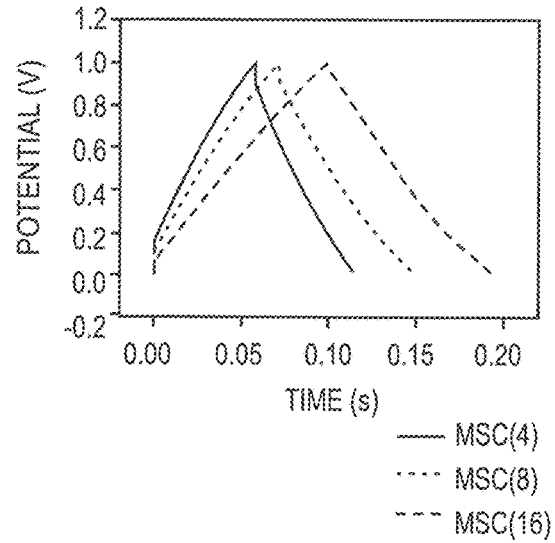

These conclusions are confirmed by the galvanostatic charge/discharge (CC) curves depicted in FIG. 23E. Note that all the micro-devices, regardless of whether they possess 4, 8 or 16 interdigitated electrodes, show nearly ideal triangular CC curves obtained at an ultrahigh current density of around about 1.684×10$^4$ mA/cm$^3$. The voltage drop at the beginning of each discharge curve, known as the iR drop, is a measure of the overall resistance of the device and since its value is proportional to the discharge current, the small iR drop shown in FIG. 23E at a high discharge current indicates a very low resistance for all micro-supercapacitors tested.

Figure 23F:
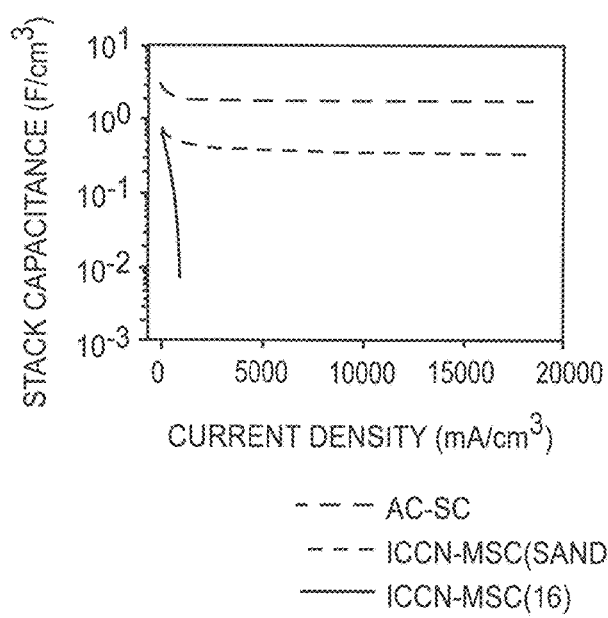

The iR drop gradually decreases from ICCN-MSC(4) through ICCN-MSC(16), thus confirming the increase in power density of the micro-devices with an increasing number of interdigitated electrodes per unit area. FIG. 23F shows the volumetric capacitance of the stack as a function of the current density for the ICCN micro-supercapacitor for both the interdigitated and sandwich structures. For comparison, the data for a commercial activated carbon supercapacitor obtained under the same dynamic conditions is also shown. Not only does the activated carbon supercapacitor exhibit lower capacitance, but its performance falls off very quickly at higher charge/discharge rates because of the limited diffusion of ions in the inner porous network of the activated carbon. The surface of the ICCN, on the other hand, is highly accessible to the electrolyte with very little impediment to ion transport, thus providing high capacitance even when operated at ultrahigh charge/discharge rates. For example, ICCN-MSC(16) exhibits a stack capacitance of around about 3.05 F/cm$^3$ at 16.8 mA/cm$^3$ and maintains 60% of this value when operated at an ultrahigh current density of 1.84×10$^4$ mA/cm$^3$ (FIG. 23F). This is equivalent to the operation of the device at around about 1100 A/g$_{ICCN/electrode}$ which is around about three orders of magnitude higher than the normal discharge current densities used for testing traditional supercapacitors. This corresponds to an areal capacitance that varies only slightly from around about 2.32 mF/cm$^2$ at 16.8 mA/cm$^3$ to 1.35 mF/cm$^2$ at 1.84×10$^4$ mA/cm$^3$. Moreover, in traditional supercapacitors made of activated carbon, most of the surface area resides in the micropores of the carbon; as such, this is unlikely to contribute significantly to the charge storage, especially at a high rate. This results in a poor frequency response, with the energy stored in these carbon electrode materials released only at slow rate. On the other hand, the ICCN, with its sheet-like structure, possesses a large open surface area that is readily accessible to an electrolyte with a small diffusion barrier. Thus, the ICCN has the potential for making supercapacitors with power densities that surpass any other form of activated carbon. The superior frequency response achieved with ICCN micro-devices is due to the excellent electrolyte access to the surfaces of carbon sheets through its interconnected pores. The micro-scale design of ICCN devices improves the rate capability through the reduction of the ion transport pathways. In addition, ICCN forms a highly conductive network, thus reducing the internal resistance of microelectrodes that make up micro-supercapacitors.

Figure 23G:
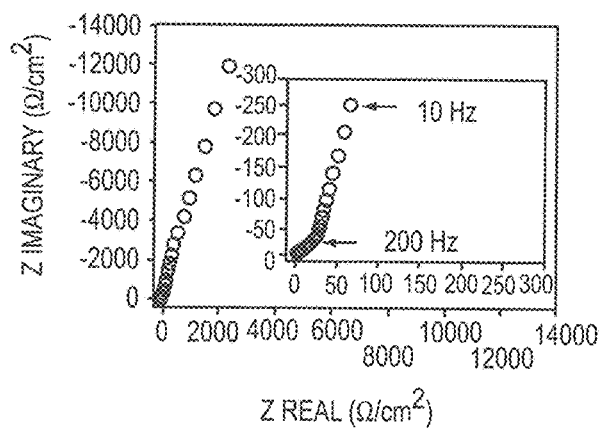
Figure 23H:
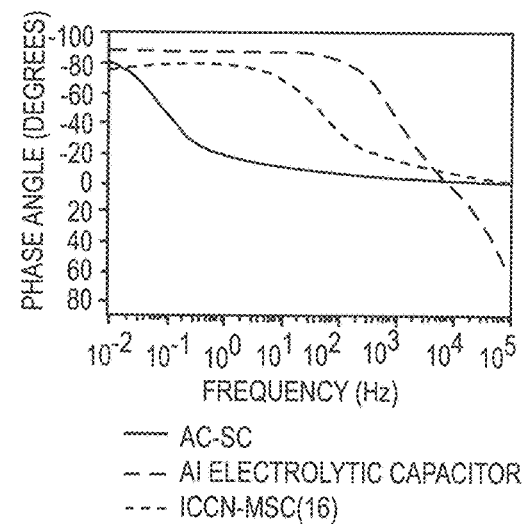
Figure 23I:
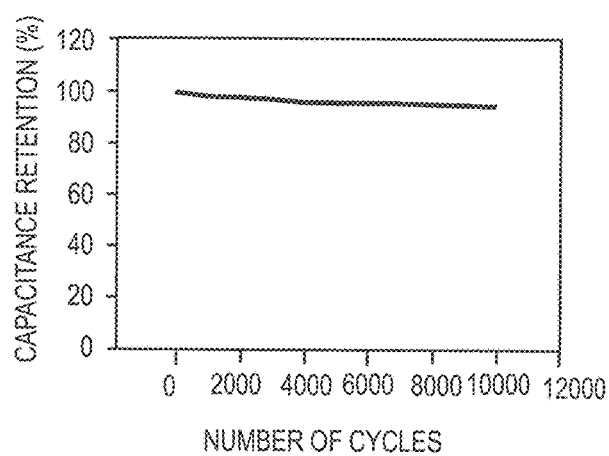

FIG. 23G is a graph of a complex plane plot of the impedance of an ICCN-MSG(16) with a magnification of a high frequency region shown in an inset. FIG. 23H is a graph of impedance phase angle versus frequency for an ICCN-MSG(16) compared to commercial AC-SC and aluminum electrolytic capacitors. FIG. 23I is a graph showing a relatively high amount of capacitance retention over at least 10,000 charge and discharge cycles. In particular, the graph of FIG. 23I shows only a loss of around about 4% of initial capacitance over 10,000 charge and discharge cycles.

Figure 24A:
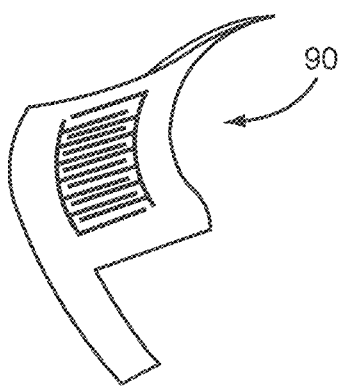
Figure 24B:
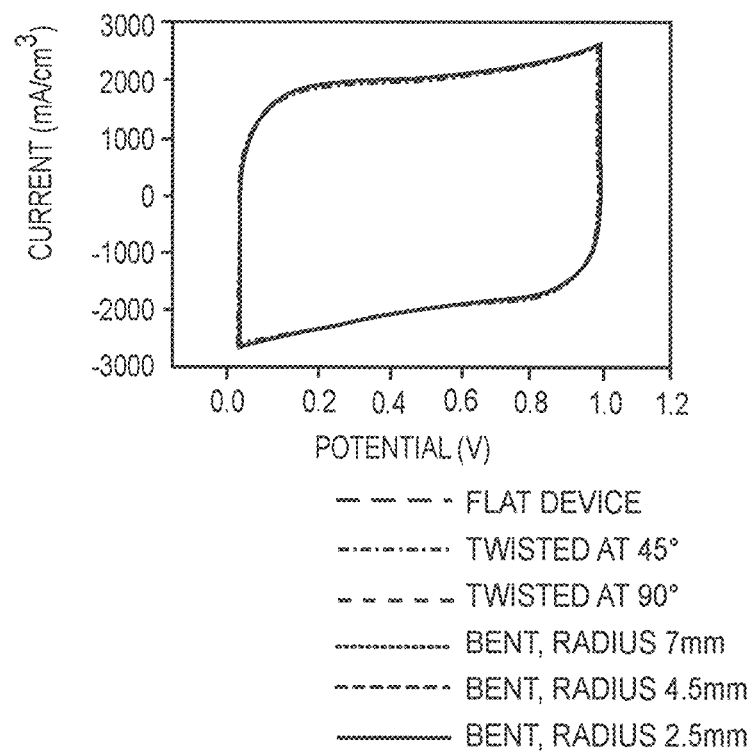
Figure 24C:
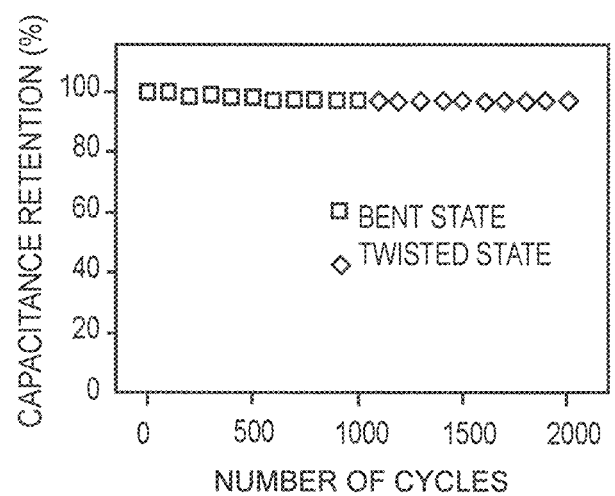

Flexible electronics have recently attracted much attention because of their potential in providing cost-efficient solutions to large-area applications such as roll-up displays and TVs, e-paper, smart sensors, transparent RFIDs and even wearable electronics. However, the fabrication of micro-supercapacitors on flexible substrates using current micro-fabrication techniques does not appear to be feasible. Attempts to fabricate micro-supercapacitors on flexible substrates using a number of printing and electrochemical techniques have also been reported. However, none of these configurations has been shown to be suitable for flexible energy-storage devices. In fact, the performance durability of these devices has not been examined under any strain conditions such as bending or twisting. ICCN micro-supercapacitors such as micro-supercapacitor 90 are highly flexible and can be bent and twisted without affecting the structural integrity of the device, FIG. 24A. The durability of ICCN micro-supercapacitors for flexible energy storage has been demonstrated by tests of their electrochemical performance under constant strain. FIG. 24B shows the CV performance of the micro-supercapacitor with different bending and twisting conditions at 1,000 mV/s. The micro-supercapacitor shows exceptional electrochemical stability regardless of the degree of bending or twisting, indicating excellent mechanical stability. The flexibility endurance of the device was tested while keeping the device under the bent or twisted state, as depicted in FIG. 24C. Remarkably, the capacitance was reversibly maintained with 97% retention of the initial capacitance after 2,000 cycles. This superior performance makes ICCN-MSC promising for flexible micro-electronics.

Figure 24D:
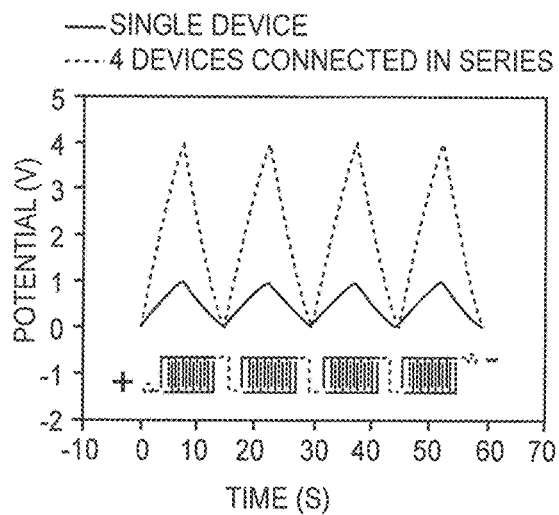
Figure 24E:
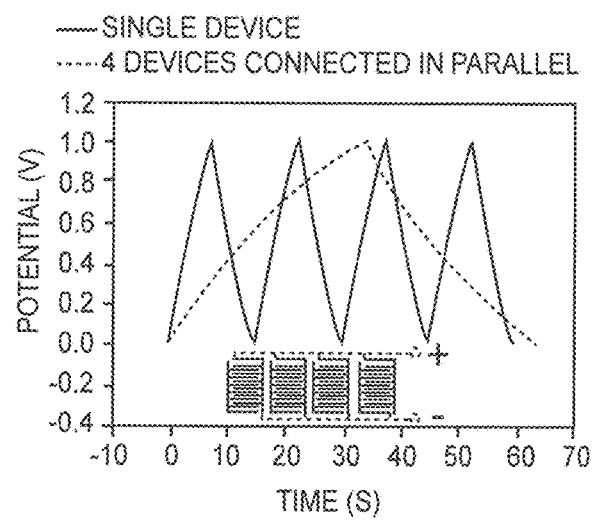
Figure 24F:
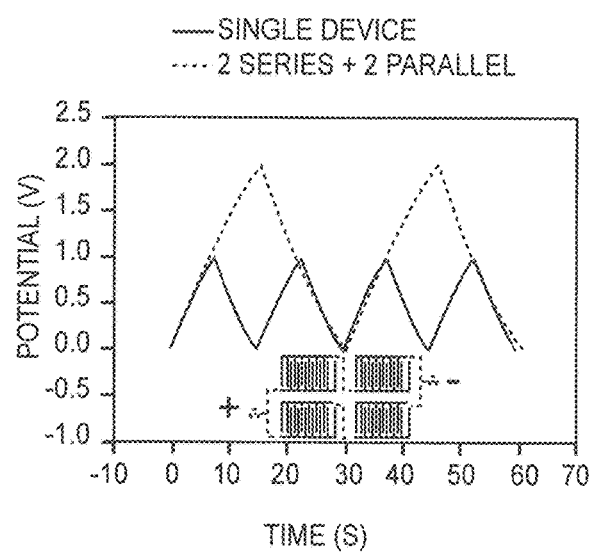

In general, the total energy that can be stored in a single supercapacitor is too low for most practical applications. Thus, depending on the application, supercapacitors need to be connected together in series and/or parallel combinations, just as batteries are, to form a "bank" with a specific voltage and capacitance rating. The adaptability of ICCN micro-supercapacitors for serial/parallel combinations is demonstrated by connecting four devices together both in series and in parallel configurations, as depicted in FIGS. 24D-24F. The tandem ICCN micro-supercapacitors exhibit a very good control over the operating voltage window and capacity, thus enabling them to be considered for practical applications. Like the individual micro-supercapacitors, the tandem devices exhibit essentially ideal triangular CC curves with a minute voltage drop, which again indicates excellent capacitive properties with minimal internal resistance. It is worth noting that this exceptional performance has been achieved without using a voltage balance, which is often needed with series connections to prevent any cell from going into over-voltage.

Previous research attempts to design supercapacitors in the all-solid-state form have focused mainly on using aqueous hydrogel-polymer electrolytes. Unfortunately, the operating voltage range of these devices barely exceeds 1 V, making them non-functional for many applications. Unlike water-based electrolytes, ionic liquids (IL) provide an attractive alternative to these conventional electrolytes owing to their wide electrochemical window and high ionic conductivity as well as good thermal stability and non-volatility. These interesting properties of ILs can be hybridized with another solid component (e.g. polymer, silica, etc.) to form gel-like electrolytes called ionogels.

Figure 25A:
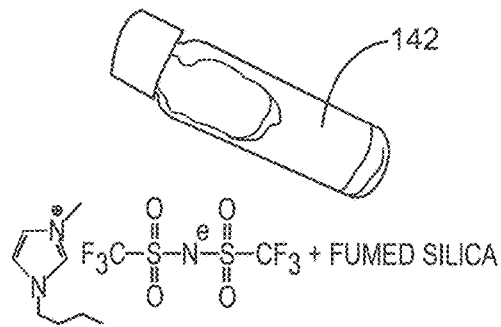

The combination of a solid matrix with ILs preserves the main properties of ILs, while allowing easy shaping of the device without having the intrinsic leakage problems of liquid electrolytes that limit their flexible operation. Although promising, the integration of ionogels into all-solid-state micro-supercapacitors has not yet been demonstrated. Here, fumed silica (FS) nano-powder was mixed together with the ionic liquid, 1-butyl-3-methylimidazolium bis(trifluoromethylsulfonyl)imide to form a clear viscous (FS-IL) ionogel 142, as depicted in FIG. 25A.

In an exemplary embodiment, the ionogel is prepared by mixing together a fumed silica nano-powder having an average particle size 7 nm with the ionic liquid (1-butyl-3-methylimidazolium bis(trifluoromethylsulfonyl)imide ([BMIM][NTf2])) (0.03 g FS/1.0 g ([BMIM][NTf2]). This mixture is then stirred under an Argon atmosphere for 5 hours to produce a clear viscous ionogel (FS-IL). The ionogel is then usable as an electrolyte for the fabrication of all-solid-state micro-supercapacitors that are capable of providing 2.5 V compared with 1 V for traditional hydrogel-polymer electrolytes. Resulting micro-supercapacitors thus have a potential for increased energy density by at least one order of magnitude. The ionogel is integrated into an all-solid-state micro-supercapacitor. Interestingly, the all-solid-state micro-supercapacitor demonstrates ultrahigh charge/discharge rates comparable to those with $PVA-H_2SO_4$ hydrogel electrolyte. However, as a result of the ionogel electrolyte, the all-solid-state micro-supercapacitor can be operated at a larger potential window of 2.5 V.

The almost ideal CV profiles and triangular CC curves at ultrafast charge/discharge rates verify good EDLC behavior. The ICCN-MSC(16) achieved a stack capacitance of 2.35 $F/cm^3$ at a current density of 16.8 $mA/cm^3$. When operated at an ultrafast charge/discharge current density of $1.84 \times 10^4$ $mA/cm^3$, the capacitance of the device drops only slightly to 1.40 $F/cm^3$. Since the energy density increases with the square of the operating potential window, the micro-supercapacitor employing a FS-IL ionogel promises an order of magnitude higher energy density. Furthermore, the high thermal stability of ionic liquids eliminates the fire hazards associated with commercial supercapacitors. Finally, the micro-supercapacitor shows excellent cycling stability; the capacitance remains unchanged after more than 30,000 charge/discharge cycles.

Figure 25B:
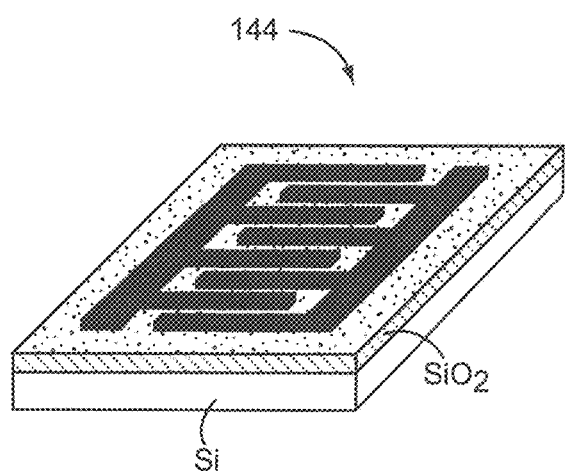
Figure 25C:
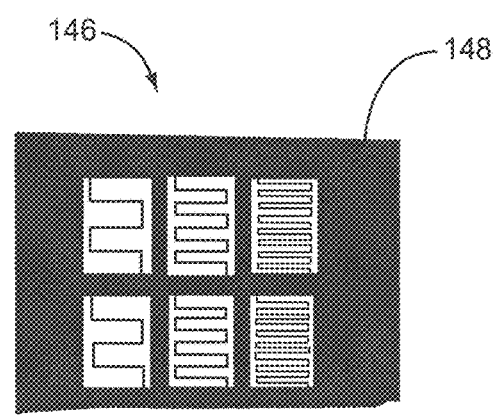
Figure 25D:
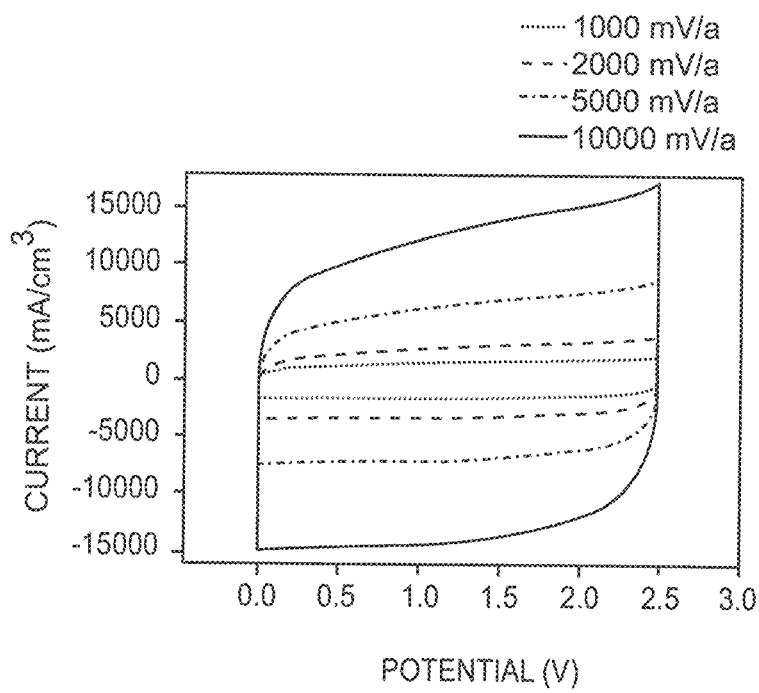
Figure 25E:
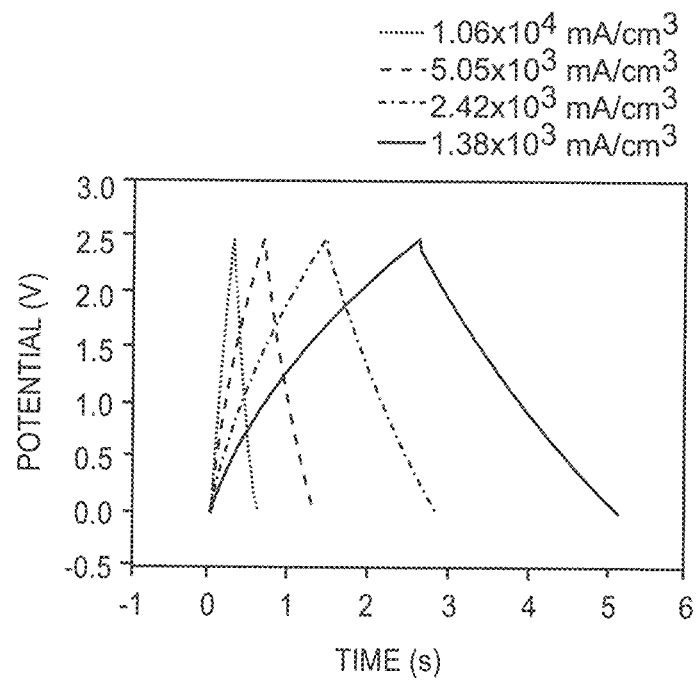

Current trends for developing miniaturized electronic devices place emphasis on achieving performance levels generally associated with integrated circuits. FIG. 25B depicts an exemplary on-chip micro-supercapacitor 144 that can be integrated with MEMS devices and CMOS in a single chip using the direct-to-disc labeling technique. A structure made up of a silicon (Si) substrate and a silicon dioxide ($SiO_2$) insulating layer for the on-chip micro-supercapacitor 144 is schematically illustrated in FIG. 25B; with the ionogel 142 used as the electrolyte. Other devices 146 similar to the micro-supercapacitor 144 were fabricated using the same process described earlier except for the plastic substrate which has been replaced with an oxidized silicon wafer 148, as depicted in FIG. 25C. FIGS. 26D-26E show that the device reveals superior electrochemical performance with ultrahigh power, comparable to that demonstrated on the flexible substrate. This technique may thus present a low-cost and scalable solution for on-chip self-powered systems.

Charged supercapacitors, like charged batteries, are in a state of high free energy relative to that of the discharged state, so there is a thermodynamic driving force for them to self-discharge. The self-discharge behavior of supercapacitors is a matter of major practical significance in their operation and the types of function they may be required to fulfill. During self-discharge, a small amount of leakage current will cause the voltage decay of a charged supercapacitor over time. The leakage current can be measured by applying a rated DC voltage to the supercapacitor and measuring the current required to maintain that voltage. Typically, this is done using the voltage at which the supercapacitor is operated, Vmax. The results are presented in FIG. 26A which also include the data for two commercially available supercapacitors, all tested under the same dynamic conditions. The results show that the ICCN micro-supercapacitor exhibits an ultra-small leakage current of less than around about 150 nA after 12 hours compared to less than around about 5 µA for both of the commercial supercapacitors. With its low leakage current, ICCN micro-supercapacitors could be integrated with energy harvesters to create efficient self-powered systems.

The self-discharge curves obtained immediately after pre-charging to Vmax in the previous test are shown in FIG. 26B. Basically, the voltage difference between the two terminals of the supercapacitor is recorded on open circuit as a function of time. Normally, most supercapacitors are operated in the range of Vmax to approximately ½Vmax.

Thus the time required for the voltage across the supercapacitor to change from Vmax to ½Vmax was measured for all of the tested supercapacitors. The results show that the ICCN micro-supercapacitor self-discharges in 13 hours, a value comparable to those of commercial supercapacitors with self-discharge rates of 8 hours and 21 hours. This fine performance for the ICCN micro-supercapacitors shows promise for practical applications.

FIG. 27 shows a Ragone plot comparing the performance of ICCN micro-supercapacitors with different energy storage devices designed for high-power microelectronics. The Ragone plot shows the volumetric energy density and power density of the stack for all the devices tested. The Ragone plot reveals a significant increase in supercapacitor performance when scaling down the electrode dimensions to the micro-scale. For example, the interdigitated micro-supercapacitors deliver more energy and power than their sandwich counterparts both in the hydrogel-polymer and ionogel electrolytes. Remarkably, compared with the AC supercapacitor, the ICCN micro-device exhibits three times more energy and around about 200 times more power. Furthermore, the ICCN micro-supercapacitors demonstrate power densities comparable to those of the aluminum electrolytic capacitor, while providing more than three orders of magnitude higher energy density. Although Li-ion batteries can provide high energy density, they have limited power performance that is 4 orders of magnitude lower than the ICCN-MSC. This superior energy and power performance of the ICCN micro-supercapacitors should enable them to compete with micro-batteries and electrolytic capacitors in a variety of applications. Further miniaturization of the width of the micro-electrodes and the space between them would reduce the ionic diffusion pathway, thus leading to micro-supercapacitors with even higher power density.

The single-step fabrication technique described here obviates the need for time-consuming and labor-intensive lithography, while enhancing the yield of the process and the functionality of the micro-devices produced. Remarkably, this technique allows for the fabrication of micro-devices without the use of organic binders, conductive additives or polymer separators that are often needed in commercial supercapacitors, thus leading to improved performance because of the ease with which ions can access the active material. The combination of the microscale design of the device with the ICCN whose surface is fully accessible to electrolyte ions is responsible for the high power/energy performance of the ICCN micro-supercapacitors. They combine the power density of electrolytic capacitors with the energy density of micro-batteries that could have a significant impact on high-power microelectronics. These findings also provide a solution to microscale energy storage in numerous areas where electrolytic capacitors cannot provide sufficient volumetric energy density.

Furthermore, ICCN micro-supercapacitors show excellent cycling stability. This is relatively important when compared with micro-batteries whose finite life-time could present significant problems when embedded in permanent structures such as biomedical implants, active radio frequency identification (RFID) tags and embedded micro-sensors where no maintenance or replacement is possible. Since these micro-supercapacitors can be directly integrated on-chip, they may help to better extract the energy from solar, mechanical, and thermal sources and thus enable more efficient self-powered systems. They could also be fabricated on the backside of solar cells in both portable devices and rooftop installations, to store power generated during the day for use after sundown and thus may help to provide electricity around the clock where connection to the grid is not possible. Other applications may arise which take advantage of the flexible nature of the substrates, such as electronics embedded into clothing, large-area flexible displays, and roll-up portable displays.

Note that the electrodes made of ICCNs are fabricated on flexible PET substrates covered with GO which, when laser reduced, serves as both the electrode and the current collector, thus making this particular electrode not only lightweight and flexible, but also inexpensive. In addition, the low oxygen content in ICCNs (~3.5%) as shown through XPS analysis is quite advantageous to the electrochemical activity seen here, since a higher oxygen content at the edge plane sites have been shown to limit and slow down the electron transfer of the ferri-/ferrocyanide redox couple. As such, embodiments of the present disclosure provide methodologies for making highly electroactive electrodes for potential applications in vapor sensing, biosensing, electrocatalysis and energy storage.

The present disclosure relates to a facile, solid-state and environmentally safe method for generating, patterning, and electronic tuning of graphite-based materials at a low cost. ICCNs are shown to be successfully produced and selectively patterned from the direct laser irradiation of GO films under ambient conditions. Circuits and complex designs are directly patterned on various flexible substrates without masks, templates, post-processing, transferring techniques, or metal catalysts. In addition, by varying the laser intensity and laser irradiation treatments, the electrical properties of ICCNs are precisely tuned over at least five orders of magnitude, a feature that has proven difficult with other methods. This new mode of generating ICCNs provides a new venue for manufacturing all organic based devices such as gas sensors, and other electronics. The relatively inexpensive method for generating ICCNs on thin flexible organic substrates makes it a relatively ideal heterogeneous scaffold for the selective growth of metal nanoparticles. Moreover, the selective growth of metal nanoparticles has the potential in electrocatalysing methanol fuel cells. Further still, films made of ICCNs show exceptional electrochemical activity that surpasses other carbon-based electrodes in the electron charge transfer of ferro-/ferricyanide redox couple. The simultaneous reduction and patterning of GO through the use of an inexpensive laser is a new technique, which offers significant versatility for the fabrication of electronic devices, all organic devices, asymmetric films, microfluidic devices, integrated dielectric layers, batteries, gas sensor, and electronic circuitry.

In contrast to other lithography techniques, this process uses a low-cost infrared laser in an unmodified, commercially available CD/DVD optical disc drive with LightScribe technology to pattern complex images on GO and has the additional benefit to simultaneously produce the laser converted corrugated carbon network. A LightScribe technology laser is typically operated with a 780 nm wavelength at a power output within a range of around 5 mW to around 350 mW. However, it is to be understood that as long as the carbon-based oxide absorbs within the spectrum of the laser's emission, the process is achievable at any wavelength at a given power output. This method is a simple, single step, low cost, and maskless solid-state approach to generating ICCNs that can be carried out without the necessity of any post-processing treatment on a variety of thin films. Unlike other reduction methods for generating graphite-based materials, this method is a non-chemical route and a relatively simple and environmentally safe process, which is not limited by chemical reducing agents.

The technique described herein is inexpensive, does not require bulky equipment, displays direct control over film conductivity and image patterning, can be used as a single step for fabricating flexible electronic devices, all without the necessity for sophisticated alignment or producing expensive masks. Additionally, due to the conductive nature of the materials used, it is possible to control the resulting conductivity by simply patterning at different laser intensities and power, a property that has yet to have been shown by other methods. Working circuit boards, electrodes, capacitors, and/or conducting wires are precisely patterned via a computerized program. The technique allows control over a variety of parameters, and therefore provides a venue for simplifying device fabrication and has the potential to be scaled, unlike other techniques that are limited by cost or equipment. This method is applicable to any photothermically active material, which includes but is not limited to GO, conducting polymers, and other photothermically active compounds such as carbon nanotubes.

As described above, a method has been presented for producing graphite-based materials that is not only facile, inexpensive and versatile, but is a one-step environmentally safe process for reducing and patterning graphite films in the solid state. A simple low energy, inexpensive infrared laser is used as a powerful tool for the effective reduction, subsequent expansion and exfoliation and fine patterning of GO. Aside from the ability to directly pattern and effectively produce large areas of highly reduced laser converted graphite films, this method is applicable to a variety of other thin substrates and has the potential to simplify the manufacturing process of devices made entirely from organic materials. A flexible all organic gas sensor has been fabricated directly by laser patterning of GO deposited on thin flexible PET. An ICCN is also shown to be an effective scaffold for the successful growth and size control of Pt nanoparticles via a simple electrochemical process. Finally, a flexible electrode made of ICCN was fabricated, which displays a textbook-like reversibility with an impressive increase of ~238% in electrochemical activity when compared to graphite towards the electron transfer between the ferri-/ferrocyanide redox couple. This exemplary process has the potential to effectively improve applications that would benefit from the high electrochemical activity demonstrated here including batteries, sensors and electrocatalysis.

Those skilled in the art will recognize improvements and modifications to the embodiments of the present disclosure. All such improvements and modifications are considered within the scope of the concepts disclosed herein and the claims that follow.

The invention claimed is:

1. A micro-supercapacitor comprising:
 a. a first electrode;
 b. a second electrode;
 c. a first conductor interfaced with the first electrode;
 d. a second conductor interfaced with the second electrode;
 e. a non-conductive liner contacting at least a portion of the first conductor and the second conductor; and
 f. an electrolyte in contact with the first electrode and the second electrode,
 wherein at least one of the first electrode or the second electrode comprises an interconnected corrugated carbon-based network (ICCN) having a plurality of expanded and interconnected carbon layers,
 having a plurality of metal nanoparticles deposited in the ICCN, and
 wherein the micro-supercapacitor maintains at least 60% of the stack capacitance when operated at a current density of about $1.84 \times 10^4$ mA/cm$^3$.

2. The micro-supercapacitor of claim 1, wherein the non-conductive liner contacting the at least a portion of the first conductor and the second conductor provides an electrical terminal configured to be coupled to external circuitry.

3. The micro-supercapacitor of claim 1, wherein the non-conductive liner seals the electrolyte within the micro-supercapacitor device.

4. The micro-supercapacitor of claim 1, wherein the non-conductive liner contacts at least a portion of the first electrode or the second electrode.

5. The micro-supercapacitor of claim 1, wherein the electrolyte comprises a gel electrolyte.

6. The micro-supercapacitor of claim 1, wherein the electrolyte comprises fumed silica (FS) nano-powder mixed with an ionic liquid.

7. The micro-supercapacitor of claim 1, wherein the electrolyte comprises 1-butyl-3-methylimidazolium bis(trifluoromethylsulfonyl)imide.

8. The micro-supercapacitor of claim 1, wherein the electrolyte comprises a hydrogel electrolyte.

9. The micro-supercapacitor of claim 1, wherein the electrolyte comprises poly(vinyl alcohol) (PVA)-$H_2SO_4$.

10. The micro-supercapacitor of claim 9, wherein the micro-supercapacitor is a solid-state micro-supercapacitor.

11. The micro-supercapacitor of claim 1, wherein a first conductive strip or a second conductive strip comprises copper (Cu), aluminum (Al), or an ICCN structure, wherein the first conductive strip and the second conductive strip are interfaced with the first electrode and the second electrode, respectively, to provide electrically conductive terminals to couple to external circuitry.

12. The micro-supercapacitor of claim 1, wherein the first electrode comprises a first plurality of electrode digits, wherein the second electrode comprises a second plurality of electrode digits, and wherein the first plurality of electrode digits of the first electrode and the second plurality of electrode digits of the second electrode are woven in an interdigitating pattern.

13. The micro-supercapacitor of claim 12, further comprising an interspace distance between the interdigitating pattern of the first electrode and the second electrode of about 150 micrometers.

14. The micro-supercapacitor of claim 1, wherein the first electrode or the second electrode comprises 4, 8, or 16 electrode digits.

15. The micro-supercapacitor of claim 1 wherein the first electrode or the second electrode comprises widths from about 330 micrometer to about 1770 micrometers.

16. The micro-supercapacitor of claim 1, further comprising a total area of less than about 50 square millimeters, 40 square millimeters, or 30 square millimeters.

17. The micro-supercapacitor of claim 1, wherein the first electrode or the second electrode comprises an edge dimension of from about 220 micrometers to about 1770 micrometers.

18. The micro-supercapacitor of claim 1, wherein the micro-supercapacitor is comprised within an integrated circuit package or a nanoelectromechanical device.

19. A micro-supercapacitor comprising:
 a. a first electrode;
 b. a second electrode;
 c. a first conductor interfaced with the first electrode;
 d. a second conductor interfaced with the second electrode;

e. a non-conductive liner contacting at least a portion of the first conductor and the second conductor; and f. an electrolyte in contact with the first electrode and the second electrode, wherein at least one of the first electrode or the second electrode comprises an interconnected corrugated carbon-based network (ICCN) having a plurality of expanded and interconnected carbon layers, wherein the micro-supercapacitor exhibits a nearly triangular CC curve when operated at a first current density of about $1.684 \times 10^4$ mA/cm$^3$, wherein the micro-supercapacitor exhibits a stack capacitance of around about 3.05 F/cm$^3$ when operated at a second current density of about 16.8 mA/cm$^3$, and wherein the micro-supercapacitor maintains about 60% of the stack capacitance when operated at a third current density of about $1.84 \times 10^4$ mA/cm$^3$.

20. A micro-supercapacitor comprising:

a. a first electrode;

b. a second electrode;

c. a first conductor interfaced with the first electrode;

d. a second conductor interfaced with the second electrode;

e. a non-conductive liner contacting at least a portion of the first conductor and the second conductor; and f. an electrolyte in contact with the first electrode and the second electrode, wherein at least one of the first electrode or the second electrode comprises an interconnected corrugated carbon-based network (ICCN) having a plurality of expanded and interconnected carbon layers, wherein the non-conductive liner comprises a central window.

* * * * *